United States Patent [19]

Reed

[11] 4,031,407
[45] June 21, 1977

[54] SYSTEM AND METHOD EMPLOYING A DIGITAL COMPUTER WITH IMPROVED PROGRAMMED OPERATION FOR AUTOMATICALLY SYNCHRONIZING A GAS TURBINE OR OTHER ELECTRIC POWER PLANT GENERATOR WITH A POWER SYSTEM

[75] Inventor: Terry J. Reed, Latrobe, Pa.
[73] Assignee: Westinghouse Electric Corporation, Pittsburgh, Pa.
[22] Filed: July 31, 1972
[21] Appl. No.: 276,343

Related U.S. Application Data

[63] Continuation of Ser. No. 99,493, Dec. 18, 1970, abandoned.
[52] U.S. Cl. .................................. 307/87; 290/1 R
[51] Int. Cl.² .......................................... H01J 3/00
[58] Field of Search ........... 307/85, 86, 87; 415/17; 317/27; 290/1

[56] References Cited
UNITED STATES PATENTS

| | | | |
|---|---|---|---|
| 3,325,650 | 6/1967 | Barnes | 307/87 X |
| 3,552,872 | 4/1969 | Giras et al. | 415/17 |
| 3,569,785 | 3/1971 | Durbeck | 317/27 |
| 3,599,007 | 8/1971 | Martin | 307/87 |
| 3,709,626 | 1/1973 | Eggenberger | 415/17 |

Primary Examiner—Robert K. Schaefer
Assistant Examiner—William J. Smith
Attorney, Agent, or Firm—E. F. Possessky

[57] ABSTRACT

A gas turbine power plant is provided with an industrial gas turbine which drives a rotating brushless exciter generator coupled to a power system through a breaker. One or more of the turbine-generator plants are operated by a hybrid digital computer control system during sequenced startup, synchronizing, load and shutdown operations. The program system for the computer and external analog circuitry operate in a multiple gas turbine control loop arrangement. Automatic synchronization is achieved with a hybrid subsystem which includes the programmed computer and external phase detection circuitry. An automatic synchronization program for the computer is divided into rough speed and voltage matching, fine speed matching and breaker closure subprograms.

32 Claims, 83 Drawing Figures

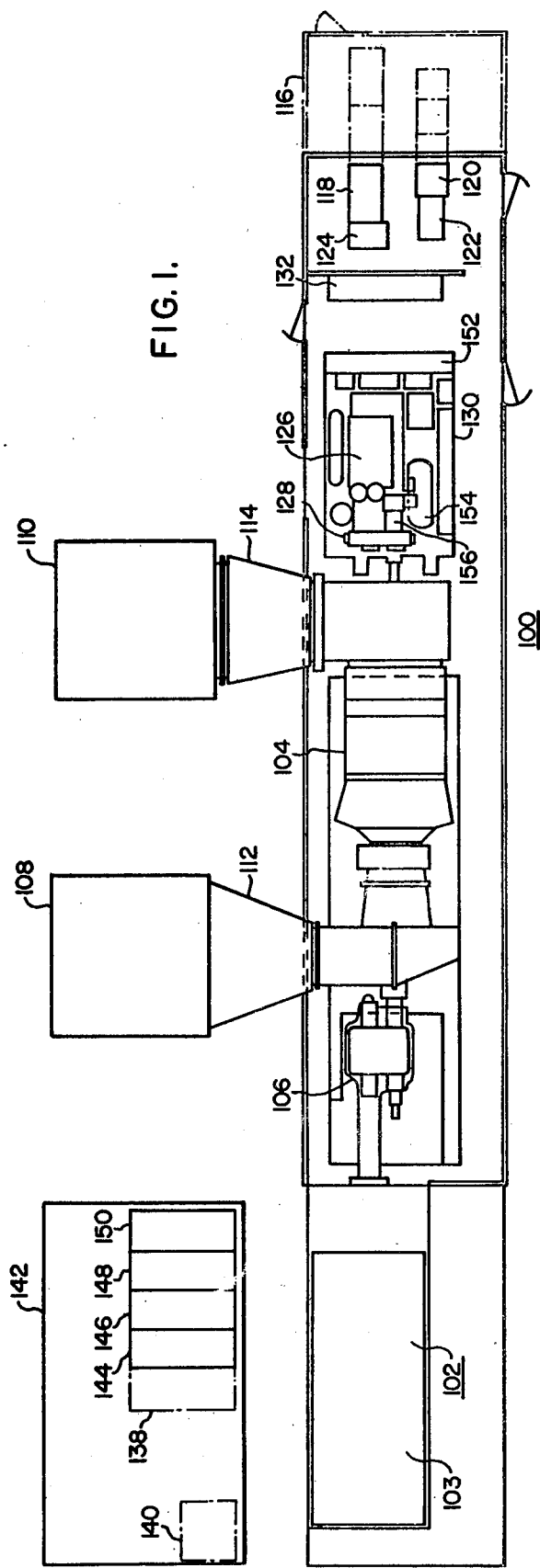
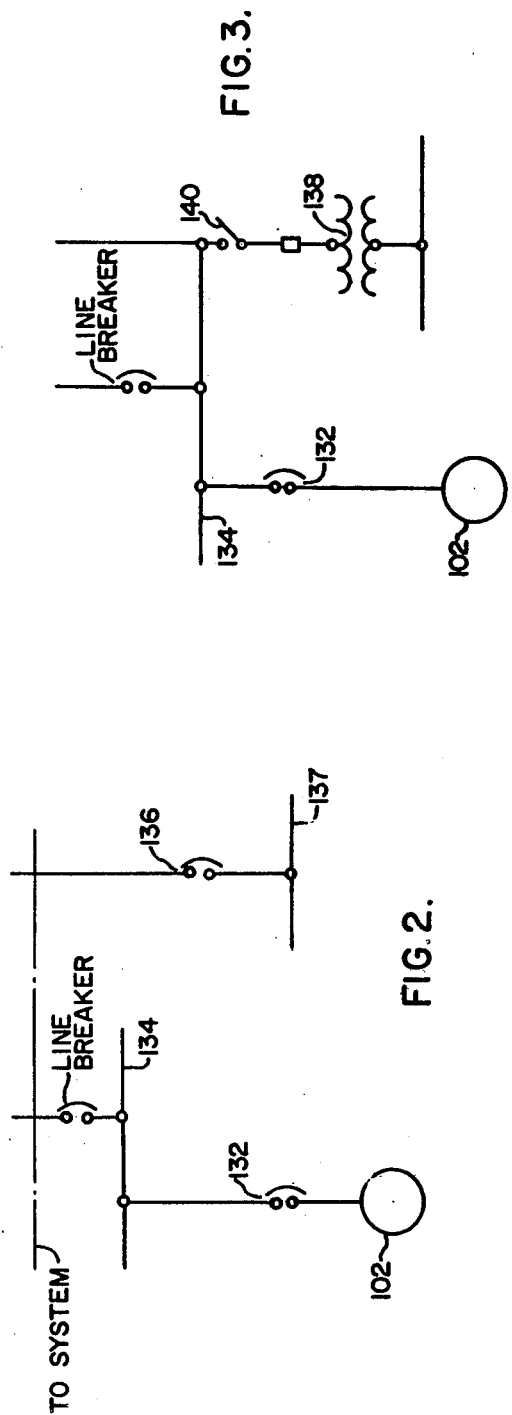

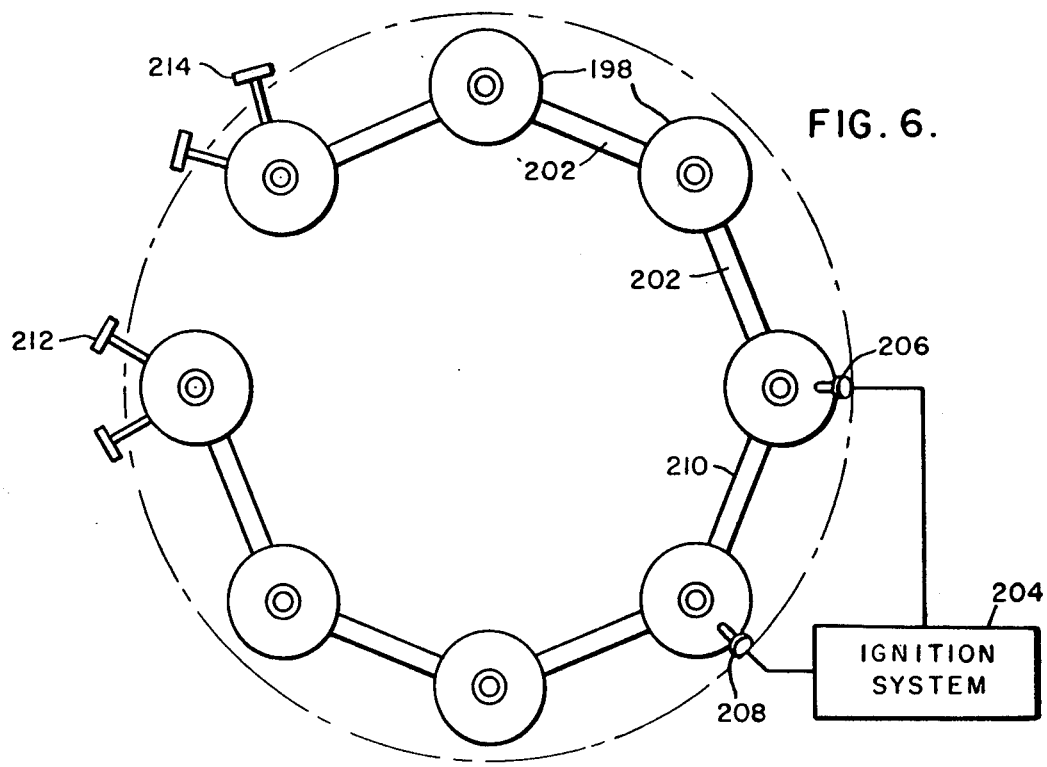
FIG. 6.
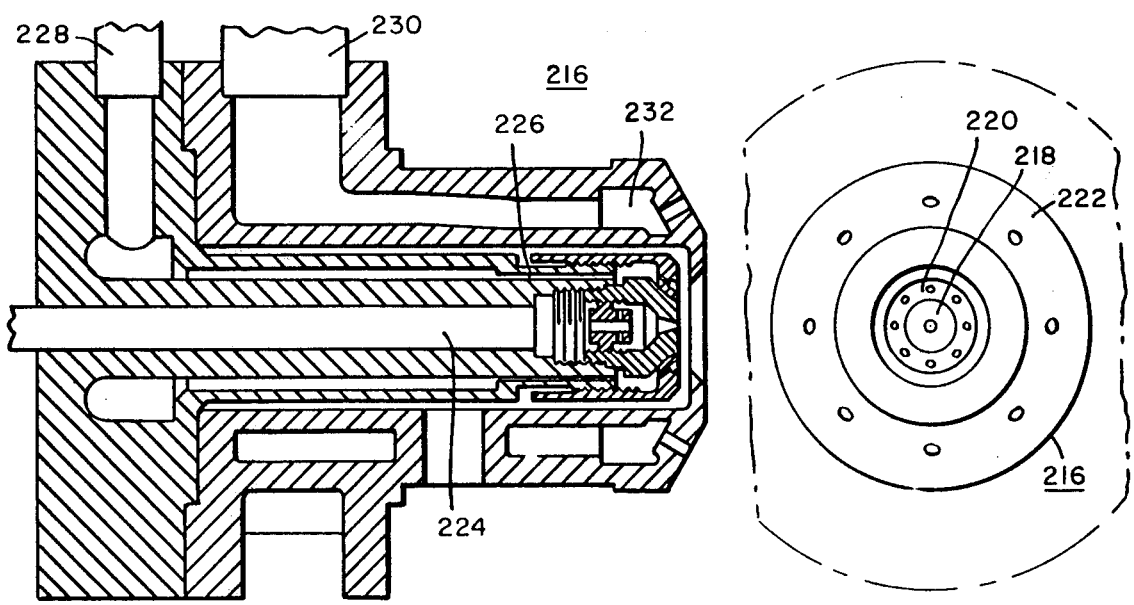
FIG. 8.
FIG. 7.

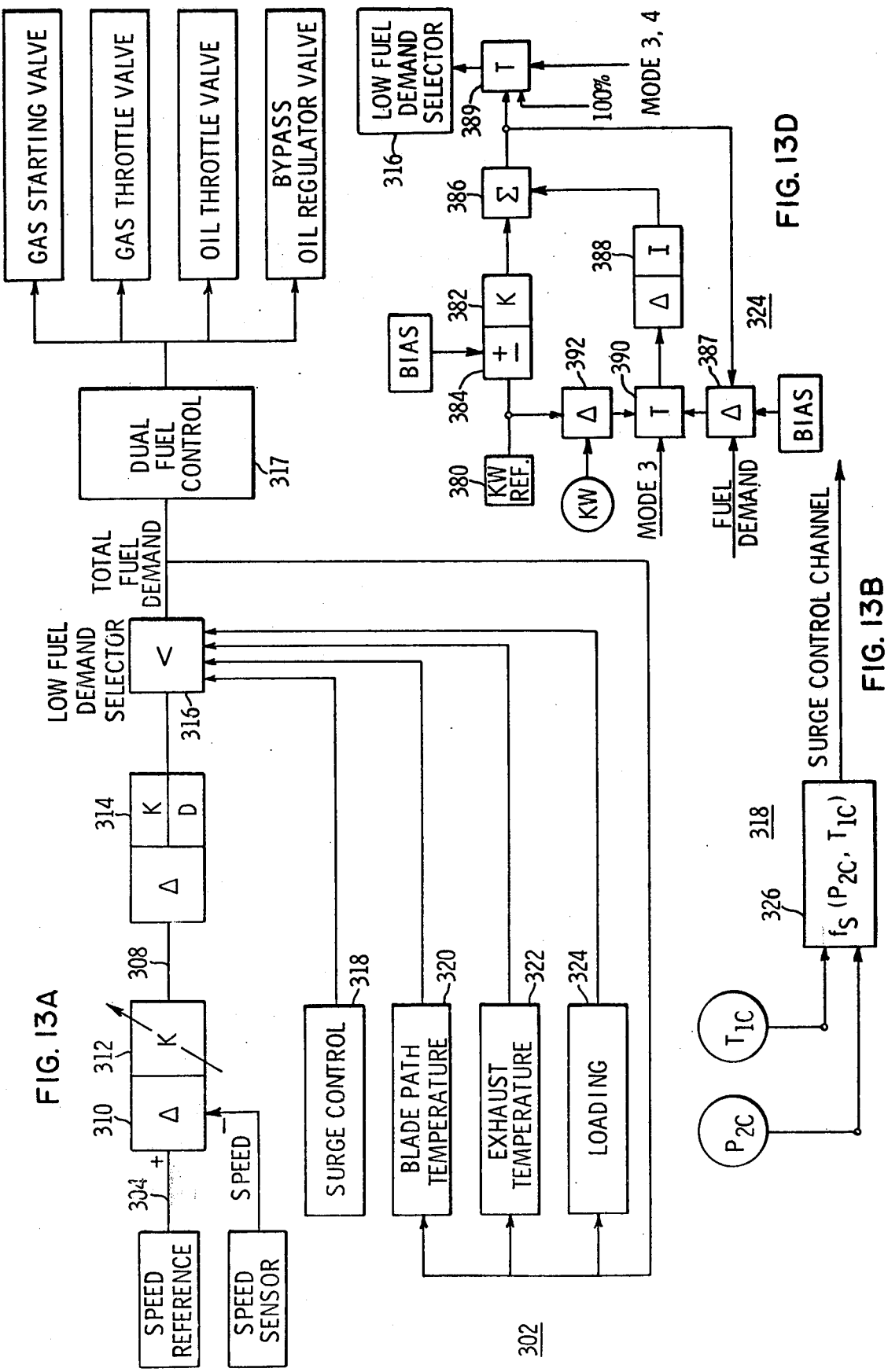

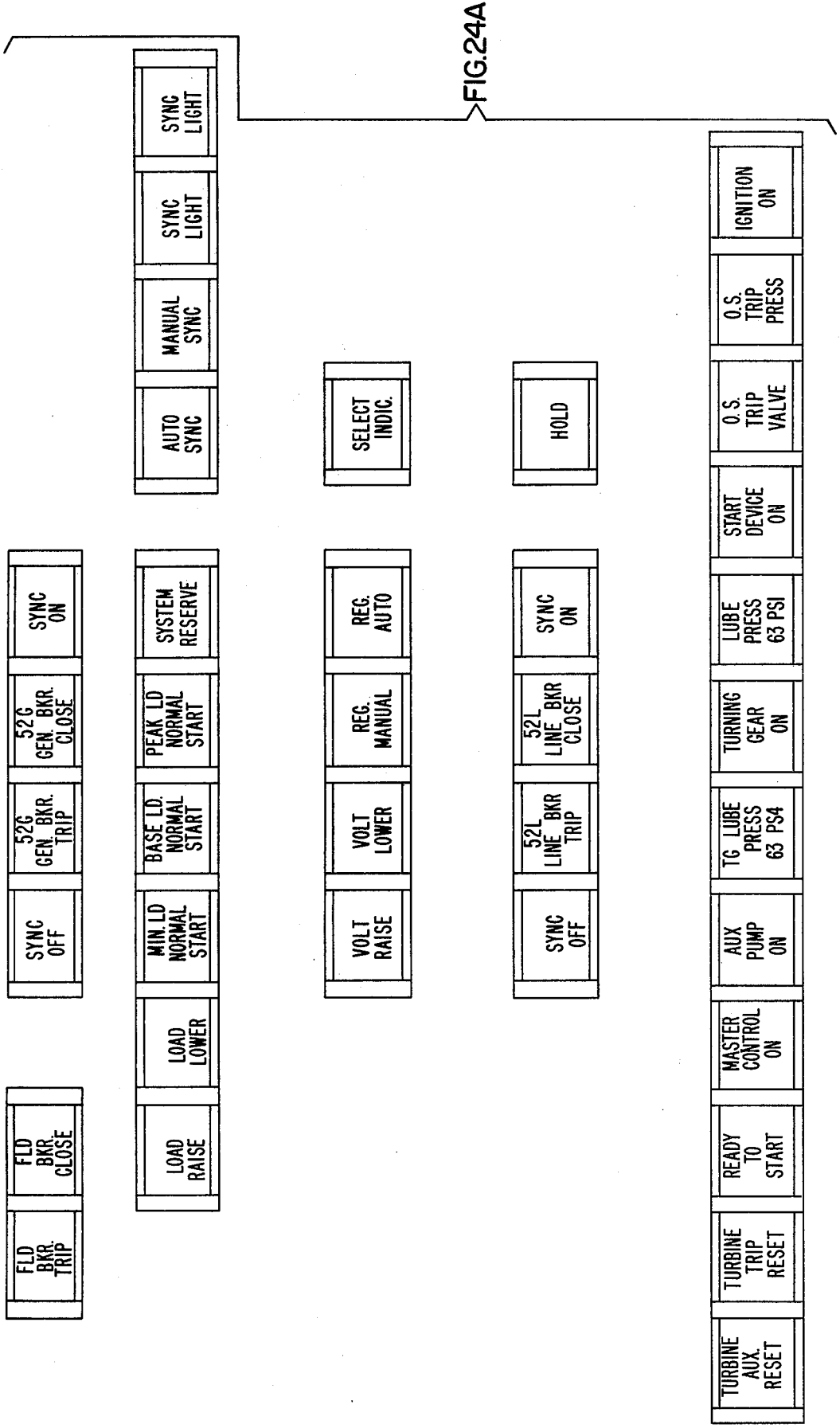

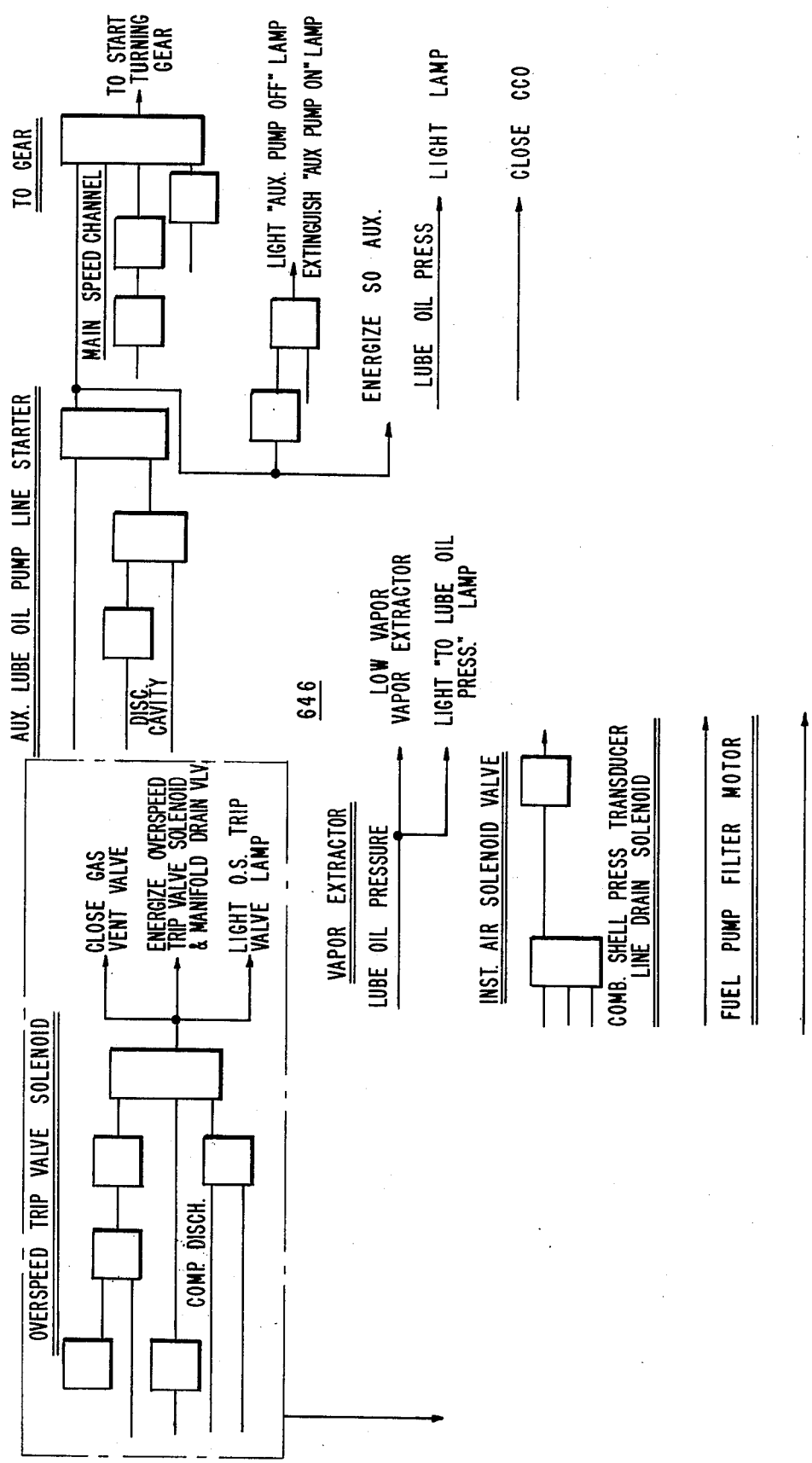
FIG. 33B1A

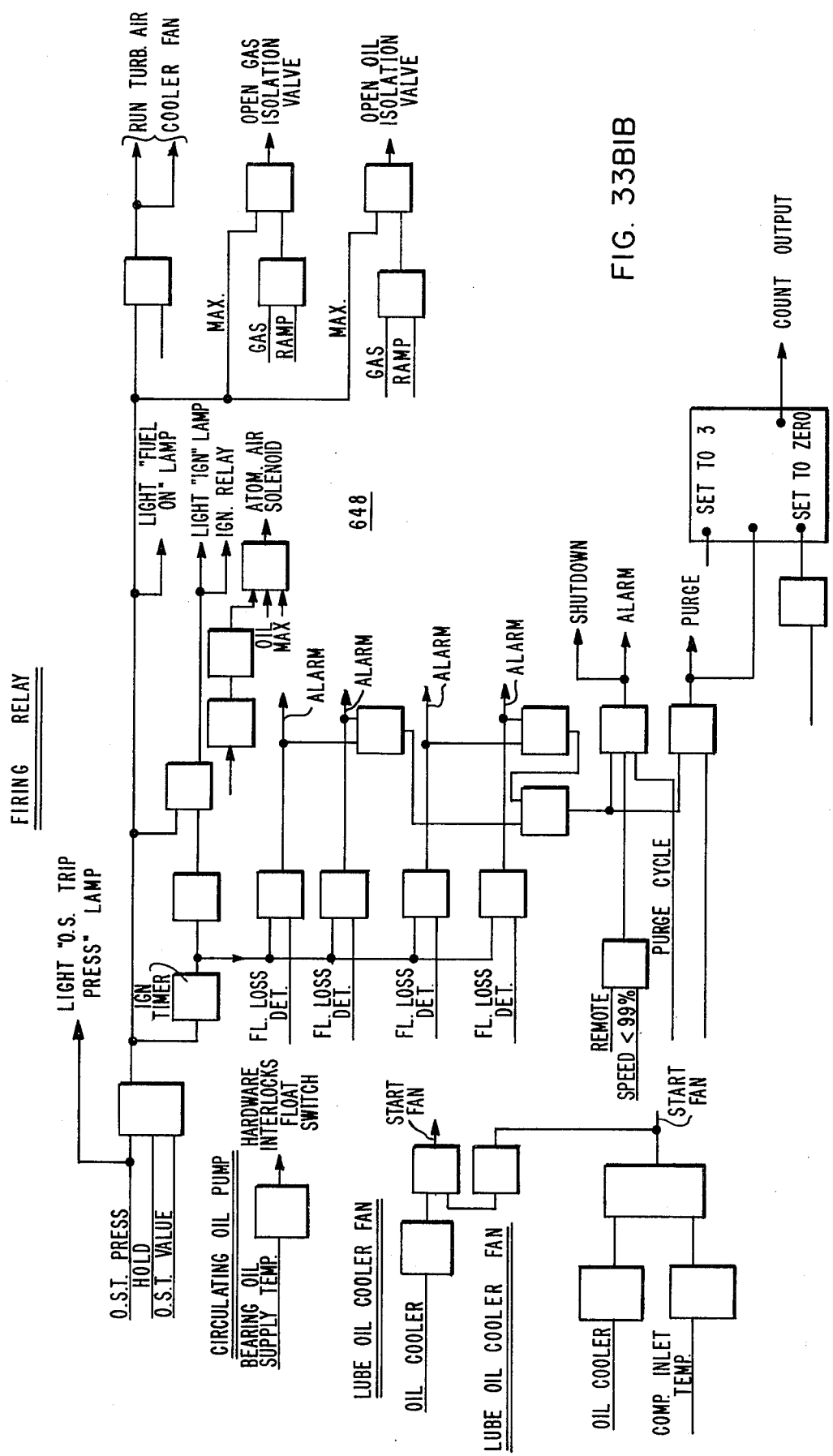
FIG. 33B1B

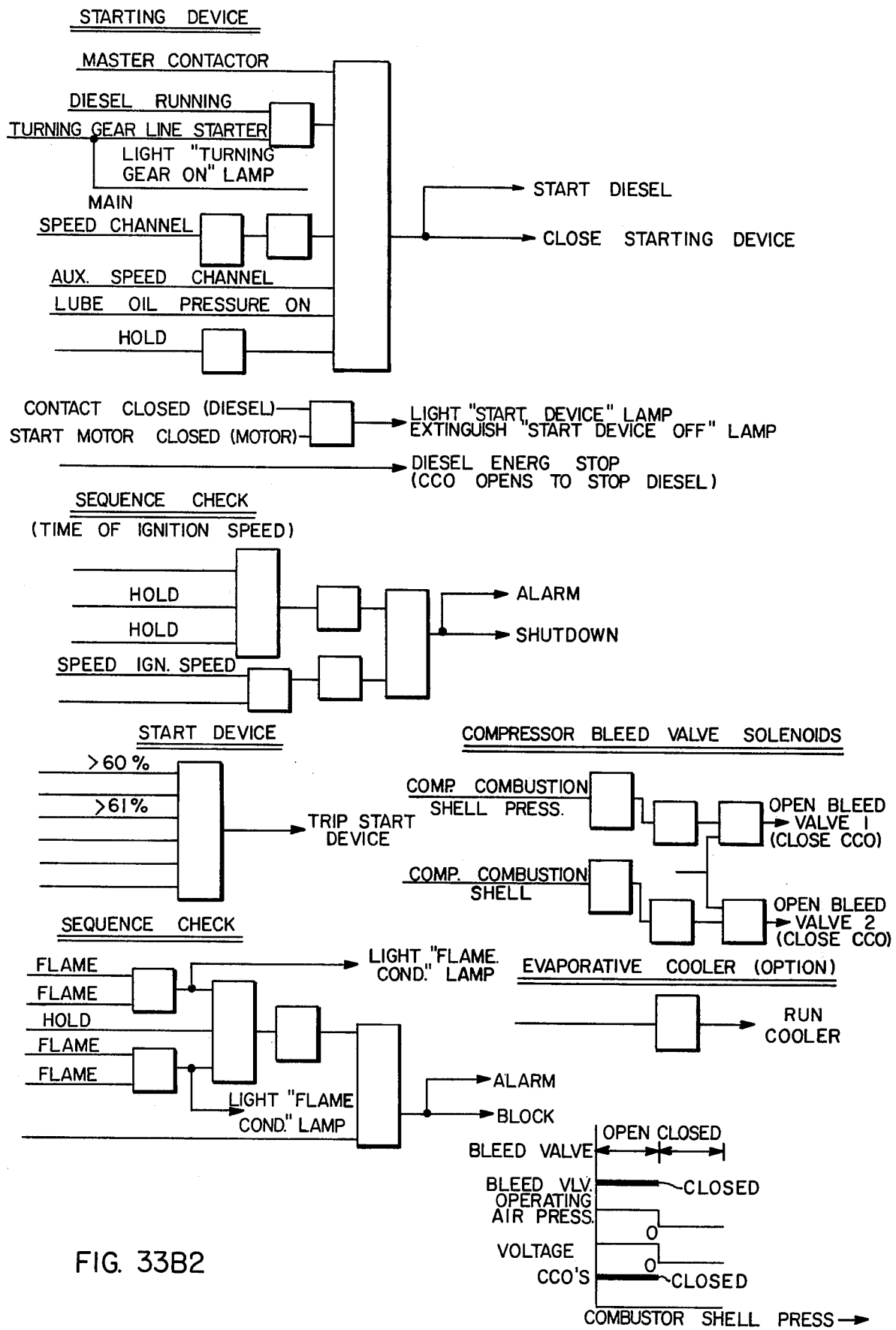
FIG. 33B2

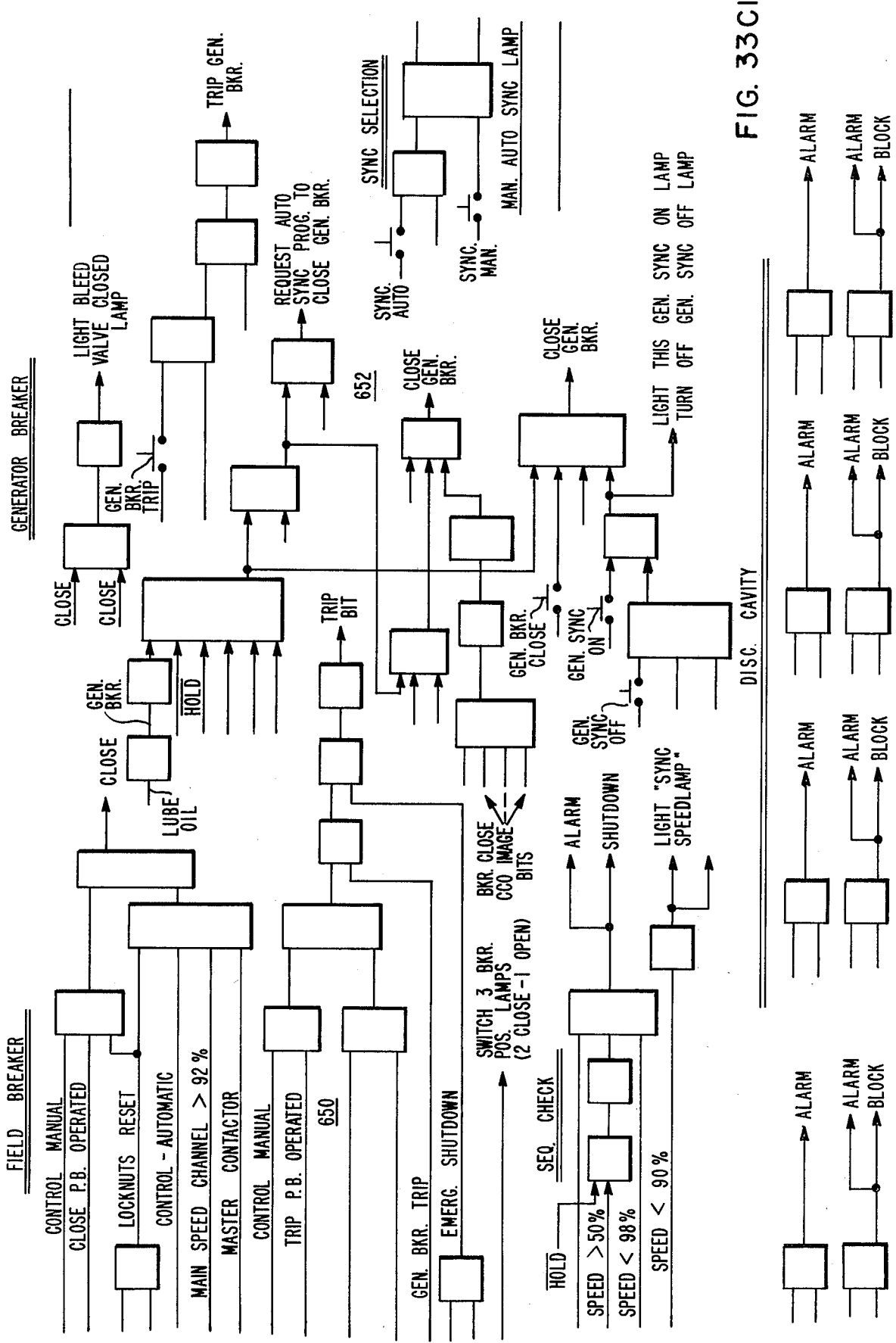

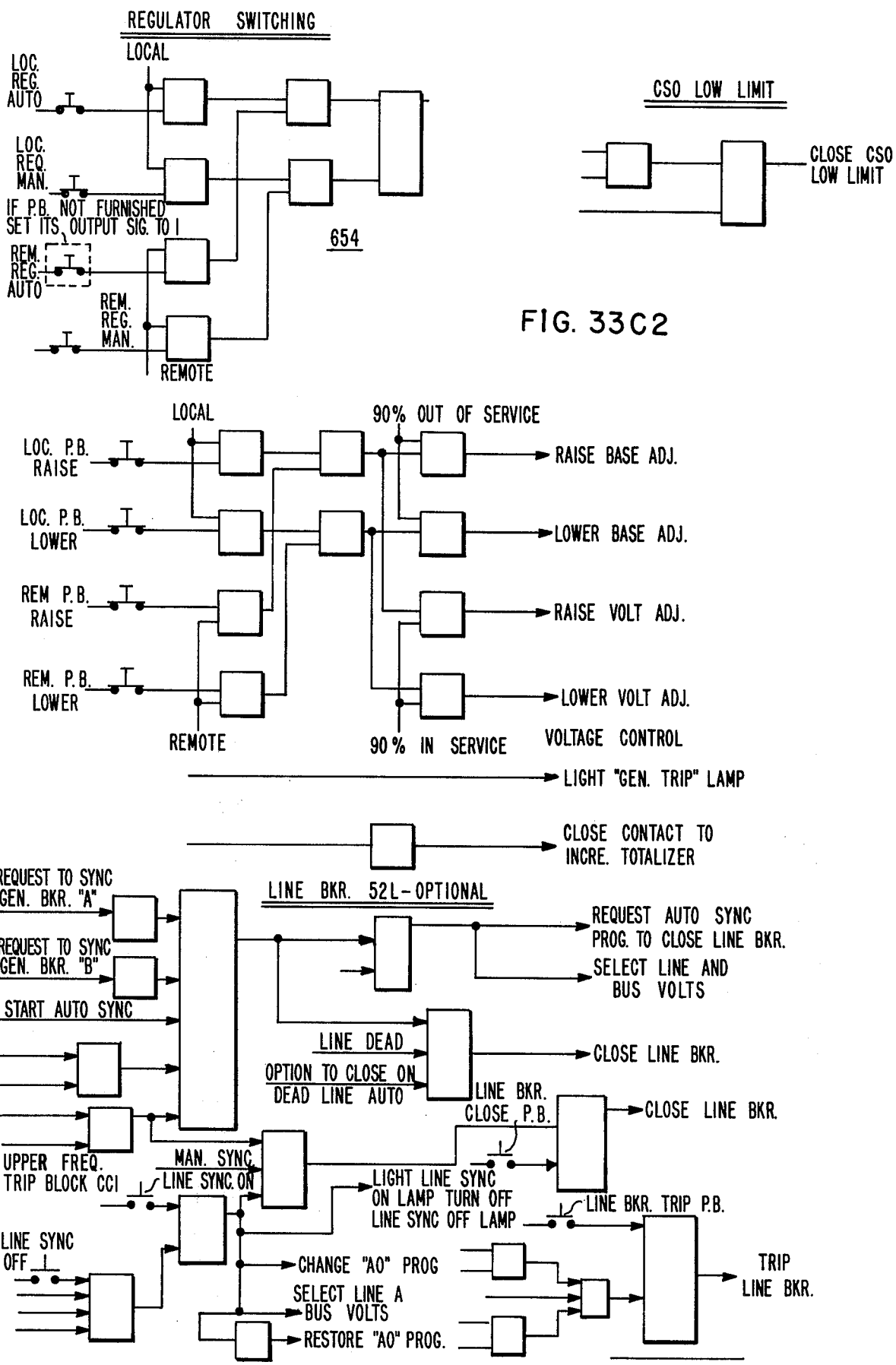

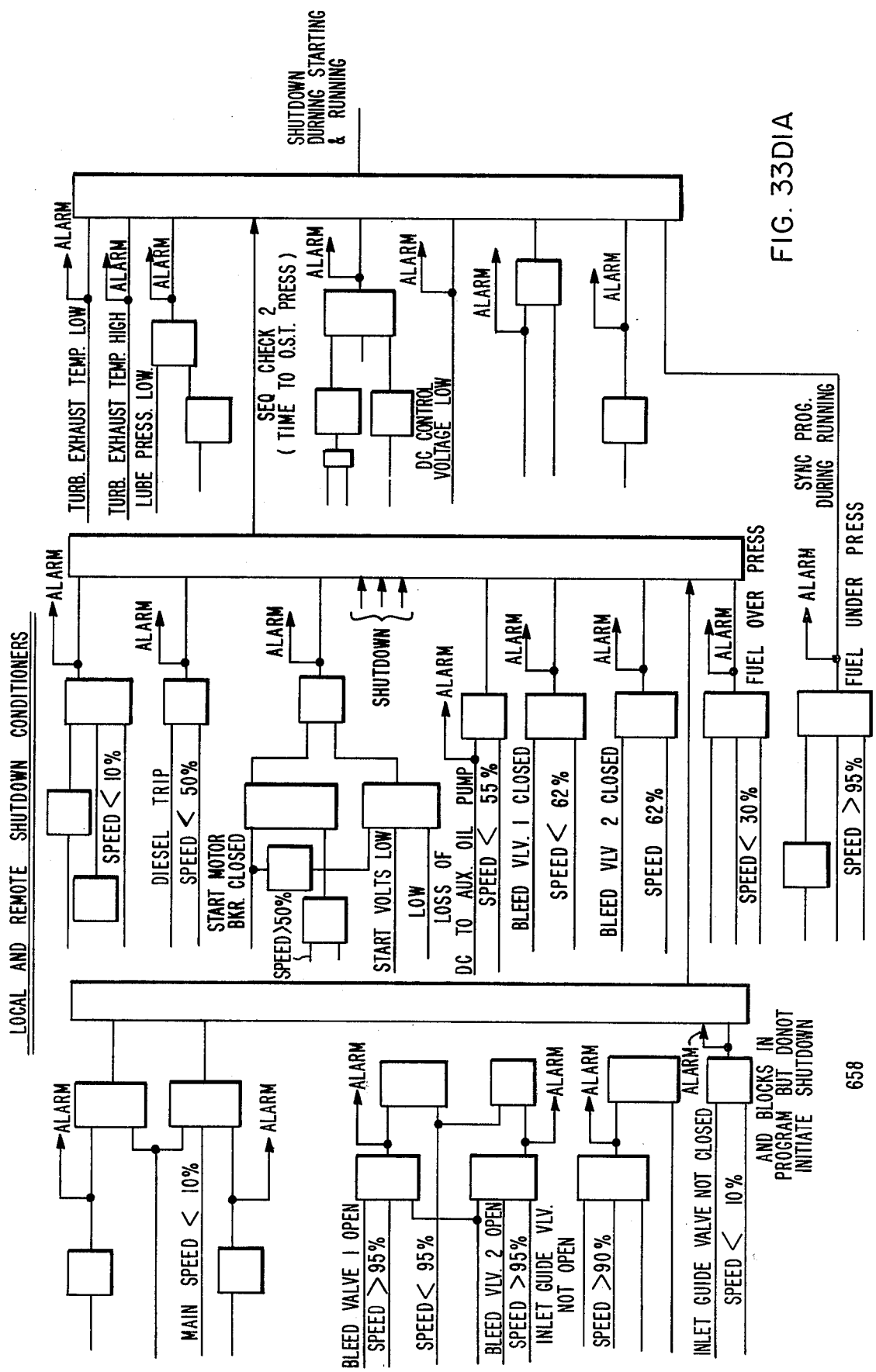

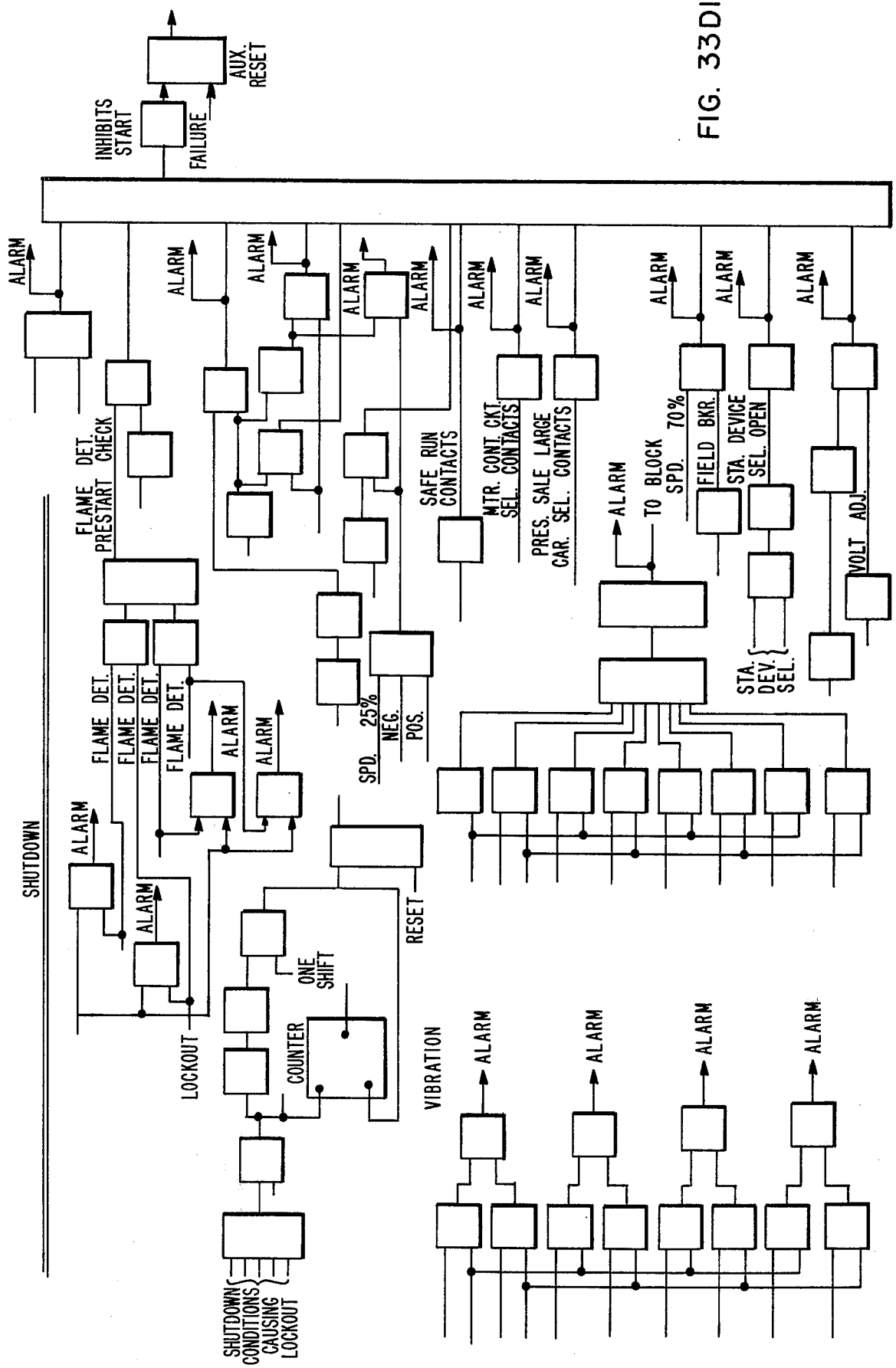
FIG. 33DIB

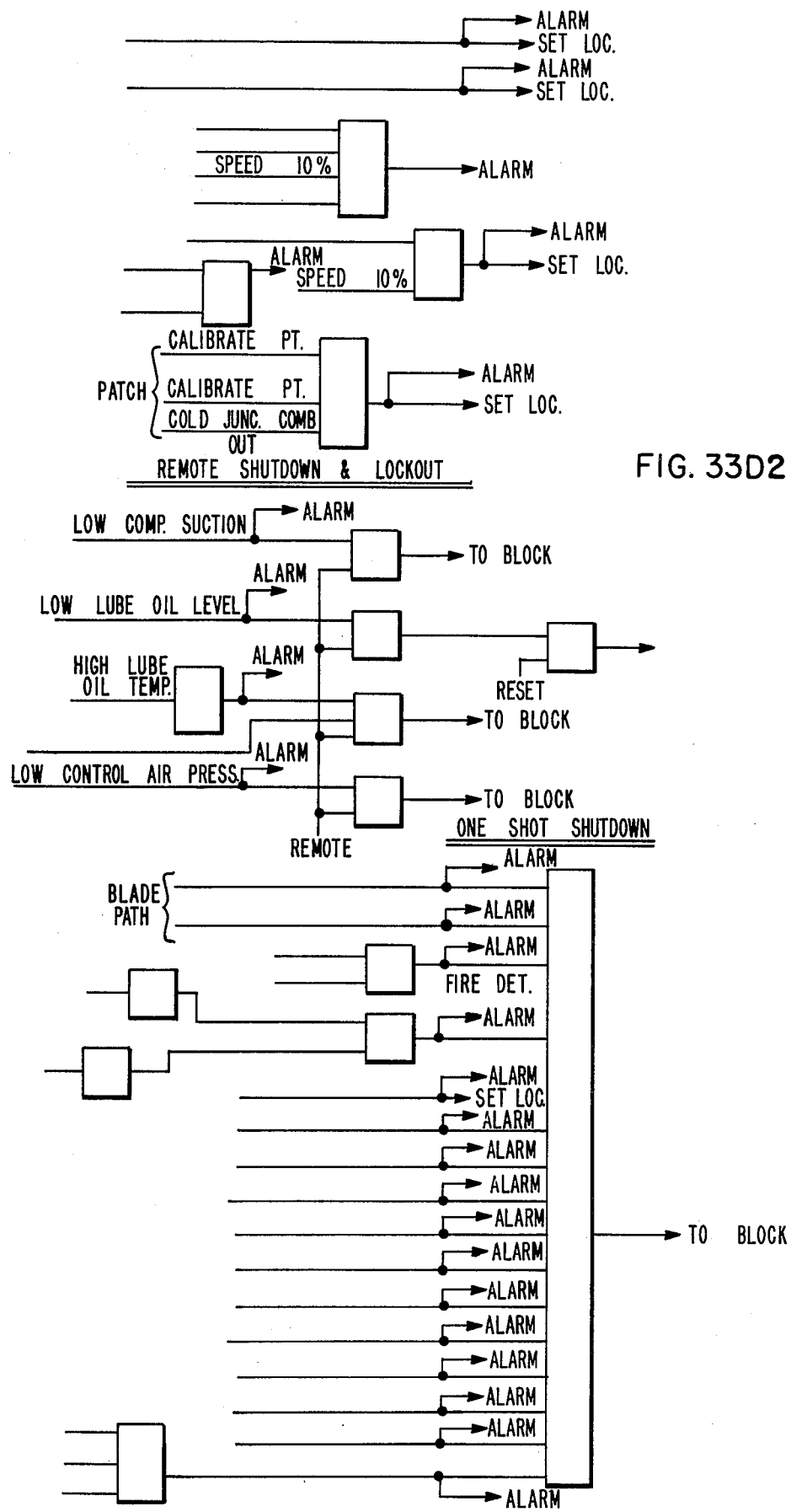
FIG. 33D2

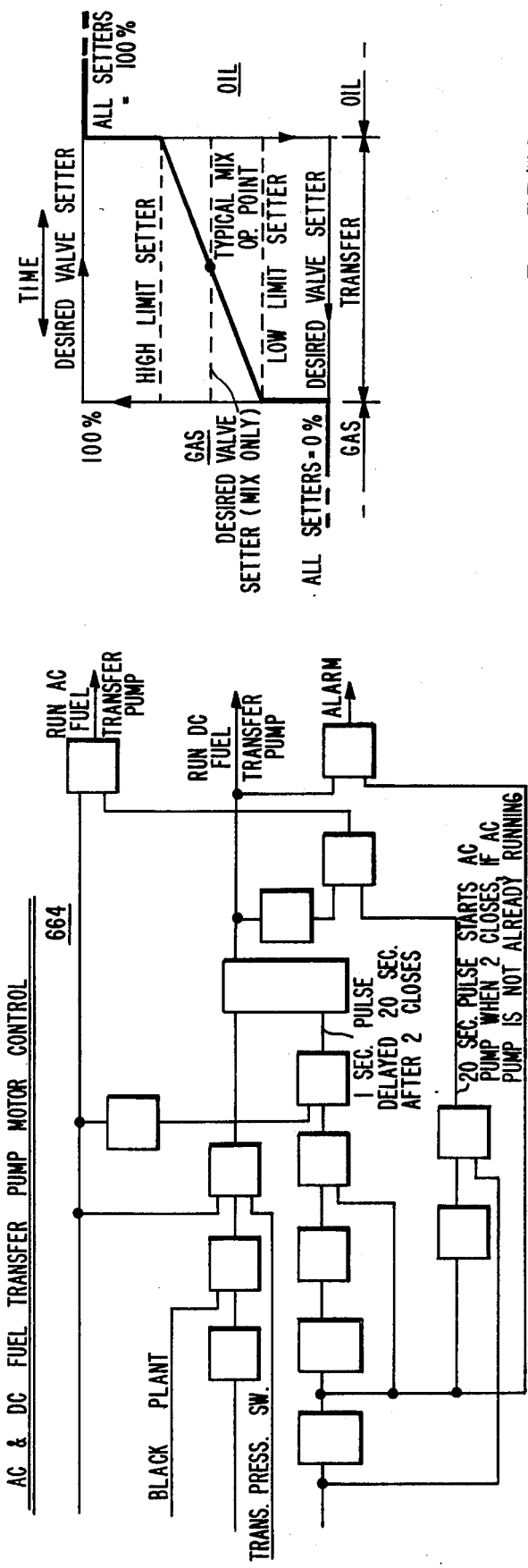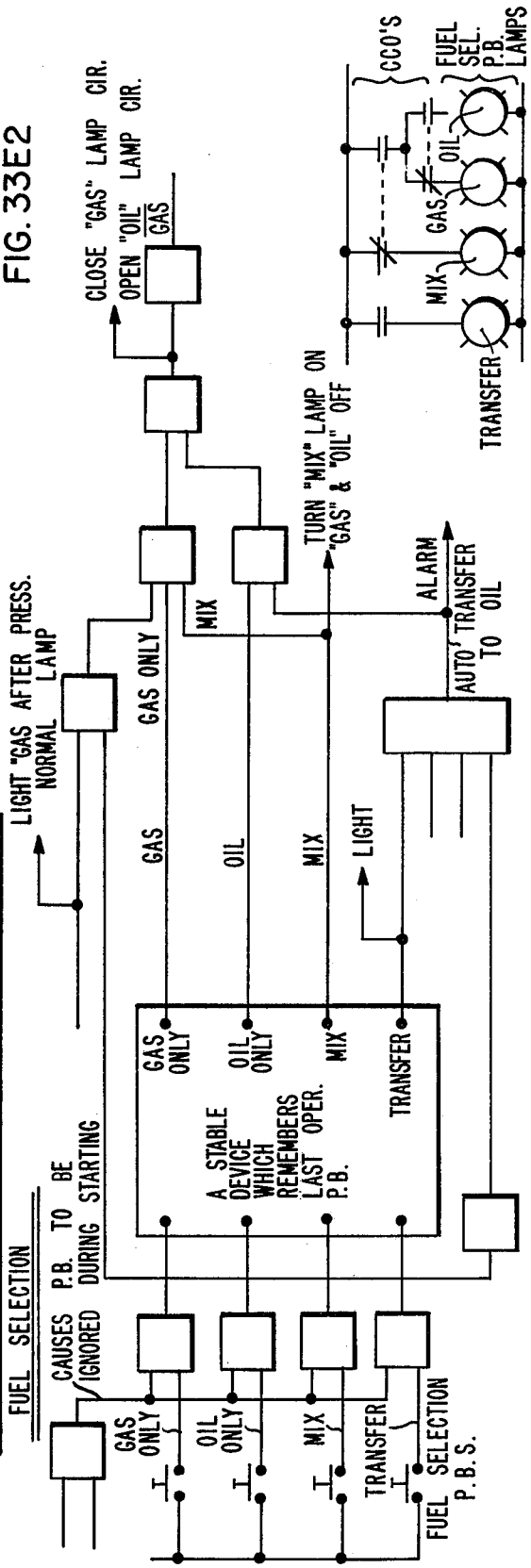
FIG. 33E2

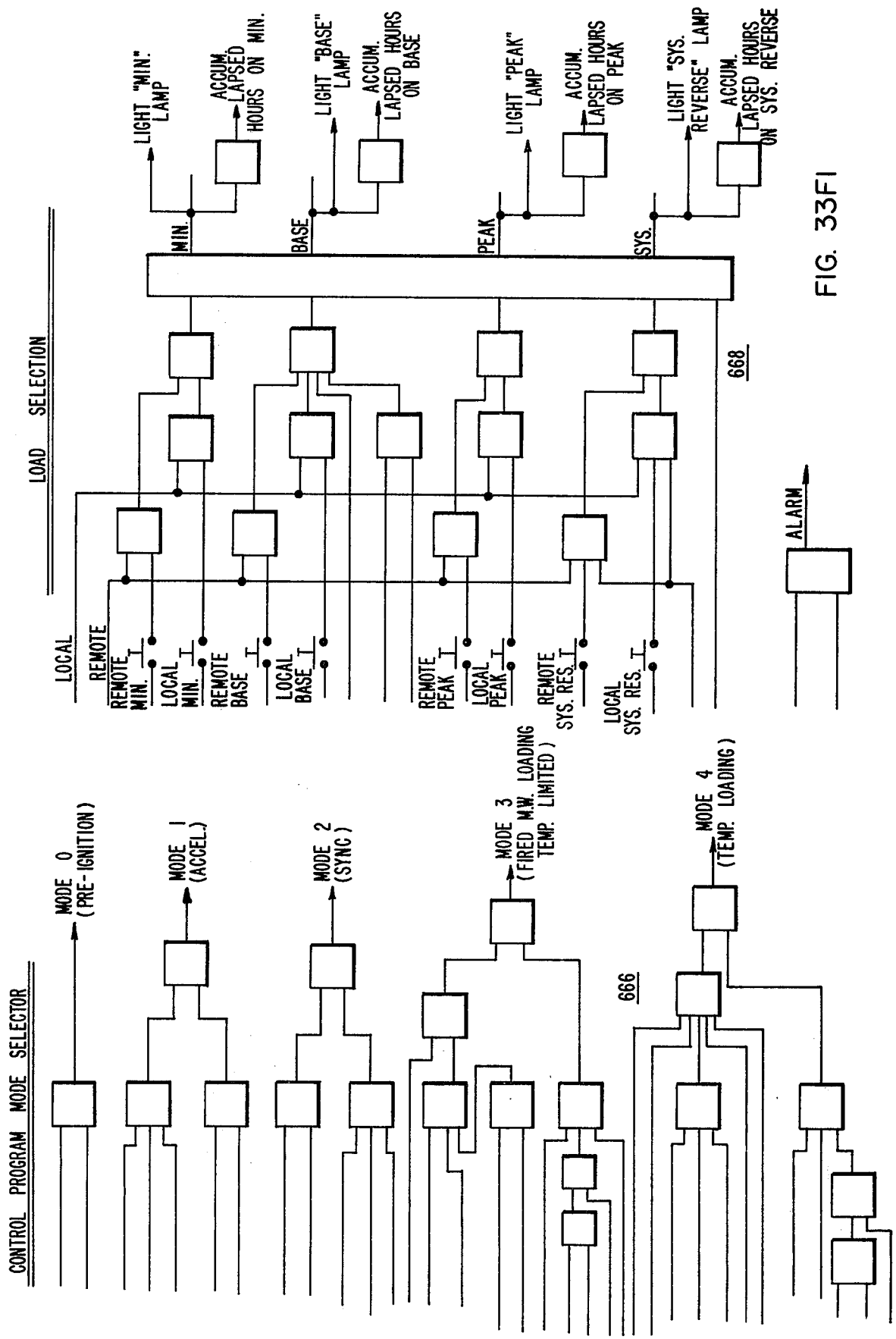
FIG. 33F1

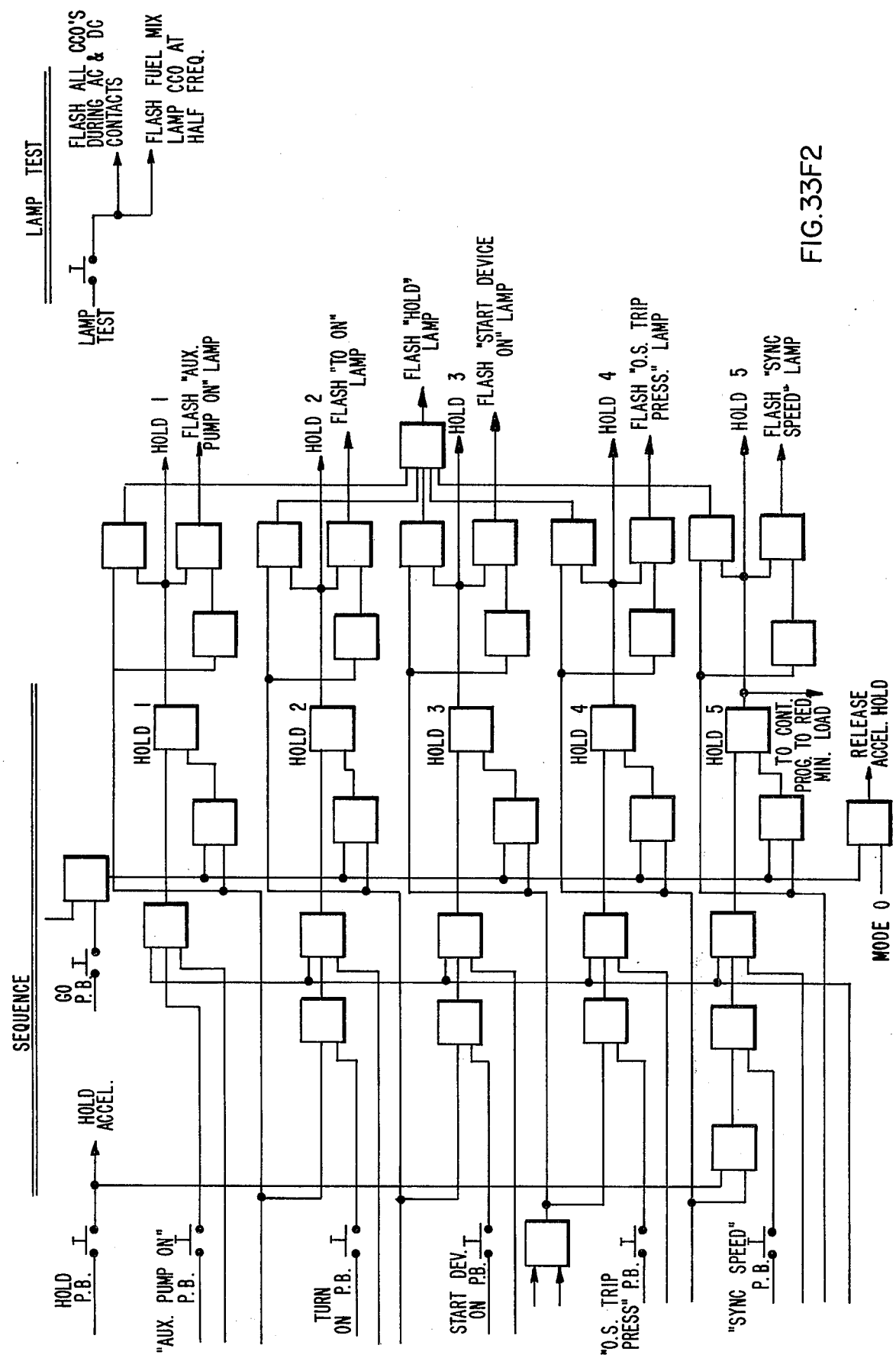
FIG.33F2

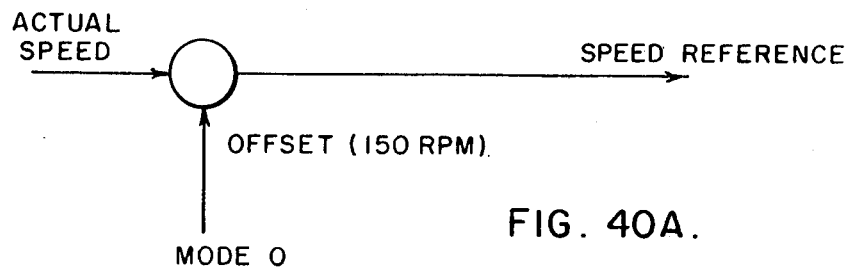
FIG. 40A.
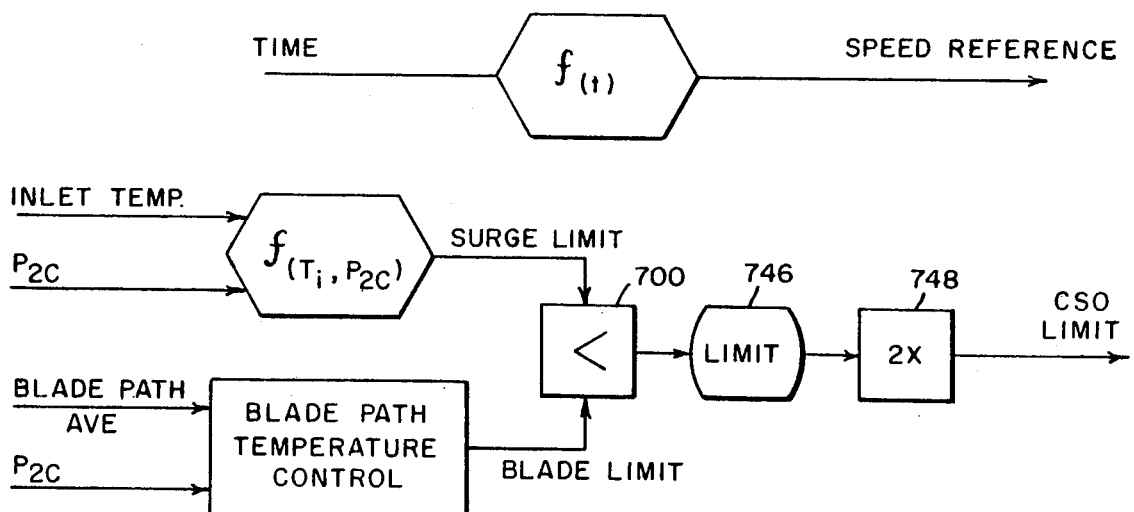
FIG. 40B.
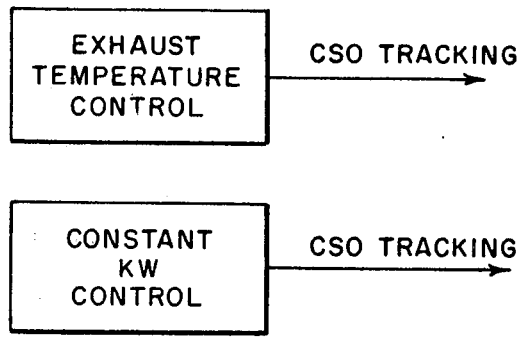
MODE I

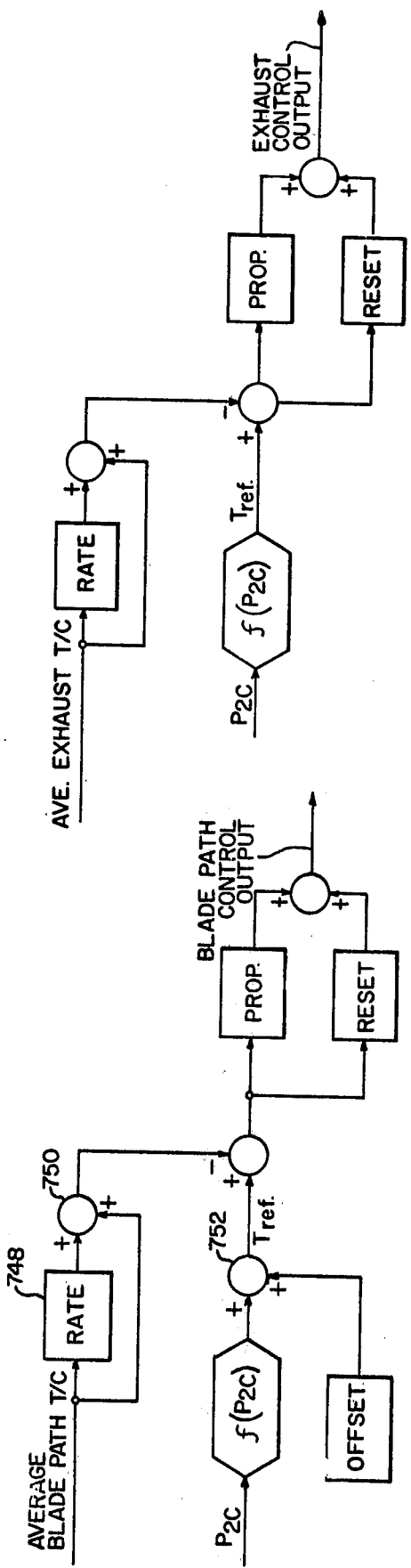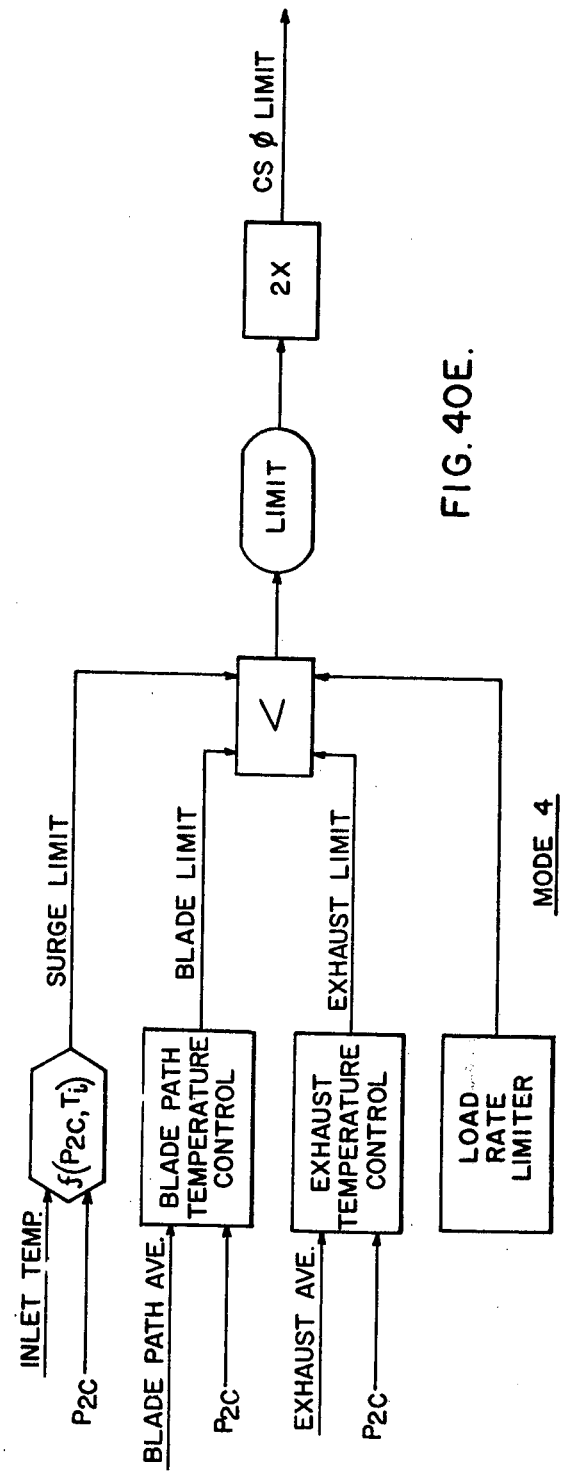

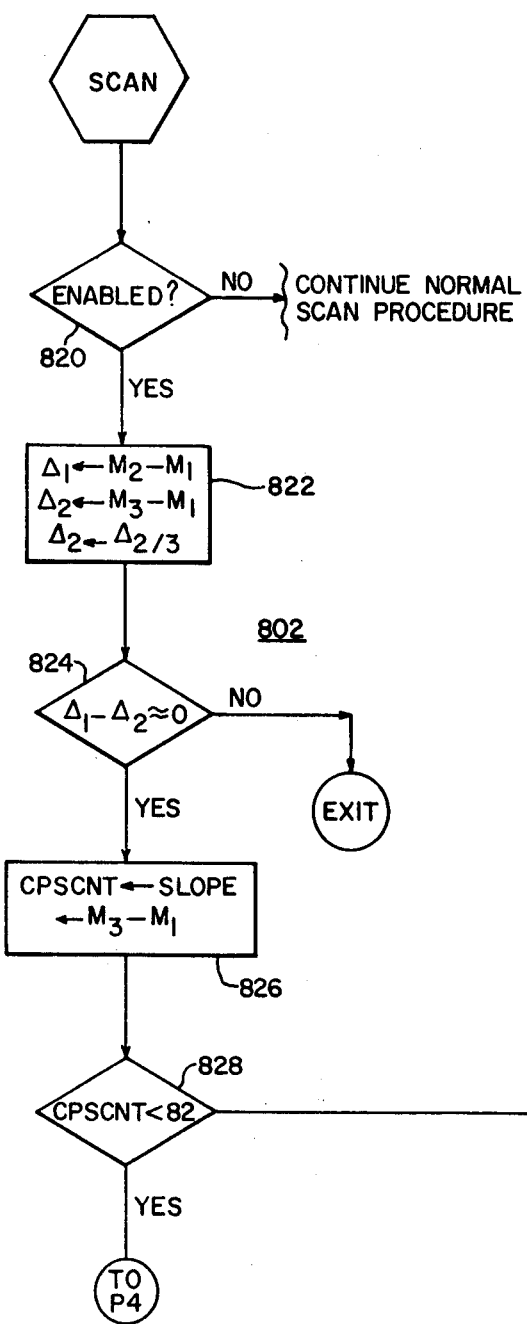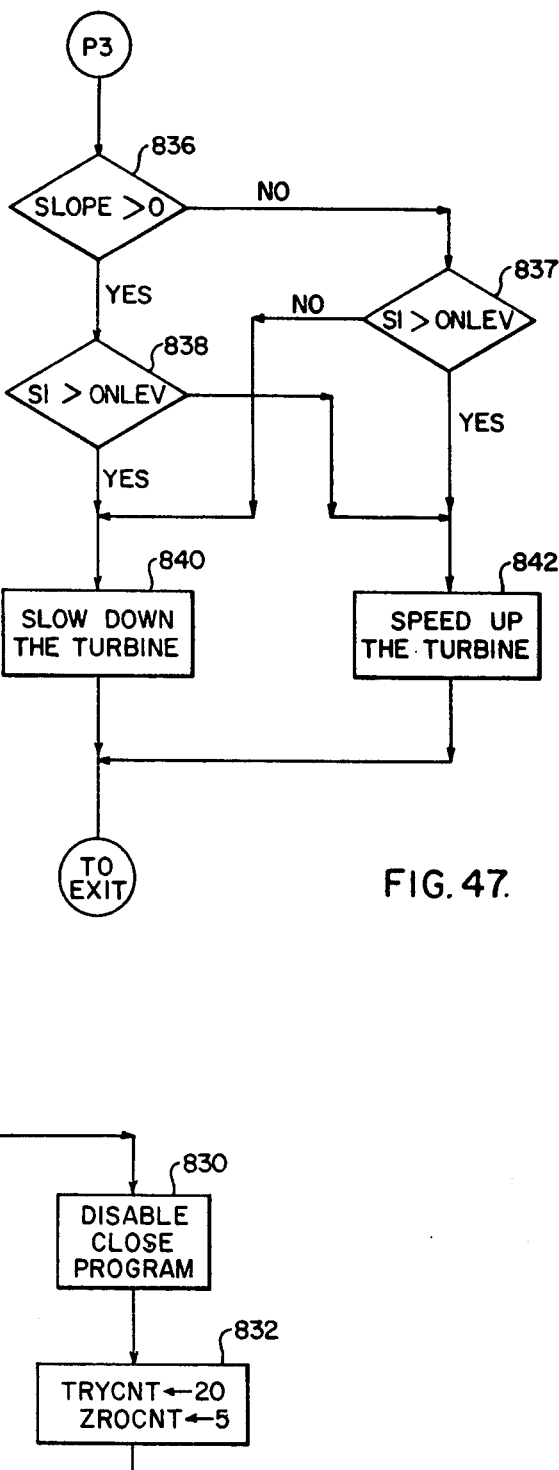
FIG. 45.
FIG. 47.

SYSTEM AND METHOD EMPLOYING A DIGITAL COMPUTER WITH IMPROVED PROGRAMMED OPERATION FOR AUTOMATICALLY SYNCHRONIZING A GAS TURBINE OR OTHER ELECTRIC POWER PLANT GENERATOR WITH A POWER SYSTEM

This is a continuation of application Ser. No. 99,493, filed Dec. 18, 1970, now abandoned.

CROSS-REFERENCE TO RELATED APPLICATIONS

Ser. No. 722,779 filed by M. E. Birnbaum and T. C. Giras on Apr. 19, 1968, entitled "System and Method For Operating A Steam Turbine And An Electric Power Generating Plant" and assigned to the present assignee.

Ser. No. 722,790 filed by W. R. Berry on Apr. 19, 1968, entitled "System And Method For Providing Steam Turbine Operation With Improved Dynamics" and assigned to the present assignee.

Ser. No. 695,020 filed by T. Rubner on Jan. 2, 1968, entitled "Voltage Acceptor Circuit And Overvoltage-Undervoltage Detector For Use Therein" and assigned to the present assignee.

Ser. No. 695,021 filed by F. T. Thompson and T. Rubner on Jan. 2, 1968, entitled "Generator Speed Matcher Using Direct Sampling" and assigned to the present assignee.

Ser. No. 695,026 filed by J. H. Bednarek and T. Rubner on Jan. 2, 1968, entitled "Solid State Voltage Matcher And Voltage Difference Detector For Use Therein" and assigned to the present assignee.

Ser. No. 695,684 filed by J. H. Bednarek, T. Rubner and A. Wavre on Jan. 4, 1968, entitled "Automatic Generator Synchronizing And Connecting System And Synchronizer Apparatus For Use Therein" and assigned to the present assignee.

Ser. No. 082,470 filed by J. Reuther and T. C. Giras on Oct. 20, 1970, entitled "Improved System And Method For Operating Industrial Gas Turbine Apparatus And Gas Turbine Electric Power Plants preferably With A Digital Computer Control System" and assigned to the present assignee.

Ser. No. 082,469 filed by R. Kiscaden and R. Yannone on Oct. 20, 1970, entitled "Improved System And Method For Accelerating And Sequencing Industrial Gas Turbine Apparatus And Gas Turbine Electric Power Plants Preferably With A Digital Computer Control System" and assigned to the present assignee.

Ser. No. 082,467 filed J. Rankin and T. Reed on Oct. 20, 1970 entitled "Improved Control Computer Programming Method And Improved System And Method For Operating Industrial Gas Turbine Apparatus And Gas Turbine Electric Power Plants Preferably With A Digital Computer Control System" and assigned to the present assignee.

Ser. No. 099,491 filed by J. Reuther on Dec. 18, 1970 with, entitled "System And Method Employing A Digital Computer For Automatically Synchronizing A Gas Turbine Or Other Electric Power Plant Generator With A Power System" and assigned to the present assignee.

BACKGROUND OF THE INVENTION

The present invention relates to electric power plants and more particularly to apparatus and methods for starting and operating such plants with automatic synchronization.

In the operation of an electric power plant, the prime mover for each plant generator is typically a steam turbine or a gas turbine which si controlled in its operation to drive the electric generator from rest or turning gear speed to the generator running speed. The control system may be an electrohydraulic or an electropneumatic system employing an analog and/or digital electronic control or a digital computer control. If the electric power plant is included in a power system to which it is contributing power for distribution to various user points, a breaker is operated to connect the generator to the system when the generator acquires the proper operating status for synchronization. It is generally required that the generator speed be within a predefined range to provide for substantial matching of the generator electrical frequency and the power system electrical frequency, that the generator voltage magnitude be within a predefined range to provide for substantial matching of the generator and power system voltage magnitudes, and that the phase difference between the generator voltage waveform and the power system voltage waveform be approaching zero for breaker closure substantially at the zero or coincident phase relationship between the two waveforms.

The synchronization conditions just described are needed to avoid generator damage and to avoid serious electrical disturbances in the electrical power system. It is desirable that the synchronization conditions be satisfied accurately and reliably for equipment protection and power system security purposes. Further, it is desirable that generator and breaker operation be controlled to provide fast synchronization, especially in gas turbine and other electric power plants where fast startup is needed to provide fast power contribution to the power system for power system security against power outage. The combination of startup reliability and synchronization speed is a measure of power plant availability for power generation which is especially significant in relation to gas turbine and other standby electric power plants.

One conventional synchronizing scheme is that relying principally on manual operations. Thus, a skilled plant operator typically may employ a synchroscope which provides a visual indication of the amount of phase difference and the slip or rate of change of phase difference between the generator and system bus or line voltages. If the slip is too great, raise or lower speed control action is applied to the prime mover as required by the operator. Concurrently, the operator makes any generator voltage regulator adjustments needed for voltage matching. When the generator and system voltage magnitudes are appropriate as indicated by meters and when the slip frequency and the relative phases are observed to be appropriate, the operator initiates a breaker close signal which typically operates a breaker closing relay coil. Normally, the operator generally anticipates the breaker closing time to provide for breaker closure as the two voltage waveforms are approaching phase coincidence or at the time point of phase coincidence.

In other prior art applications, automatic power plant generator synchronization has also been provided with varying degrees of automation and with varying kinds of hardware combinations. One scheme has involved the use of separate relay controls for the voltage matching, speed matching and synchronization functions.

Generally, in the relay synchronization system scheme, the phase difference between the generator and system voltage waveforms is detected by the use of circuitry which vectorially adds the voltages and rectifies the sum. One relay is operated at a fixed phase angle and another relay is operated at a fixed breaker closing time ahead of a synchronization time point predicted from the envelope of the rectified phase difference voltage.

If the phase relay operates after the fixed time relay, the slip frequency is too fast and breaker closure is prevented. On the other hand, phase relay operation followed by operation of the fixed time relay signifies an appropriate slip frequency for synchronization and the breaker closing command is thus generated upon closure of the fixed time relay. Voltage and speed matching functions supportive to the functions of the relay synchronization system may be manually controlled or as already indicated automatically controlled by a separate voltage matcher and a separate speed matcher system. In some cases, a synchro-verifier may also be included to provide an independent check on the generator and power system conditions so as to prevent synchronization where conditions so warrant even though the automatic synchronization system may otherwise be calling for synchronization.

More recently, solid state automatic synchronization systems have been developed to provide substantial improvement over the earlier pertaining art relative to certain characteristics including synchronization accuracy and synchronization speed. The aforementioned Westinghouse patent applications pertain to such systems. In addition, a September, 1968 Westinghouse Engineer article entitled "Generators Synchronized Rapidly and Accurately by Automatic System" is also related to the same subject matter area. It is noteworthy at this point that in referencing prior art publications or patents or patent applications as background herein, no representation is made that the cited subject matter is the best prior art.

In the synchronization system of the Westinghouse Engineer article, a common package is modularly constructed to provide the synchronizer function and to provide at the user's option the voltage and speed matching functions as well as certain other system functions. The voltage matcher employs semiconductor circuitry in comparing the magnitudes of the generator and bus voltages and in generating corrective generator voltage adjustment signals. Among other features, there is included in the voltage matcher circuitry a capability for adjusting the accuracy with which the two voltage magnitudes are to be matched.

To provide speed matching, the prior art solid state synchronization system employs circuitry which becomes operable when the generator frequency is within ± 10% of the bus frequency. Speed raise or lower signals are automatically applied to the separately provided prime mover speed control such that the time intervals between correction pulses become increasingly longer as the speed of the generator approaches the value corresponding to the electrical frequency of the bus. A capability is provided in the speed matcher for varying the closure time of the relays employed to generate the raise and lower speed control signals. Adjustability is also provided in the length of time during which the speed matcher will allow the generator to remain in a synchronous but phase difference condition.

A basic synchronizer component of the solid state synchronization system becomes operational if an optional voltage acceptor component indicates that both the generator voltage and the bus voltage are within predetermined limits. Solid state circuitry is employed to develop a triangular waveform which represents the varying phase difference between the generator and bus voltages. The breaker is signaled to close at an advance angle prior to phase coincidence to allow for the closure time of the breaker and the required advance angle is determined from the rate at which the generator and the bus voltages are approaching synchronism. If the determined advance angle is greater than a preset value, lock-out is provided against generation of a breaker closure signal until the slip frequency is reduced to a value within the acceptable range.

Background information relative to gas turbine electric power plants also pertains to certain aspects of the present invention. However, that background information is more fully considered in the aforementioned copending application (Ser. No. 082,470).

The described and other known prior art synchronization systems and techniques have been characterized with certain disadvantages although they have been satisfactory under some performance and cost standards of evaluation. In the first place, manual synchronization tends to be undesirable since it depends upon the level of skill and judgment of the human operator. Further, the known existing state of the automatic synchronization art makes no provision for implementation of the automatic synchronization functions with a digital computer in those increasing numbers of applications where presently available digital computer hardware is economically justified and already available or scheduled for use for other electric power plant control functions. Thus, no provision is available to forego the added hardware cost of an automatic synchronization system in a power plant having a digital control computer.

It is also noteworthy that the computer advantages of extended control and operating performance flexibility are not available with prior art systems. Control flexibility does exist to some degree in the solid state systems and probably to a lesser degree in earlier systems, but as in all hard wired systems such flexibility is necessarily relatively limited by practical considerations of economics, design and redesign. In at least some prior art systems and possibly most or all prior art systems, synchronization performance has also been relatively limited in efficiency, accuracy, reliablity, speed and frequency range of operation.

Existing automatic synchronization systems have also been limited from the standpoint of system integration and the possiblity of achieving increased system integration for extended quality and efficiency of performance. Thus, it is highly desirable in the continuous process of developing improved power plant operations that the overall plant control and the automatic synchronization system be tied together to provide better and more economic plant design and performance. The digital computer provides a unique capacity for enabling integration of system control and operation as the desirable characteristics of integration are made known by system development effort. However, prior art systems including gas turbine power plant systems have generally been limited in providing system integration and in providing extended possibilities for future system integration relative to automatic synchronization and general power plant system operations. System integration and digital computer implementation are particularly significant in gas turbine power plants where automatic remote operation and high availability are highly desirable.

In the aforementioned copending Reuther application an improved system and an improved method for automatic digital computer synchronization in power plant operations are disclosed. The present patent application provides substantially the same detailed description as that presented in Ser. No. 099,491, but it is directed to a specific improvement over the basic Reuther contribution.

SUMMARY OF THE INVENTION

An electric power plant is provided with a generator which is driven by a prime mover to generate electricity for transmission to a power system through a circuit breaker. Plant startup and running operation is controlled by a control system including a programmed digital control computer. During startup or after breaker trip or after isolated plant operation, the programmed computer operates accurately, reliably, speedily and efficiently to determine when the generator and system voltage phase difference is appropriate for synchronization and to issue a breaker closure command at the proper time. To conserve computer duty cycle, generator and system voltage phase difference detection is preferably provided by electronic circuitry externally of the digital computer. Speed and voltage matching functions supportive to synchronization are preferably provided by the computer through interaction with other elements of the overall control system. An automatic synchronization program provides the voltage and speed matching and synchronization determination functions, and it is preferably organized to employ data representative of generator and system frequencies and voltage phase difference in efficiently interacting with other control programs and external apparatus and synchronizing breaker closure. Multiple gas turbine or other power plant trains can be provided with automatic synchronization by interaction of the computer through respective control systems associated with the power plant trains.

BRIEF DESCRIPTION OF THE DRAWINGS

FIG. 1 shows a top plan view of a gas turbine power plant arranged to operate in accordance with the principles of the invention;

FIGS. 2 and 3 show respective electrical systems usable in the operation of the gas turbine power plant of FIG. 1;

FIGS. 6-8 show a fuel nozzle and parts thereof employed in the gas turbine of FIG. 5;

FIGS. 13A-D show various schematic diagrams of control loops which may be employed in operating the computer control system of FIG. 12 and the power plant of FIG. 1;

FIGS. 33A-F show a plurality of logic diagrams representative of the sequencing logic performed by the sequencing, program;

FIGS. 40A–D show respective control configurations of software elements associated respectively with Mode 0 through Mode 4 operations;

FIGS. 41A–B respectively show software control configurations for the blade path temperature and exhaust temperature limit functions;

FIGS. 44, 45 and 47–50 show respective flow diagrams employed in automatic synchronization program operations;

DESCRIPTION OF THE PREFERRED EMBODIMENT

Figure 1A:
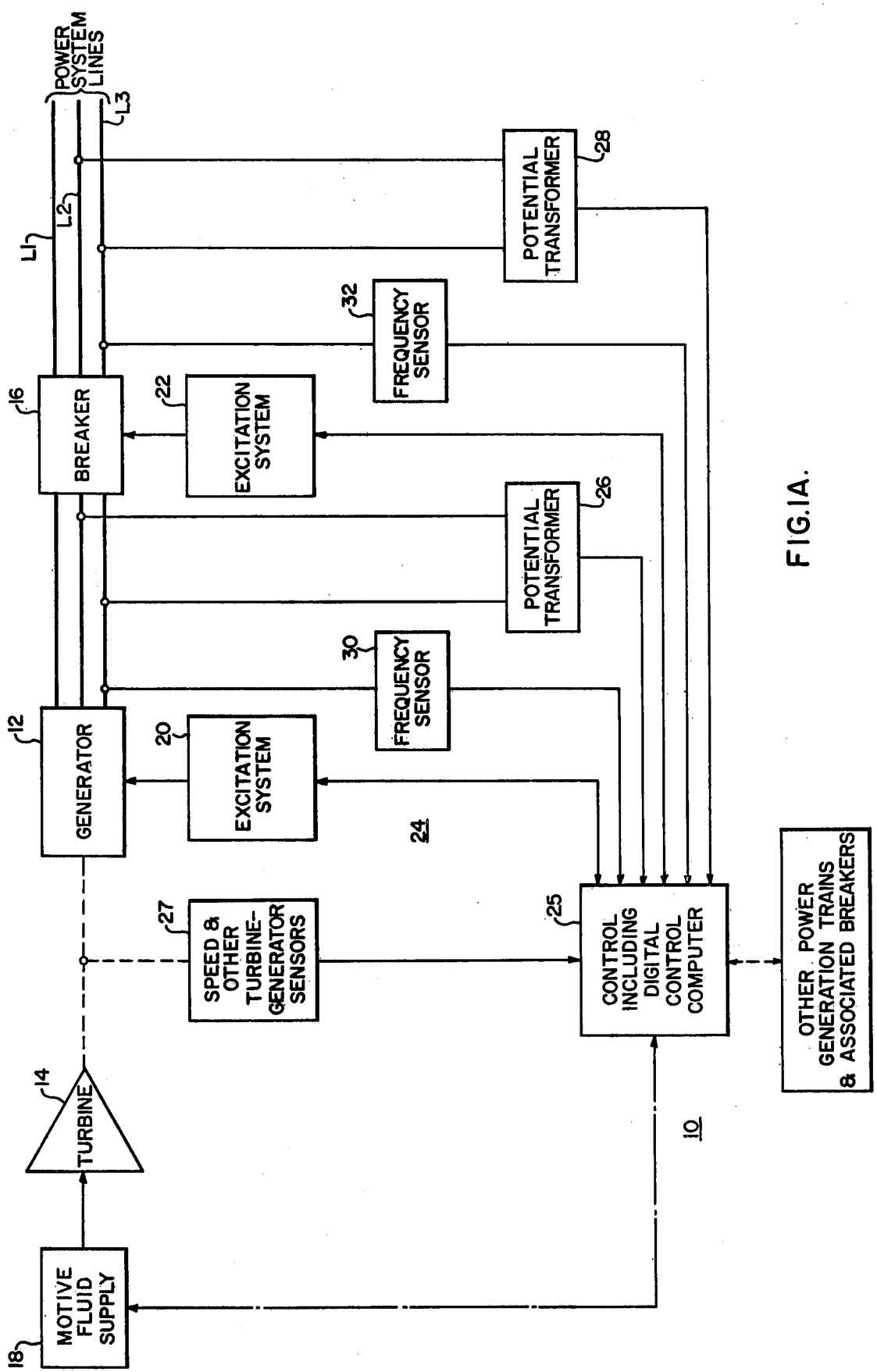
FIG. 1A shows a schematic arrangement of an electric power plant which is operated with automatic synchronization in accordance with the principles of the invention.

In FIG. 1A, there is shown a block diagram of an electric power plant 10 generally arranged in accordance with the principles of the invention. The electric power plant 10 includes an electric generator 12 driven by a prime mover 14 to produce electricity for delivery through a breaker 16 to a power system having in this case three phase lines L1, L2 and L3. The prime mover 14 is preferably a turbine or a combination of turbine elements operated by steam, combustion gas or other drive fluid obtained from a motive fluid supply 18. Simple, combined or other system cycle arrangements can be employed.

If steam is used, the fluid supply 18 can for example comprise a fossil fired boiler or a nuclear reactor system which produces the heat necessary to generate the cycle steam. If combustion gas is employed, an industrial gas turbine of the type subsequently described herein can be used to produce the air compression and the combination needed to generate the combustion gas products for turbine drive power.

The fluid supply 18 also includes any apparatus needed for setting the flow of motive fluid to the turbine 14. Thus, in the case of steam, the fluid supply 18 can include a steam valve system having individual valves which are placed under electrohydraulic position control. Such steam valve control can be of the analog type as set forth in a paper entitled "Electrohydraulic Control For Improved Availability And Operation Of Large Steam Turbines" presented by M. Birnbaum and E. G. Noyes to the ASME-IEEE National Power Conference at Albany, New York during Sept. 19–23, 1965 or the digital computer type described in the aforementioned applications Ser. No. 722,779 and 722,790. In the case of combustion gas, the fluid supply 18 can include a fuel valve system having individual gas, oil or other fuel valves placed under electroneumatic control in a manner such as that described subsequently herein.

An excitation system 20 is provided for controlling the flow of excitation current in the generator field winding. In this manner, the generator voltage can be varied for voltage matching with the system voltage during plant startup and synchronization. More detail is presented on generator excitation and its role in synchronization in accordance with the principles of the invention in connection with a particular gas turbine power plant subsequently described herein.

The breaker 16 is in this case a conventional three-phase breaker which is provided with a conventional operating control 22 including breaker closure means such as a closure relay. Closure of all three sets of breaker line contacts is achieved within a characteristic time period once a closure signal is applied to the closure relay.

Electric power plant operation and control is determined by a control system 24 which includes a programmed digital computer control system. The particular structure of the control system 24 can vary from application to application of the invention. Generally, the control system 24 includes power plant sensors and electronic control circuitry 25 having a digital control computer system and providing control signals for the operation of the generator 12, the turbine 14, and the breaker 26. Speed and other sensors associated with the turbine 14 and the generator 12 are generally indicated by block 27.

The division of control functions between the digital control computer system and other circuitry in the control 25 can differ from case to case. Normally, the control structurization involves determination of an interface between digital computer and external electronic analog or digital circuitry for each control function to be affected by the digital computer. Thus, as subsequently described more fully for the embodiment detailed herein, motive fluid flow for the described gas turbine is placed under the control of a hybrid arrangement in which speed control is implemented by a control loop closed through a controller which is placed under computer setpoint control and in which load control is implemented by a control loop closed through the computer itself. As another example, the control 25 may be characterized as including "direct" digital computer control loops for steam turbine speed and load as set forth in the aforementioned patent applications Ser. No. 722,779 and Ser. 722,790, or it may be structured simply to provide setpoint or supervisory control over closed electrohydraulic steam turbine speed and load loops of the type described in the aforementioned 1965 Birnbaum and Noyes paper. Numerous other variations are also possible in the organization of the control 25 for motive fluid flow control.

The capacity of the programmed digital computer is economically and efficiently employed in a digital computer synchronization system which forms an interacting subsystem part of the overall control system to provide accurate, reliable and fast synchronization required in the startup or reentry operation of the power plant 10 for power delivery to the power system. Advantages of computer flexibility and more extended or more convenient system integration or system integration possibilities are provided by the programmed digital computer as will become more evident in the description subsequently presented herein. As additionally considered more fully hereinafter, a hybrid arrangement of an analog generator and system phase difference detector circuit and the programmed digital computer is preferred for the execution of the synchronization function in the digital computer synchronization system.

Respective potential transformers 26 and 28 are employed to generate generator and system voltage waveforms for the phase difference detection needed for synchronization i.e. closure of the breaker 16 through the operating control 22 by the digital computer synchronization system. In the present case, it is preferred that generator and system frequency sensors 30 and 32 provide frequency signals to the control 25 for use in synchronization in a manner and for reasons related to computer sampling rate more fully considered subsequently herein.

In addition to synchronization, the programmed digital computer preferably provides for generator and system speed and voltage matching with efficient interaction through the main prime mover speed control loop and through the controls provided for the generator excitation system 20. If either the slip frequency is too great or the generator or system voltage is outside predetermined limits, synchronization is prevented by programmed computer operations.

In power plant applications where multiple generators are separately driven in separate power trains, synchronization control is provided by the digital computer either by multiplexing the computer with the respective breaker operating controls associated with the respective generator breakers or by providing parallel hardware control channels to the breaker operating controls for parallel functioning in response to programmed computer synchronization operations for all or any of the generators during the same or different synchronizing time periods. The detailed gas turbine electric power plant arrangement described herein employs the multiple plant synchronizing computer arrangement as well as other features including features like those described for the generalized electric power plant 10.

A. GAS TURBINE ELECTRIC POWER PLANT

1. General Structure

More particularly, there is shown in FIG. 1 a gas turbine electric power plant 100 which includes an AC generator 102 driven by a combustion or gas turbine 104 through a reduction gear unit 106. In this application of the invention, the gas turbine 104 is the W-251G simple cycle type manufactured by Westinghouse Electric Corporation. In other power plant generator applications, other industrial drive applications, and combined steam and gas cycle applications of various aspects of the invention, industrial gas turbines having larger of smaller power ratings, different cycle designs, different number of shafts or otherwise different from the W-251G can be employed.

Generally, the electric power plant 100 is designed to provide an economical solution to many types of power generation problems such as base or intermediate system low use factor. Thus, to meet power generator peaking requirements a single plant 100 or multiple plant units 100 can be purchased simultaneously or over a period of time to meet system power generation needs at relatively reduced investment cost. Another typical use of the plant 100 is where continuous power generation is desired and the exhaust heat from the gas turbine 104 is used for a particular purpose such as for feedwater heating, boilers, or economizers.

In addition to the advantage of relatively low investment cost, the plan 100 can be located relatively close to load centers as indicated by system requirements without need for a cooling water supply thereby advantageously producing a savings in transmission facilities. Further, the plant 100 can be unattended and automatically operated from a remote location.

Community acceptance of the plant 100 is enhanced by the use of inlet and exhaust silencers 108 and 110 which are coupled respectively to the inlet and exhaust ductworks 112 and 114. Fast startup and low standby costs are additional operating advantages characteristic to the plant 100. Among additional advantages, the major components of the plant 100 can be separately shipped to the plant site and site assembly can be completed with relatively simple connections since most plant piping, wiring and testing can be done at the factory.

The plant 100 is provided with an enclosure (not shown) in the form of a rigid frame-type sectional steel building. It comprises rigid structural steel frames covered by sectional type panels on the roof and the walls. The roof and wall construction is designed for minimum heat loss and minimum noise penetration while enabling complete disassembly when required.

The foundation for the plant 100 is approximately 106 feet long if a control station is provided for a single plant unit. The foundation length is increased to approximately 115 feet as indicated by the reference character 116 if space is provided for a master control station when up to three optional additional plant units are selected.

Digital computer and other control system circuitry in a cabinet 118 provides for operation of the power plant 100 when a single plant unit is selected by the user. An operator's panel 120 is associated with the control cabinet 118. In addition, an automatic send/receive printer 122 and a protective relay panel 124 for sensing abnormal electric power system conditions are associated with the control cabinet 118. The numbers of basic, master and slave units 118 through 124 required in the present application of the invention for up to four plants like the plant 100 are indicated by the following table:

| CONTROL ROOM OPTIONS | | | | | |
|---|---|---|---|---|---|
| Control Room For | Slave Units Served | Quantities Per Unit | | | |
| | | 124 | 118 | 122 | 120 |
| Basic Station One Unit | 0 | 1 | 1 | 1 | 1 |
| Master For Two Unit Station | 1 | 1 | 2 | 1 | 2 |
| Master For Three Unit Station | 2 | 1 | 2 | 1 | 3 |
| Master For Four Unit Station | 3 | 1 | 3 | 1 | 4 |
| Slave Unit | 0 | 1 | 0 | 0 | 0 |

Startup or cranking power for the plant 100 is provided by a starting engine 126 such as a diesel engine, a 600 HP diesel in the present case, or an electric induction motor unit. The starting engine 126 is mounted on an auxiliary bedplate and coupled to the drive shaft of the gas turbine 104 through a starting gear unit 128. A DC motor 154 operates through a turning gear 156 which is also coupled to the gas turbine shaft through the starting gear 128 to drive the gas turbine at turning gear speed for at least the first sixty hours of nonoperating periods, or longer if tubine disc cavity temperature is excessive, in order to avoid thermally induced shaft bowing.

A motor control center 130 is also mounted on the auxiliary bedplate and it includes motor starter and other devices to provide for operating the various auxiliary equipment items associated with the plant 100. Motor control center 130 breakers are front mounted and the breakers and motor starters are cable connected to a 480 volt power supply. Various signals from sensor or contact elements associated with the motor control center 130 and with other devices mounted on the auxiliary bedplate are transmitted for use in the control system as considered more fully in connection with FIG. 12.

A plant battery 132 is disposed adjacent to one end of the auxiliary bedplate or skid. A battery charger (FIG. 12) is also included and it is preconnected to the motor control center 130 through a breaker. The battery for example can be a heavy duty control battery of the type EHGS-17 EXIDE rated at 125 volts, 60 cells. In this case, the battery is capable of supplying adequate power for emergency lighting, auxiliary motor loads, and DC computer and other control power for 1 hour following shutdown of the plant 100 due to a loss of AC power.

More generally, the electrical power system for the plant 100 is designed to enable the plant 100 to operate without connection to the power system, or to operate by accepting auxiliary power and other connections from the power system. However, one boundary condition is that the plant 100 must have auxiliary power once it reaches synchronous speed for power generation. Thus, although the plant 100 can be started by use of the battery 132 and without auxiliary power, the requirement for auxiliary power at synchronous speed must be met. If desired, electrical systems of basic design different from that of the described system can be employed to provide auxiliary power for the plant 100.

One electrical system for the plant 100 is shown generally in FIG. 2. Once the plant 100 is in operation, the generator 102 transmits power to the power system through a generator breaker 132 and a 13.8 KV bus 134 to a main transformer 135 and a line breaker 137 to the power system. Auxiliary power for the plant 100 is obtained from the system through an auxiliary breaker 136 and an auxiliary power 480 volt bus 137. The generator breaker 132 serves as a synchronizing and protective disconnect device for the plant 100.

If a suitable 480 volt source is not available in the power system, an auxiliary power transformer 138 can be provided in another general system as shown in FIG. 3. A disconnect switch 140 is connected between the transformer 138 and the station 13.8 KV bus 134.

If a firm reliable source of auxiliary power cannot be provided from the system, the arrangement as shown in FIG. 3 can provide for black plant startup operation. With this arrangement, the gas turbine 104 may be started at any time, since the auxiliaries may be supplied from the generator 102 or from the system, whichever is energized. For a black start (with a dead system), the gas turbine 104 may be started at any time for availability as a spinning standby source even though the external system is not ready to accept power from the generator 102. Further, the plant 100 can be separated from a system that is in trouble without shutting the gas turbine 104 down. The breaker nearest the load would be tripped to drop the load and let the generator 102 continue to run and supply its own auxiliaries.

An additional advantages of the scheme shown in FIG. 3 is the protection provided if the connection to the system is vulnerable to a permanent fault between the gas turbine power plant 100 and the next breaker in the system. The line breaker 137 would be the clearing breaker in case of such a fault and the auxiliary system would remain energized from the generator 102 which would allow an orderly shutdown of the gas turbine 104 or continued operation as standby.

The arrangement of FIG. 3 is used if the gas turbine 104 is programmed to start in the event of system low voltage or decaying frequency. Automatic startup brings the turbine 104 up to speed, closes the generator breaker 132 and supplies power to the auxiliary load. The turbine-generator unit would then be running and would be immediately available when desired. The arrangement of FIG. 3 is also used if the turbine 104 is running and the system under-frequency or under-voltage signals is used to separate the gas turbine 104 from the system.

A switchgear pad 142 is included in the plant 100 for 15 KV switchgear including the generator breaker as indicated by the reference characters 144, 146, and 148. The auxiliary power transformer 138 and the disconnect switch 140 are also disposed on the switchgear pad 142 if they are selected for use by the user. Excitation switchgear 150 associated with the generator excitation system is also included on the switchgear pad 142. The control system also accepts signals from certain sensor or contact elements associated with various switchgear pad devices.

A pressure switch and gauge cabinet 152 is also included on the auxiliary skid. The cabinet 152 contains the pressure switches, gauges, regulators and other miscellaneous elements needed for gas turbine operation.

A turbine high pressure cooling system includes a radiator air-to-air cooler designed for ambients up to 100° F with the use of a pair of dual speed fans. The radiator is associated with the necessary interconnecting piping to obtain high pressure compressor outlet air and to transmit the cooled pressurized air the the turbine parts.

A radiator-type air-to-oil cooler is employed for lubrication oil cooling. It is designed for ambients from 0° to 105° F and it also employs a dual speed fan. Generally, a shaft driven main lubricating oil pump supplies lubricating oil when the plant 100 is running. A DC motor driven auxiliary lubricating oil pump supplies sufficient oil for starting and stopping. To safeguard against loss of lubricating oil, the starting equipment is interlocked so that the plant 100 cannot be started under power without lubricating oil pressure. Further, during run operations the auxiliary lubricating oil pump starts automatically if the lubricating oil pressure becomes dangerously low. Th auxiliary pump then serves to bring the gas turbine-generator unit to a standstill in the event the main lubricating oil pump has had a failure. The following list includes the main auxiliaries employed or optionally employed in the plant 100:

|  | Rating, HP | |
|---|---|---|
| A-C Drives 440 Volt, 3 Phase, 60 Cycle | Fuel Oil | Gas |
| 1) Lube oil cooler fan (2 speed) | 25 | 25 |
| 2) Instrument air compressor | 1.5 | 1.5 |
| 3) Turbine enclosure exhaust fan | 2-2 | 2-2 |
| 4) Turbine cooling air heat exchanger fan (2 speed) | 2-5 | 2-5 |
| 5) Lube oil circulating pump | 20 | 20 |
| 6) Evaporative cooler (optional) | 10 | 10 |
| 7) Vapor extractor for lube | ½ | ½ |
| Oil Fuel System, A-C Motors | | |
| 1) Fuel oil (storage tank to unit) tranfer pump (optional) | 5 | — |
| 2) Atomizing air compressor | 5 | |
| 3) | | |
| D-C Drives — 125 Volts | | |
| 1) Auxiliary lube oil pump | 10 | 10 |
| 2) Turning gear | 5 | 5 |
| 3) Fuel oil (storage tank to unit) transfer pump (optional) | 5 | — |
| 4) Static inverter | 3 KVA | |
| Heaters - 440 Volt, 3 Phase, 60 Cycle | | |
| 2) Generator and Exciter space heaters | 9 KW | |
| 2) Building unit heaters (normal minimum ambient) | 10 KW | |
| 3) Lube oil heater | 18 KW | |
| 4) Diesel starter jacket water heater | 2½ KW | |
| Controls - 125 Volt D-C | 1 KW | |

The switchgear 144, 146 and 148 and the auxiliary protection and control elements include, or optionally include, the following:
1. 15 KV HVMC Switchgear
    a. 15 KV Switchgear with the following equipment:
    Generator breaker type 150DHP500, 2000A.
    Non-segregated phase bus, generator to switchgear.
    Auxiliary unit for PRX regulator.
    3 — 2000/5 CT's for generator differential protection.
    3 — 2000/5 CT's for relaying or metering.
    3 — Type SV lightning arresters.
    3 — Type FP capacitors.
    2 — 14400/120V PT's for metering, relaying and synchronizing (generator).
    2 — 14400/120V PT's for synchronizing (line side).
    2 — 14400/120V PT's for voltage regulator.
    Provisions for outgoing conduit for cable to system.
    2 — 1500 MCM per phase (out top or bottom).
    b. Optional 15 KV switchgear items.
    750 2000A type DHP ACB for generator breaker (in place of 150DHP500).
    1 — 2000/5 CT for regulator compensation.
    Type DFS fused switch for auxiliary power transformer supply.
    Provisions for connecting to system (in place of 1-a, Item 12).
       Bus duct out top.
       Roof bushings out top.
       Type 150 DHP 500 line side breaker.
       Type 150 DHP 750 line side breaker.
       Bus ground fault relay system.
       Tropicalization treatment.
2. Generator Protection
    a. The basic generator protection equipment includes the following items:
    SA-1 generator differential.
    COQ negative sequence.
    CW reverse power.
    2 — WL lockout relay.
    COV voltage controlled overcurrent.
    CV-8 generator ground relay.
    b. Optional Protection Items
    CFVB voltage balance relay.
    Unit differential relay.
       HU
       HU-1
    WL lockout for use with 3-b, Item 2.
    Neutral grounding reactor.
       10 second rating
       1 minute rating
    CO-8 neutral ground (for use with grounding reactor)
    2 Additional COV voltage controlled relays.
    CV-7 over-under voltage relay (generator).
    CV-7 over-under voltage relay (system).
    KF underfrequency relay (generator).
    KF underfrequency relay (system).
3. Auxiliary System
    a. Motor control center with provisions for accepting auxiliary power at 480V—60 Hertz from plant source or customer source. The 125V D-C is supplied from the plant battery. The motor control center is complete with the following:
    Incoming main breaker A-C.
    Individual fused control circuits.
    Common control power transformer.
    Type II-C wiring.
    A-C starters for the following functions:
       Air cooler fan high.
       Air cooler fan low.
       Lube oil cooler fan two speed.
       Lube oil heater.
       Diesel jacket heater.
       Generator space heater.
       Lube oil circulating pump.
       Control air compressor.
       Building heaters (2).
       Vent fans (2).
       Inlet heater.
       Vapor extractor.
    Battery charger breaker.
    Distribution panelboard A-C 120/240V.
    Incoming breaker D-C.
    D-C starters for the following functions:
       Lube oil pump.
       Turning gear.
       Fuel transfer pump.
    Distribution panelboard D-C 125 V.
    b. Motor control center options Starters for the following:
    Evaporative cooler pump.
    Fuel oil transfer pump.
    Atomizing air compressor.
    Spare
    Main transformer auxiliary feeder breaker.
    Yard lighting feeder breaker.
    c. Miscellaneous auxiliary options Auxiliary transformer 13.8 KV/480—2777V, to be supplied from HVMC fused switch option, with the following ratings:
       150 KVA 225 KVA
500 KVA
750 KVA
PT's for 480 volt bus metering (WHM and volts).
CT's for 480 volt bus metering (WHM and amps).
LVME switchgear for auto-transfer from system to station 480 volt power.

2. Generator and Exciter

Figure 4:
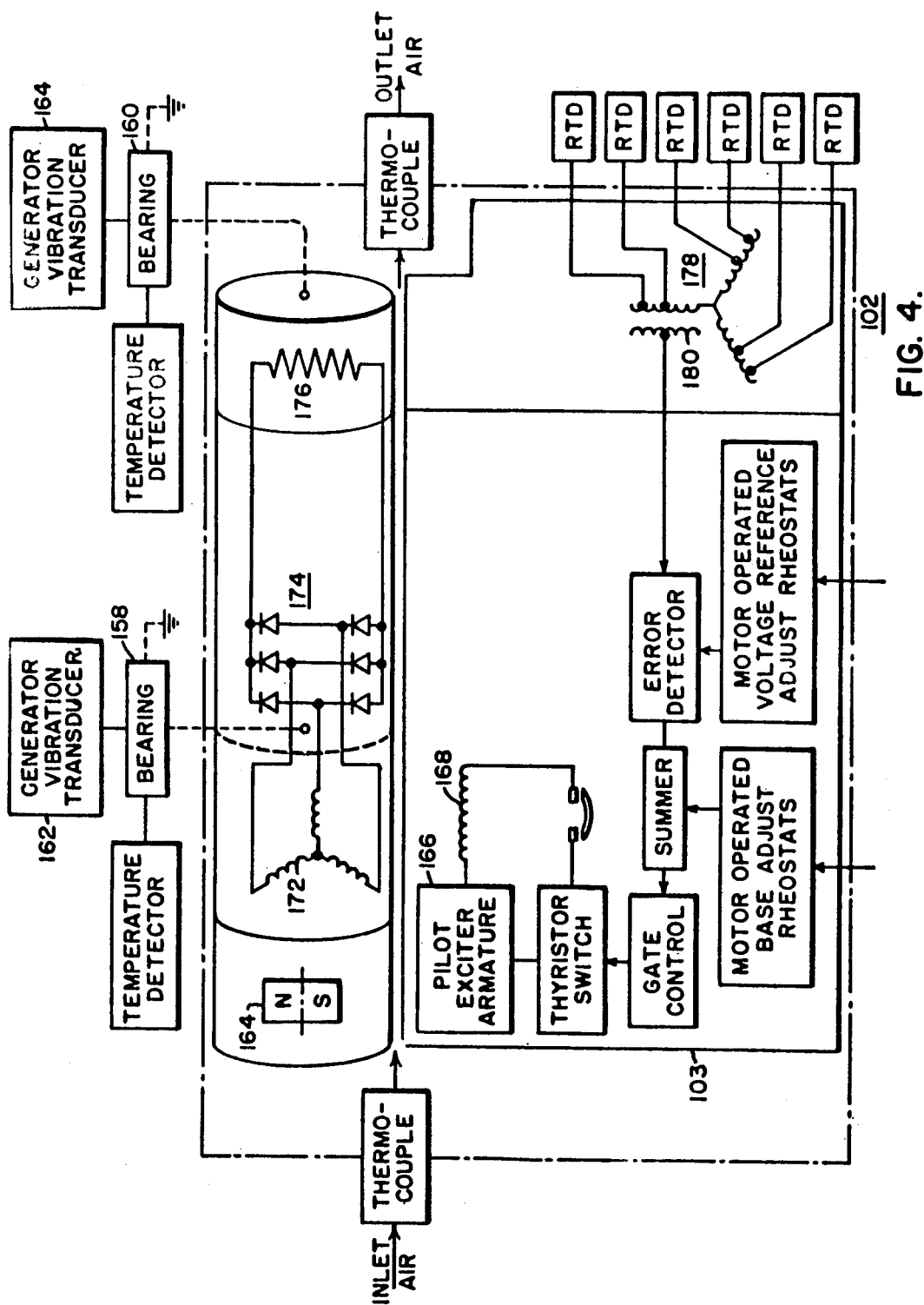
FIG. 4 shows a schematic view of a rotating rectifier exciter and a generator employed in the gas turbine power plant of FIG. 1.

The generator 102 and its brushless exciter 103 are schematically illustrated in greater detail in FIG. 4. The rotating elements of the generator 102 and the exciter 103 are supported by a pair of bearings 158 and 160. Conventional generator vibration transducers 162 and 164 are coupled to the bearings 158 and 160 for the purpose of generating input data for the plant control system. Structurally, the generator 102 and the exciter 103 are air cooled and located within an enclosure with suitable ventilation and heating to provide for proper equipment protection. Filtered outside air is drawn through the enclosure by shaft mounted axial flow blowers to cool the equipment. Generator space heaters are sized correctly for the installation environment to prevent condensation during shutdown. A grounding distribution transformer with secondary resistors (not indicated) is provided to ground the generator neutral.

Resistance temperature detectors (six in this case) are embedded in the stator winding and thermocouples are installed to measure the air inlet and discharge temperatures and the bearing oil drain temperatures as indicated in FIG. 4. Signals from all of the temperature sensors and the vibration transducers 162 and 164 are transmitted to the control system. Thermocouples (not indicated in FIGS. 1 or 4) associated with the reduction gear 106 similarly generate bearing temperature signals which are transmitted to the control system.

In operation of the exciter 103, a permanent magnet field member 164 is rotated to induce voltage in a pilot exciter armature 166 which is coupled to a stationary AC exciter field 168 through a voltage regulator 170. Voltage is thereby induced in an AC exciter armature 172 formed on the exciter rotating element and it is applied across diodes mounted with fuses on a diode wheel 174 to energize a rotating field element 176 of the generator 102. Generator voltage is induced in a stationary armature winding 178 which supplies current to the power system through a generator breaker when the plant 100 is synchronized and on the line. A transformer 180 supplies a feedback signal for the regulator 170 to control the excitation level of the exciter field 168.

Generally, the rotating rectifier exciter 103 operates without the use of brushes, slip rings, and external connections to the generator field. Brush wear, carbon dust, brush maintenance requirements and brush replacement are thereby eliminated.

All power required to excite the generator field 176 is delivered from the exciter-generator shaft. The only external electrical connection is between the stationary exciter field 168 and the excitation switchgear 150 (FIG. 1).

All of the exciter parts are supported by the main generator 102. In particular, the rotating parts of the exciter 103 are overhung from the main generator shaft to eliminate the need for exciter bearings and to smooth the operation. The generator rotor can be installed and withdrawn without requiring removal of the exciter rotor from the generator shaft.

The brushless excitation system regulator 170 responds to average three phase voltage with frequency insensitivity in determining the excitation level of the bushless exciter field 168. If the regulator 170 is disconnected, a motor operated base adjust rheostat 171 is set by a computer output signal. The rheostat output is applied through a summing circuit 173 to a thyristor gate control 175. If the regulator 170 is functioning, the base adjust rheostat is left in a preset base excitation position, and a motor operated voltage reference adjust rheostat 177 is computer adjusted to provide fine generator voltage control.

An error detector 179 applies an error output to the summing circuit 173 as a function of the difference between the computer output reference and the generator voltage feedback signal. The summing circuit 173 adds the error signal and the base rheostat signal in generating the output which is coupled to the gate control 175. In the error detector 179, the reference voltage is held substantially constant by the use of a temperature compensated Zener diode. In the gate control 175, solid state thyristor firing circuitry is employed to produce a gating pulse variable from 0° to 180° with respect to the voltage supply to thyrsistors or silicon controlled rectifiers 185.

The silicon controlled rectifiers 185 are connected in an inverter bridge configuration which provides both positive and negative voltage for forcing the exciter field. However, the exciter field current cannot reverse. Accordingly, the regulator 170 controls the excitation level in the exciter field 168 and in turn the generator voltage by controlling the cycle angle at which the silicon controlled rectifiers 185 are made conductive in each cycle as level of the output from the gate control 175.

3. Gas Turbine a. Compressor

Figure 5:
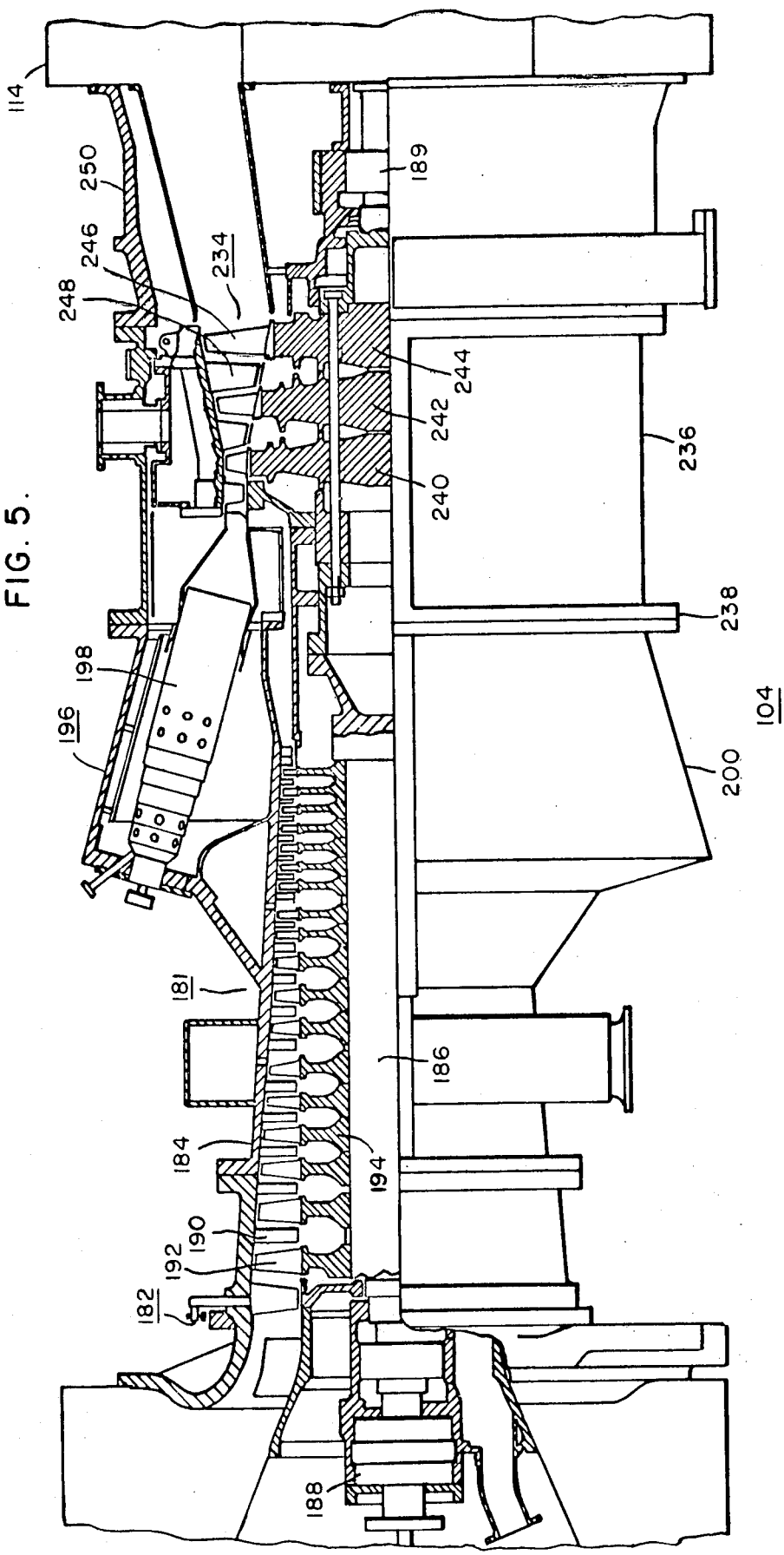
FIG. 5 shows a front elevational view of an industrial gas turbine employed in the power plant to drive the generator and it is shown with some portions thereof broken away.

The gas turbine 104 in this case is the single shaft simple cycle type having a standard ambient pressure ratio of 9.0 to 1 and a rated speed of 4894 rpm and it is illustrated in greater detail in FIG. 5. Filtered inlet air enters a multistage axial flow compressor 181 through a flanged inlet manifold 183 from the inlet ductwork 112. An inlet guide vane assembly 182 includes vanes supported across the compressor inlet to provide for surge prevention particularly during startup. The angle at which all of the guide vanes are disposed in relation to the gas stream is uniform and controlled by a pneumatically operated positioning ring coupled to the vanes in the inlet guide vane assembly 182.

The compressor 181 is provided with a casing 184 which is split into base and cover parts along a horizontal plane. The turbine casing structure including the compressor casing 184 provides support for a turbine rotating element including a compressor rotor 186 through bearings 188 and 189. Vibration transducers (FIG. 12) similar to those described in connection with FIG. 4 are provided for the gas turbine bearings 188 and 189.

The compressor casing 184 also supports stationary blades 190 in successive stationary blade rows along the air flow path. Further, the casing 184 operates as a pressure vessel to contain the air flow as it undergoes compression. Bleed flow is obtained under valve control from intermediate compressor stages to prevent surge during startup.

Figure 12:
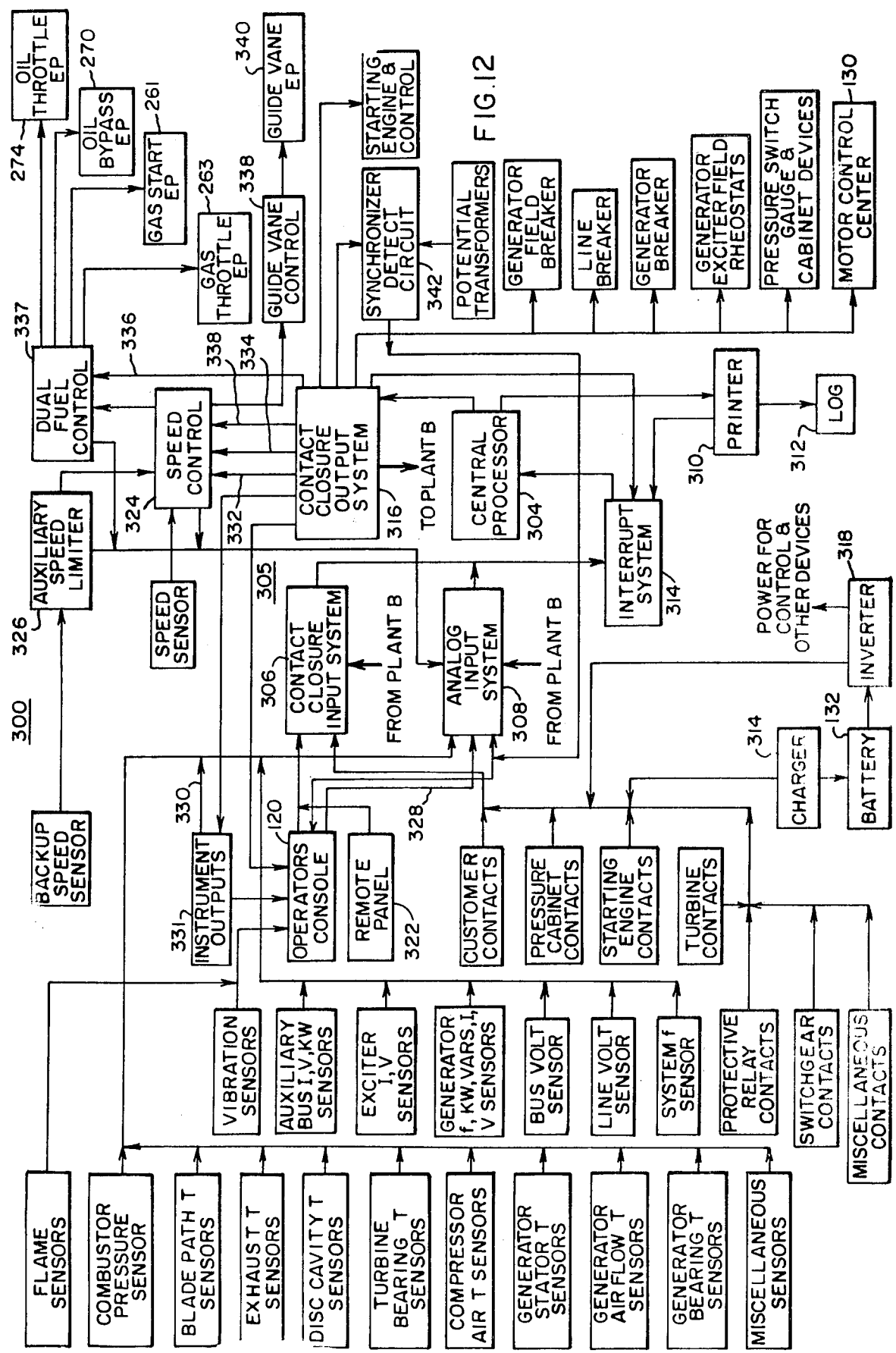
FIG. 12 shows a block diagram of a digital computer control system employed to operate the gas turbine power plant of FIG. 1.

The compressor inlet air flows annularly through a total of eighteen stages in the compressor 181. Blade 192 mounted on the rotor 186 by means of wheels 194 are appropriately designed from an aerodynamic and structural standpoint for the intended service. A suitable material such as 12% chrome steel is employed for the rotor blades 192. Both the compressor inlet and outlet air temperatures are measured by suitably supported thermocouples (FIG. 12).

b. Combustion System

Pressurized compressor outlet air is directed into a combustion system 196 comprising a total of eight combustor baskets 198 concially mounted within a section 200 of the casing 184 about the longitudinal axis of the gas turbine 104. Combustor shell pressure is detected by a suitable sensor (FIG. 12) coupled to the compressor-combustor flow paths located in the pressure switch and gauge cabinet 152.

As schematically illustrated in FIG. 6, the combustor baskets 198 are cross-connected by cross-flame tubes 202 for ignition purposes. A computer sequenced ignition system 204 inludes igniters 206 and 208 associated with respective groups of four combustor baskets 198. In each basket group, the combustor baskets 198 are series cross-connected and the two groups are cross-connected at one end only as indicated by the reference character 210.

Generally, the ignition system 204 includes an ignition transformer and wiring to respective spark plugs which form a part of the igniters 206 and 208. The spark plugs are mounted on retractable pistons within the igniters 206 and 208 so that the plugs can be withdrawn from the combustion zone after ignition has been executed.

A pair of ultraviolet flame detectors 212 are associated with each of the end combustor baskets in the respective basket groups in order to verify ignition and continued presence of combustion in the eight combustor baskets 198. Redundancy is flame sensing capability is especially desirable because of the hot flame detector environment.

The flame detectors 212 can for example be Edison flame detectors Model 424-10433. Generally, the Edison flame detector respons to ultraviolet radiation at wavelengths within the range of 1900–2900 Angstroms which are produced in varying amounts by ordinary combustor flames but not in significant amounts by other elements of the combustor basket environment. Detector pulses are generated, integrated and amplified to operate a flame relay when a flame is present. Ultraviolet radiation produces gap voltage breakdown which causes a pulse train. The flame monitor adds time delay before operating a flame relay if the pulse train exceeds the time delay.

In FIG. 7, there is shown a front plan view of a dual fuel nozzle mounted at the compressor end of each combustor basket 198. An oil nozzle 218 is located at the center of the dual nozzle 216 and an atomizing air nozzle 220 is located circumferentially about the oil nozzle 218. An outer gas nozzle 222 is disposed about the atomizing air nozzle 220 to complete the assembly of the fuel nozzle 216.

As indicated in the broken away side view in FIG. 8, fuel oil or other liquid fuel enters the oil nozzle 218 through a pipe 224 while atomizing air for the fuel oil enters a manifolded pipe arrangement 226 through entry pipe 228 for flow through the atomizing air nozzle 220. Gaseous fuel is emitted through the nozzle 222 after flow through entry pipe 230 and a manifolded pipe arrangement 232.

c. Fuel

Generally, either liquid or gaseous or both liquid and gaseous fuel flow can be used in the turbine combustion process. Various gaseous fuels can be burned including gases ranging from blast furnace gas having low BTU content to gases with high BTU content such as natural gas, butane or propane. However, gas with a heat content greater than 500 BTU per scf (LHV) should be burned with the standard combustion system equipment while lower BTU value gases should be used with special techniques in the fuel handling system and the combustion system.

To prevent condensable liquids in the fuel gas from reaching the nozzles 216, suitable traps and heaters can be employed in the fuel supply line. The maximum value of dust content is set at 0.01 grains per standard cubic foot to prevent excess deposit and erosion. Further corrosion is minimized by limiting the fuel gas sulphur content in the form of $H_2S$ to a value no greater than 5% (mole percent).

With respect to liquid fuels, the fuel viscosity must be less than 100 SSU at the nozzle to assure proper atomization. Most distillates meet this requirement. However, most crude oils and residual fuels will require additive treatment to meet chemical specifications even if the viscosity specification is met. To prevent excess blade deposition, liquid fuel ash content is limited to maximum values of corrosive constituents including vanadium, sodium, calcium and sulphur.

A portion of the compressor outlet air flow combines with the fuel in each combustor basket 198 to produce combustion after ignition and the balance of the compressor outlet air flow combines with the combustion products for flow through the combustor baskets 198 into a multistage reaction type turbine 234 (FIG. 5). The combustor casing section 200 is coupled to a turbine casing 236 through a vertical casing joint 238. No high pressure air or oil seal is required between the compressor 181 and the turbine 234.

d. Turbine Element

The turbine 234 is provided with three reaction stages through which the multiple stream combustion system outlet gas flow is directed in an annular flow pattern to transform the kinetic energy of the heated, pressurized gas turbine rotation, i.e. to drive the compressor 181 and the generator 102. The turbine rotor is formed by a stub shaft 240 and three disc blade assemblies 240, 242 and 244 mounted on the stub shaft by through bolts. Thermocouples (FIG. 12) are supported within the disc cavities to provide cavity temperature signals for the control system.

High temperature alloy rotor blades 246 are mounted on the discs in forming the disc assemblies 240, 242 and 244. Individual blade roots are cooled by air extracted from the outlet of the compressor 181 and passed through a coolant system in the manner previously indicated. The blade roots thus serve as a heat sink for the rotating blades 246. Cooling air also flows over each of the turbine discs to provide a relatively constant low metal temperature over the unit operating load range.

The two support bearings 188 and 189 for the turbine rotating structure are journal bearings of the split-shell babbitt lined type. The bearing housings are external to the casing structure to provide for convenient accessibility through the inlet and exhaust ends of the structure. The overall turbine support structure provides for free expansion and contraction without disturbance to shaft alignment.

In addition to acting as a pressure containment vessel for the turbine 234, the turbine casing 236 supports stationary blades 248 which form three stationary blade rows interspersed with the rotor blade rows. Gas flow is discharged from the turbine 234 substantially at atmospheric pressure through a flanged exhaust manifold 250 to the outlet ductwork 114.

The generator and gas turbine vibration transducers (FIG. 12) can be conventional velocity transducers or pickups which transmit basic vibration signals to a vibration monitor for input to the control system. For example, the Reliance Vibration Monitor Model 2000 can be employed with three Reliance Model 028F velocity transducers and a CEC Model 4-122 High Temperature velocity transducer (for the hot exhaust bearing 189). A pair of conventional speed detectors (FIGS. 12 and 20) are associated with a notched magnetic wheel (FIG. 20) supported at appropriate turbine-generator shaft locations. Signals generated by the speed detectors are employed in the control system in determining power plant operation.

Thermocouples (FIG. 12) are associated with the gas turbine bearing oil drains. Further, thermocouples (FIG. 12) for the blade flow path are supported about the inner periphery of the exhaust manifold 250 to provide a fast response indication of blade temperature for control system usage particularly during plant startup periods. Exhaust temperature detectors (FIG. 12) are disposed in the exhaust ductwork 114 primarily for the purpose of determining average exhaust temperature for control system usage during load operations of the power plant 100. Suitable high response shielded thermocouples for the gas turbine 104 are those which use compacted alumina insulation with a thin-wall high alloy swaged sheath or well supported by a separate heavy wall guide.

e. Fuel System

Figure 9:
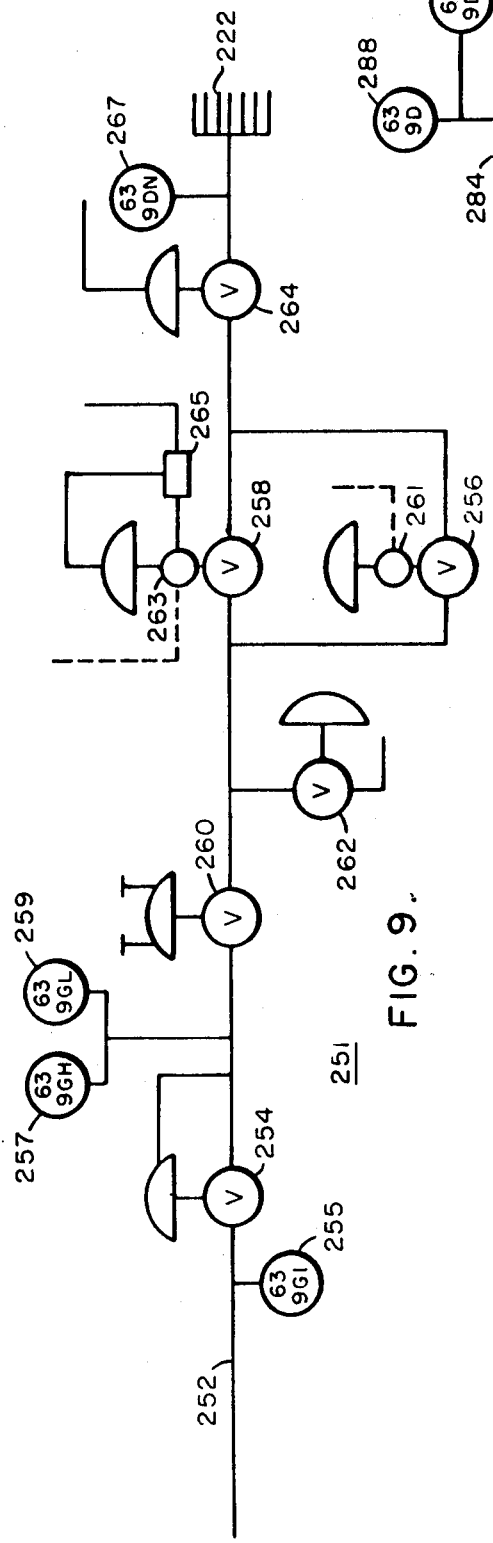
FIGS. 9 and 10 respectively show schematic diagrams of gas and liquid fuel supply systems employed with the gas turbine of FIG. 5.

A fuel system 251 is provided for delivering gaseous fuel to the gas nozzles 222 under controlled fuel valve operation as schematically illustrated in FIG. 9. Gas is transmitted to a diaphragm operated pressure regulating valve 254 from the plant gas source. A pressure swtich 255 provides for transfer to oil fuel at a low gas pressure limit. Pressure switches 257 and 259 provide high and low pressure limit control action on the downstream side of the valve 254. It is noted at this point in the description that IEEE switchgear device numbers are generally used herein where appropriate as incorporated in American Standard C37.2-1956.

A starting valve 256 determines gas fuel flow to the nozzle 222 at turbine speeds up to approximately 10% rated flow, and for this purpose it is pneumatically positoned by an electropneumatic converter 261 in response to an electric control signal. At gas flow from 10% to 100% rate, a throttle valve 258 determines gas fuel flow to the nozzles 222 under the pneumatic positioning control of an electropneumatic converter 263 and a pneumatic pressure booster relay 265. The converter 263 also responds to an electric control signal as subsequently more fully considered.

A pneumatically operated trip valve 260 stops gas fuel flow under mechanical actuation if turbine overspeed reaches a predetermined level such as 110% rated speed. A pneumatically operated vent valve 262 allows trapped gas to be vented to the atmosphere if the trip valve 260 and an on/off pneumatically operated isolation valve 264 are both closed. The isolation valve fuel control action is initiated by an electric control signal applied through the pressure switch and gauge cabinet 152 (FIG. 1 and FIG. 12). A pressure switch 267 indicates fuel pressure at the inlet to the nozzles 222.

Figure 10:
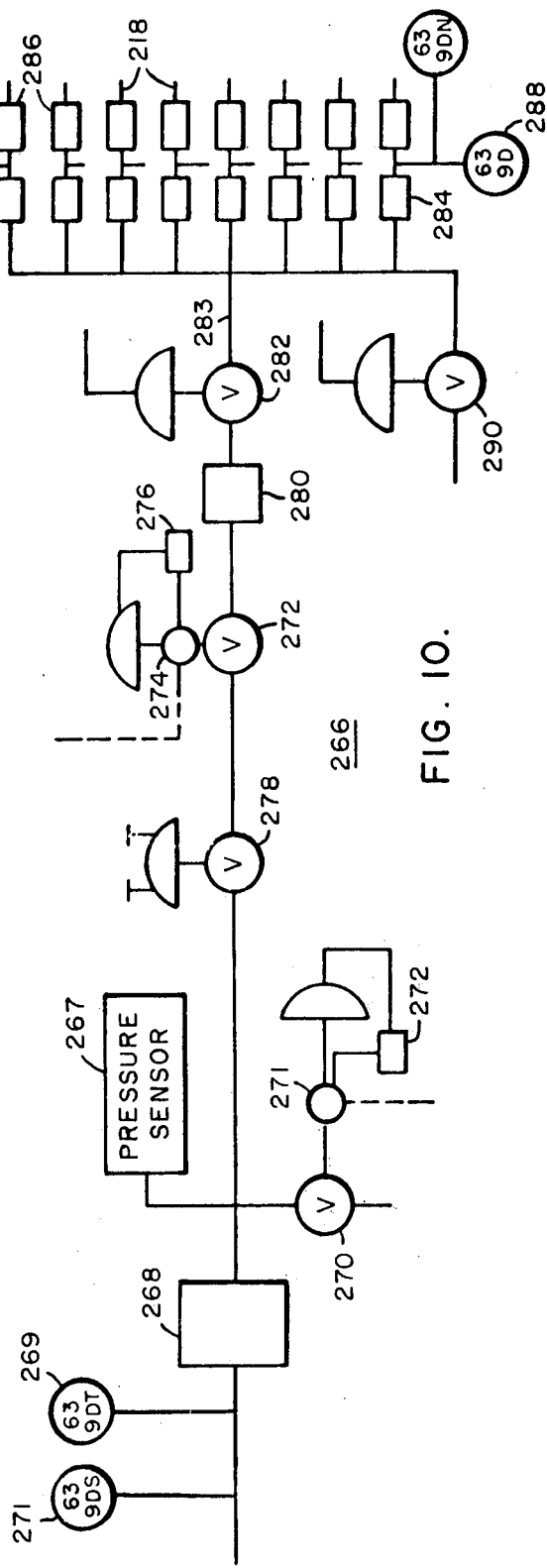

As schematically shown in FIG. 10, a liquid fuel supply system 266 provides for liquid fuel flow to the eight nozzles 218 from the plant source through piping and various pneumatically operated valves by means of the pumping action of a turbine shaft driven main fuel pumped 268. Pump discharge pressure is sensed for control system use by a detector 269. A bypass valve 271 is pneumatically operated by an electropneumatic converter 270 and a booster relay 272 to determine liquid fuel bypass flow to a return line and thereby regulate liquid fuel discharge presusre. An electric control signal provides for pump discharge pressure control, and in particular it provides for ramp pump discharge pressure control during turbine startup. A throttle valve 272 is held at a minimum position during the ramp pressure control action on the discharge pressure regulator valve 270. A pressure switch 269 provides for DC backup pump operation on low pressure, and a pressure switch 271 indicates whether the pump 268 has pressurized intake flow.

After pressure ramping, the pneumatically operated throttle valve 272 is positioned to control liquid fuel flow to the nozzles 218 as determined by an electropneumatic converter 274 and a booster relay 276. An electric control signal determines the converter position control action for the throttle valve 272. The bypass valve 270 continues to operate to hold fuel discharge pressure constant.

As in the gas fuel system 251, a mechanically actuated and pneumatically operated overspeed trip valve 278 stops liquid fuel flow in the event of turbine overspeed. A suitable filter 280 is included in the liquid fuel flow path, and, as in the gas fuel system 251, a electrically actuated and pneumatically operated isolation valve provides on/off control of liquid fuel flow to a liquid manifold 283.

Eight positive displacement pumps 284 are respectively disposed in the individual liquid fuel flow paths to the nozzles 218. The pumps 284 are mounted on a single shaft and they are driven by the oil flow from the manifold 283 to produce substantially equal nozzle fuel flows. Check valves 286 prevent back flow from the nozzles 218 and a pressure switch 288 indicates fuel pressure at the oil nozzles 218. A manifold drain valve 290 is pneumatically operated under electric signal control during turbine shutdown to drain any liquid fuel remaining in the manifold 283.

B. POWER PLANT OPERATION AND CONTROL

1. General

The power plant 100 is operated under the control of an integrated turbine-generator control system 300 which is schematically illustrated in FIG. 12. In its preferred embodiment, the control system 300 employs analog and digital computer circuitry to provide reliable hybrid gas turbine and gas turbine power plant control and operation. The plant control system 300 embraces elements disposed in the control cabinet 118, the pressure switch and gauge cabinet 152 and other elements included in the electric power plant 100 of FIG. 1. If multiple plants like the power plant 100 are to be operated, the control system 300 further embraces any additional circuitry needed for the additional plant operations.

The control system 300 is characterized with centralized system packaging. Thus, the control cabinet 118 shown in FIG. 1 houses an entire speed/load control package, an automatic plant sequencer package, and a systems monitoring package. As previously considered, up to four turbine generator plants can be operated by the centralized control system 300 and such operation is provided with the use of a single computer main frame. A second control cabinet is required if two or three plants are controlled and a third control cabinet is required if four plants are placed under controlled operation as previously considered in connection with FIG. 1. Generally, the control cabinet package is factory prewired and it and field interconnecting cables are completely checked and calibrated at the factory.

As a further benefit to the plant operator, turbine and generator operating functions are included on a single operator's panel in conformity with the integrated turbine-generator plant control provided by the control system 300. Final field calibration is facilitated by calibration functions for control system variables which can be selectively displayed on the operator's panel. System troubleshooting is facilitated by maintenance functions provided on the operator's panel.

The control system 300 provides automatically, reliably and efficiently sequenced start-stop plant operation, monitoring and alarm functions for plant protection and accurately, reliably and efficiently performing speed/load control during plant startup, running operation and shutdown. The plant operator can selectively advance the turbine start cycle through discrete steps by manual operation and, more generally, can obtain a wide variety of plant management benefits through the operator/control system interfaces subsequently considered more fully.

Under automatic control, the power plant 100 can be operated under local operator control or it can be unattended and operated by direct wired remote or supervisory control. Further, the plant 100 is started from rest, accelerated under accurate and efficient control to synchronous speed preferably in a normal fixed time period to achieve in the general case extended time between turbine repairs, synchronized manually or automatically with the power system and loaded under preferred ramp control to a preselectable constant or temperature limit controlled load level thereby providing better power plant management.

In order to start the plant 100, the control system 300 first requires certain status information generated by operator switches, temperature measurements, pressure switches and other sensor devices. Once it is logically determined that the overall plant status is satisfactory, the plant startup is initiated under programmed computer control. Plant devices are started in parallel whenever possible to increase plant availability for power generation purposes. Under program control, completion of one sequence step generally initiates the next sequence step unless a shutdown alarm occurs. Plant availability is further advanced by startup sequencing which provides for multiple ignition attempts in the event of ignition failure.

The starting sequence generally embraces starting the plant lubrication oil pumps, starting the turning gear, starting and operating the starting engine to accelerate the gas turbine 104 from low speed, stopping the turning gear, igniting the fuel in the combustion system at about 20% speed, accelerating the gas turbine to about 60% speed and stopping the starting engine, accelerating the gas turbine 104 to synchronous speed, and loading the power after generator breaker closure. During shutdown, fuel flow is stopped and the gas turbine 104 undergoes a deceleration coastdown. The turning gear is started to drive the turbine rotating element during the cooling off period.

2. Control Loop Arrangement — Without Hardware/Software Defininition

Figure 13C:
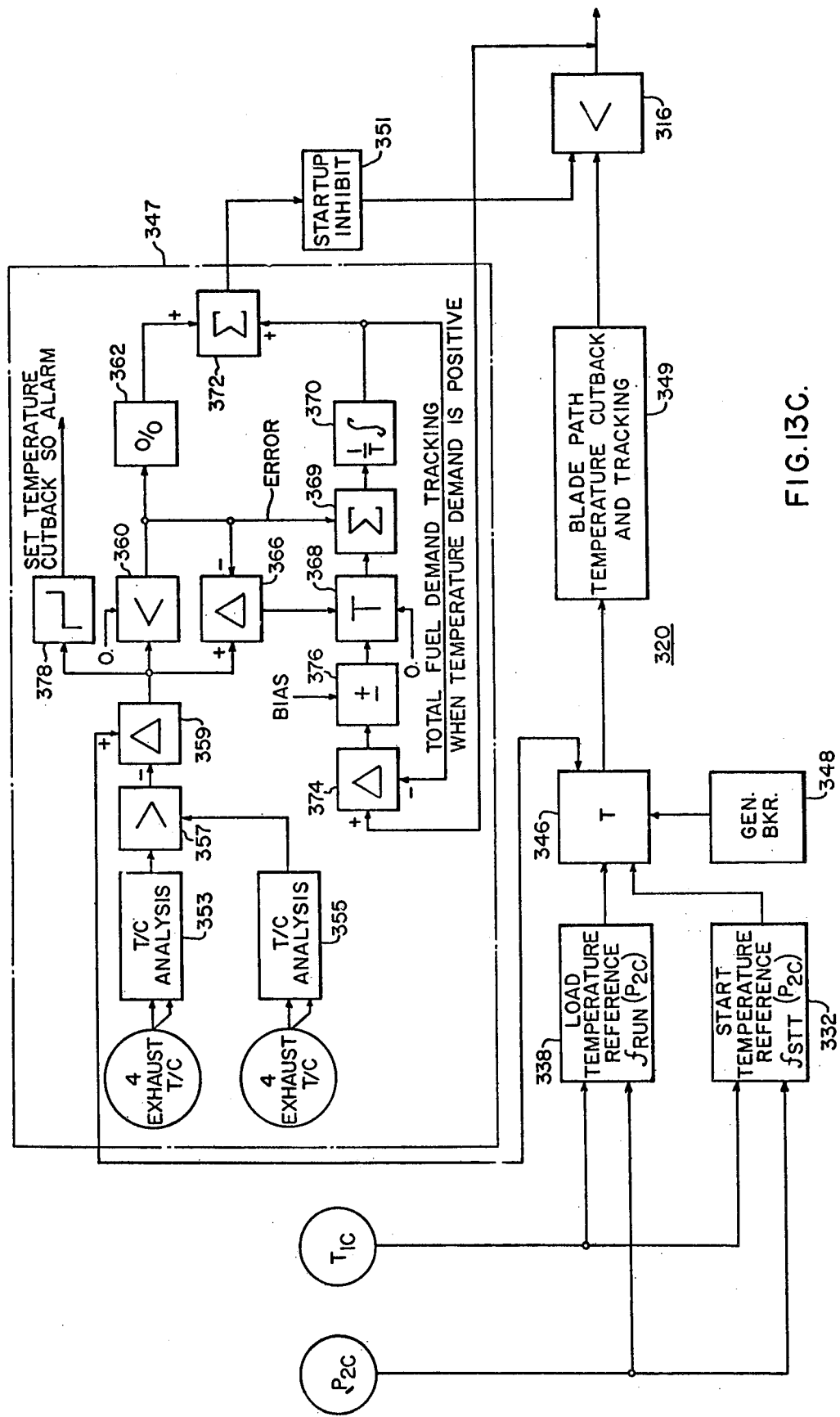

A control loop arrangement 302 shown in FIG. 13A provides a representation of the preferred general control looping embodied in the preferred control system and applicable in a wide variety of other applications of the invention. Protection, sequencing, more detailed control functioning and other aspects of the control system operation are subsequently considered more fully herein. In FIGS. 13A–D, SAMA standard function symbols are employed.

The control loop arrangement 302 comprises an arrangement of blocks in the preferred configuration of process control loops for use in operating the gas turbine power plant 100 or other industrial gas turbine apparatus. No delineation is made in FIG. 13A between hardware and software elements since many aspects of the control philosophy can be implemented in hard or soft form. However, it is noteworthy that various advantages are gained by hybrid software/hardware implementation of the control arrangement 302 and preferably by implementation in the hybrid form represented by the control system 300.

Generally, a feedforward characterization is preferably used to determine a representation of fuel demand needed to satisfy speed requirements. Measured process variables including turbine speed, the controlled load variable or the plant megawatts, combustor shell pressure and turbine exhaust temperature are employed to limit, calibrate or control the fuel demand so that apparatus design limits are not exceeded. The characterization of the feedforward speed fuel demand, a surge limit fuel demand and a temperature limit fuel demand are preferably nonlinear in accordance with the nonlinear characteristics of the gas turbine to achieve more accurate, more efficient more available and more reliable gas turbine apparatus operation. The control arrangement 302 has capability for maintaining cycle temperature, gas turbine apparatus speed, acceleration rate during startup, loading rate and compressor surge margin.

The fuel demand in the control arrangement 302 provides position control for turbine gas or liquid fuel valves. Further, the control arrangement 302 can provide for simultaneous burning of gas and liquid fuel and it can provide for automatic bumpless transfer from one fuel to the other when required. The subject of bumpless plant transfer between different fuels and the plant operation associated therewith is disclosed in the previously noted fuel transfer copending patent applications.

Generally, the control arrangement 302 involves little risk of exceeding gas turbine design temperature limits. This reliability stems from the particular process variables from which fuel demand is determined and the manner in which the fuel demand is determined from the variables.

During startup and after ignition, a feedfoward loop 304 provides a representation of a speed reference from a nonlinear predetermined constant turbine inlet temperature characterization 306 (normal) or 307 (emergency) to the input of a feedback control loop 308 where it is summed with a measured turbine speed representation in block 310. A variable speed regulation of 2% to 6% is applied in block 312 and a proportional plus rate amplifier block 314 generates a speed fuel demand representation.

Figure 14:
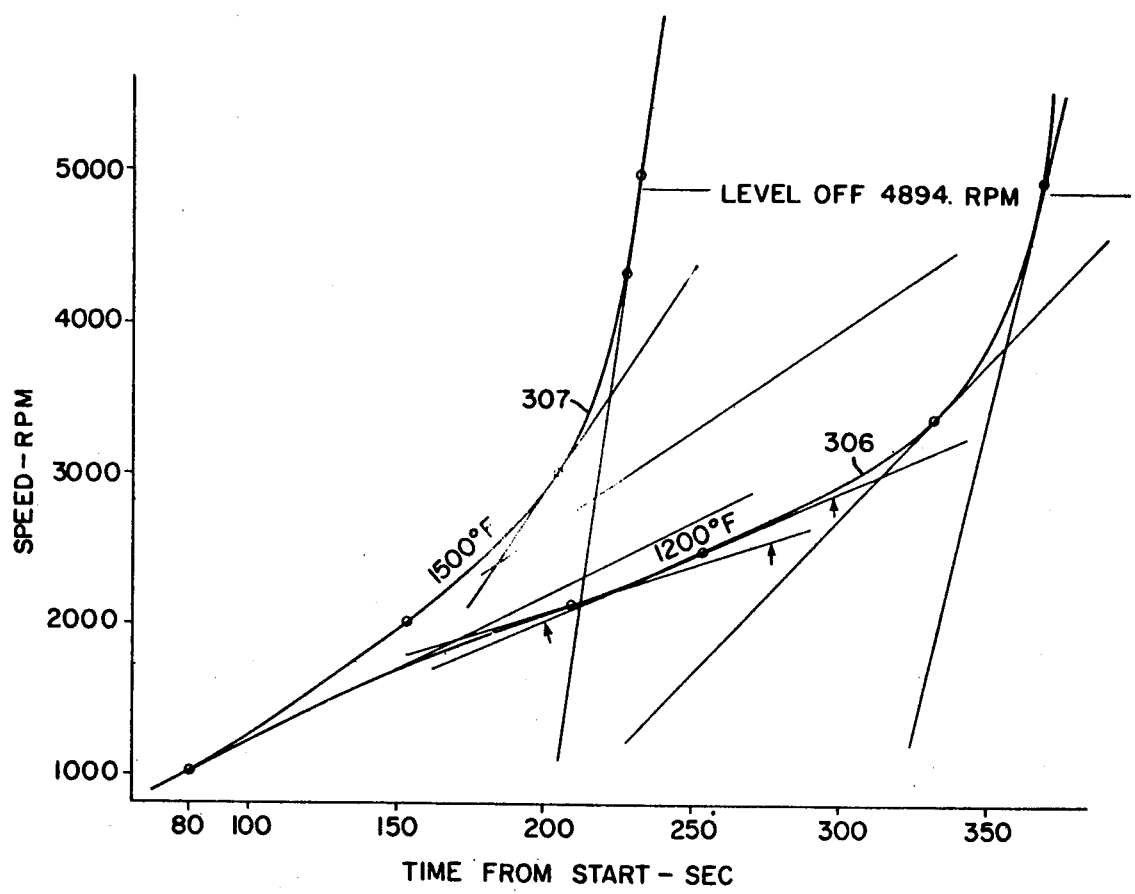
FIGS. 14-17 illustrate various curve data employed in the control system computer in the operation of the gas turbine power plant.

Preferably, the operation of the loops 304 and 308 normally provide for turbine acceleration in a fixed interval of time as determined from a suitable and preferably nonlinear characterization such as that shown in FIG. 14. The fixed acceleration time period is maintained regardless of compressor inlet air temperature, fuel supply pressure, fuel heating value and cycle component efficiencies.

With constant acceleration time between ignition and synchronism, the time interim between gas turbine overhauls is extended. Thus, when operation occurs in periods with reduced ambient and compressor inlet air temperature, a reduced turbine inlet temperature and reduced turbine temperature transients occur with the normally fixed acceleration time period. Reduced cycle temperature would occur for example during cold weather operation or where compressor inlet air cooling is employed.

In the combination of plural control loop functions in the arrangement 302, a low fuel demand selector block 316 is preferably employed to limit the speed reference fuel demand representation if any of three limit representations are exceeded by it during startup. These limit representations are generated respectively by a surge control 318, a blade path temperature control 320, and an exhaust temperature control 322. In this application, a load control block 324 becomes operative after synchronization with the limit blocks 318, 320 and 322.

Figure 15:
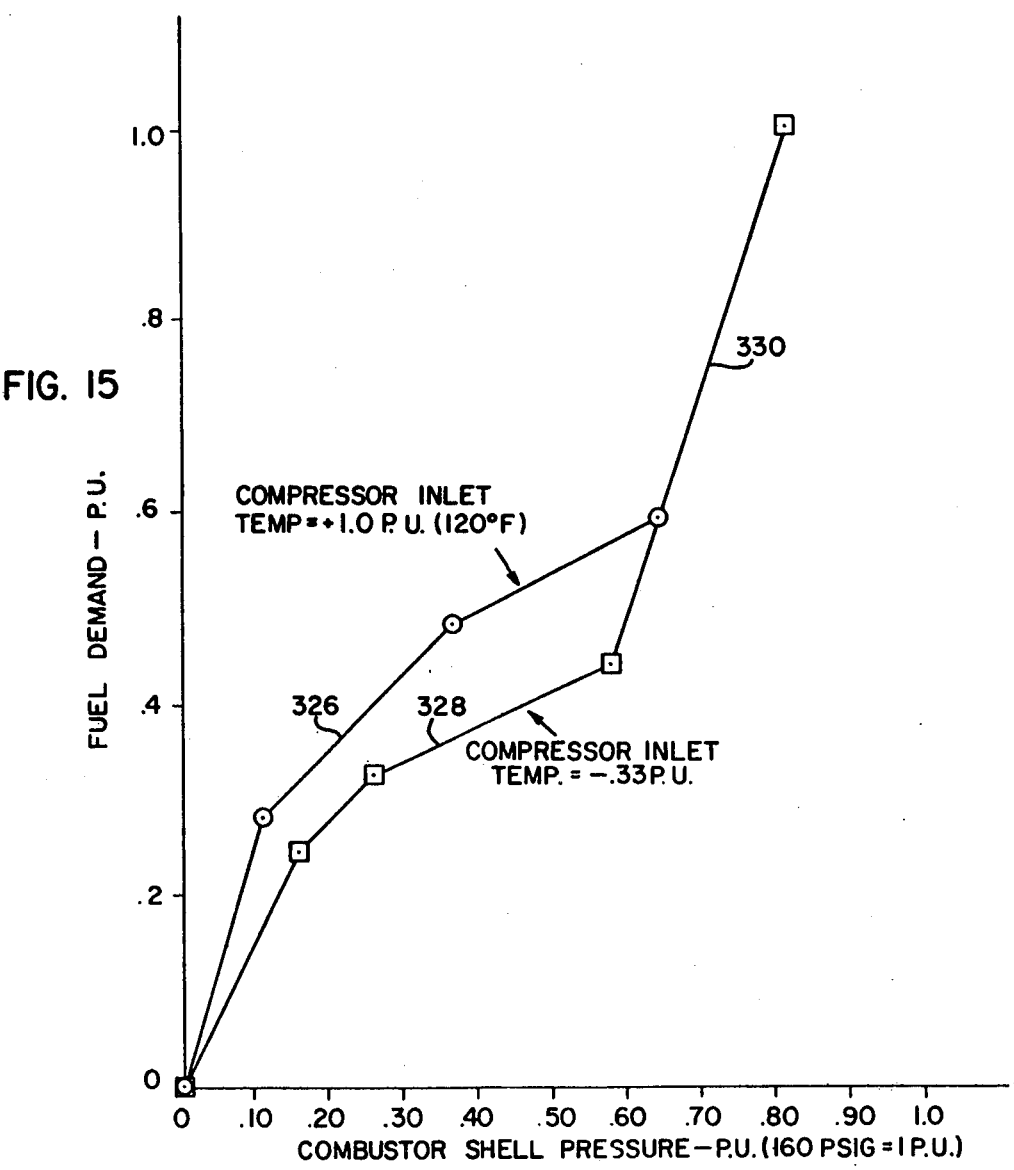

The surge control 318 includes a characterization block 325 which responds to sensed combustion shell pressure and compressor inlet temperature to generate the surge limit representation for compressor surge prevention as illustrated in FIG. 13B. The characterization provided by the block 325 is preferably nonlinear, i.e. characterizations represented in FIG. 15 are employed. The curve 326 limits startup fuel demand for an ambient temperature of 120° F and the curve 328 limits startup fuel demand for an ambient temperature of −40° F. Common curve portions 330 are operative at various ambient temperatures to provide a substantially linear surge limit during load operations.

Figure 16:
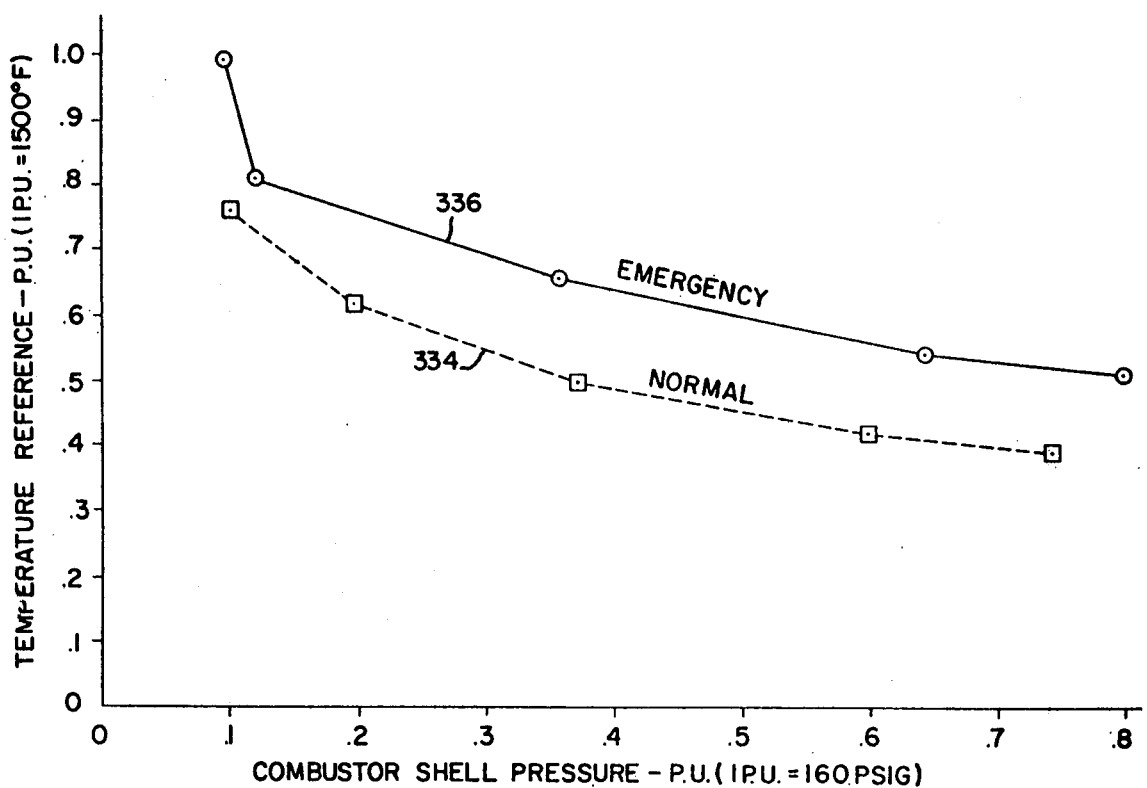
Figure 17:
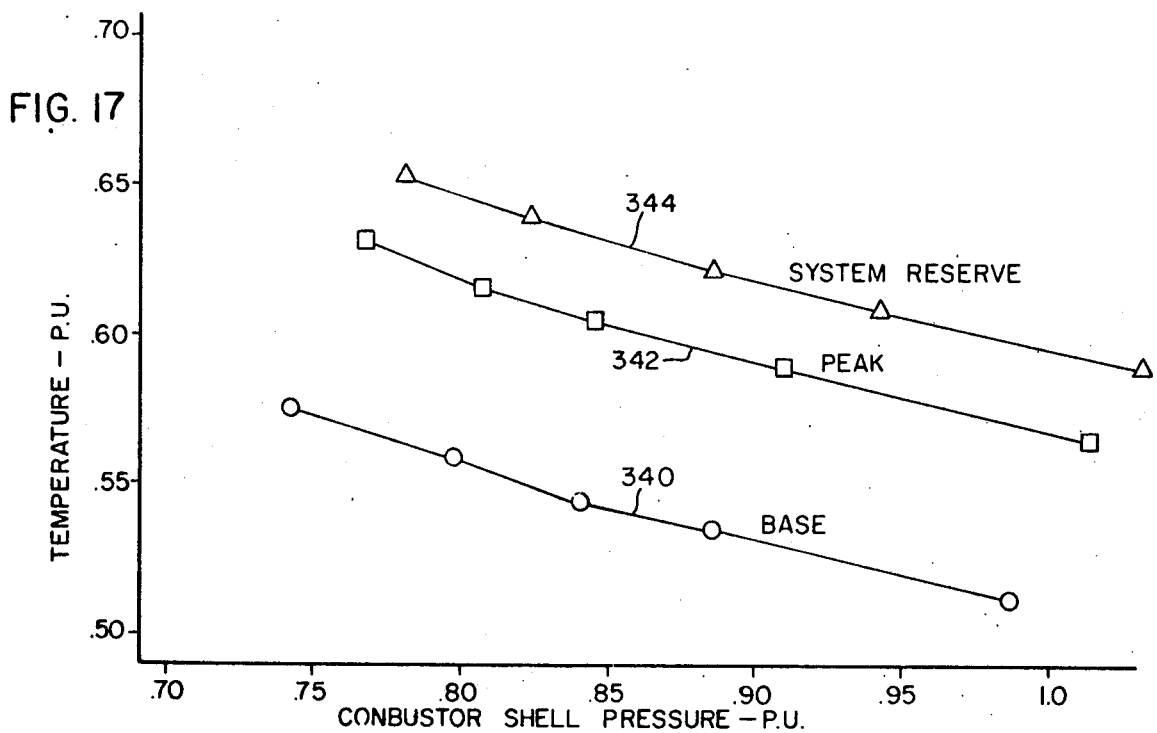

As shown in FIG. 13C, the blade path temperature control 320 includes a block 332 which responds to combustor shell pressure in accordance with a first preferably nonlinear temperature reference characteristic 334 for normal startup and a second preferably nonlinear temperature reference characteristic 336 for emergency startup as illustrated in FIG. 16. The exhaust temperature control 322 includes a block 338 which responds to combustor shell pressure in accordance with a first preferably nonlinear temperature reference characteristic 340 for base load operation, a second preferably nonlinear temperature reference characteristic 342 for peak load operation and a third preferably nonlinear temperature reference characteristic 344 for system reserve load operation as shown in FIG. 17. The startup curves 334 and 336 correspond respectively to 1200° F and 1500° F turbine inlet temperature while the load curves correspond to respectively higher values of turbine inlet temperature operation.

In this case, a transfer block 346 (FIG. 13C) selects the exhaust temperature reference for further processing in an exhaust temperature cutback and tracking control block 347 during load operations if block 348 generates a representation that the generator breaker is closed. Otherwise the transfer block 346 selects the blade path temperature reference for further processing in a blade temperature cutback and tracking control block 349 during startup or isolated plant operations. The block 349 is identical with the block 347 except that the block 349 uses eight blade path thermocouples in place of eight exhaust thermocouples used in the block 347. During startup, an inhibit block 351 preferably prevents the low fuel demand selector 316 from responding to the exhaust temperature control blcok 322 because a reliable average exhaust temperature ordinarily is not available during most of the startup transient.

As shown in FIG. 13C, the block 347 or 349 in this instance includes a pair of groups of four thermocouples which are coupled process blocks 353 and 355 in separate channels where the following processing is performed.

1. Linearization
2. Open circuit test and alarm
3. Short circuit test and alarm
4. High error and absolute limits and alarm
5. Bad input rejection In the preferred control system 300, computer program operations subsequently considered more fully provide the described thermocouple data processing.

Block 357 next selects the highest of the two average temperatures determined for the two thermocouple groups in accordance with the following formula:

$$T_{AV} = (\Sigma/N) T_N$$

where:

$T_{AV}$ = average temperature
$N$ = valid inputs to be averaged.

An error between the temperature reference selected by the transfer block 346 and the output from the high thermocouple select block 357 is generated by a difference block 359.

When the temperature error representation is positive, a zero is generated by low selector block 360 so that a proportional controller 362 generates no outputs. To prevent integral windup of a reset controller 370, difference block 366 in this case applies the positive error representation to transfer block 368 to cause the reset controller 370 to generate an output representation which tracks the output representation of the low fuel demand selector 316. In this manner, the input temperature limit representation to the fuel demand selector 316 from the blade path temperature block 320 or the exhaust temperature block 322 through block 372 is always at or close to a value which needs only to be decremented to produce temperature limit control action in the event the temperature error sign changes from positive to negative. To provide for the tracking operation, the output of the reset controller 370 is applied to an input difference block 374 along with a representation of the output fuel demand representation from the fuel demand selector 316. A bias is summed with the resultant error signal by block 376 to cause the reset controller output to exceed the fuel demand signal slightly thereby providing some + and − control range for the selector input control which is driving the selector 316.

If the temperature error at the output of the difference block 359 is negative, the reset controller 370 is switched from its tracking operation by transfer block 368 through the routing of a zero representation to reset controller summer input block 369 through the transfer block 368. Further, the negative temperature error signal is then selected by the low select block 360 for application to the input of the proportional controller 362 and the reset controller 370 through the summer block 369. For negative temperature error, the blocks 362 and 370 thus form a proportional plus reset controller having their outputs summed in block 372 for application to the low fuel demand selector 316. In the preferred control system 300, it is noteworthy that rate action is also provided in the temperature control channels as considered more fully subsequently.

A negative temperature error is alarmed through block 376 to cause turbine shutdown if the temperature error is more than a predetermined amount. A deadband is provided in the block 378 to prevent alarms for small temperature errors.

After the generator 102 has been synchronized with the line with the use of the preferred control system 300, the gas turbine speed is regulated by the system frequency if the power system is large and the speed reference applied to the difference block 310 in FIG. 13A is set at a higher value such as 106%. The speed fuel demand signal applied to the input of the fuel demand selector 316 thus is normally much higher than other inputs to the selector 316 during system load operation. If the generator 102 is separated from the power system for isolated operation, the turbine 104 is controlled to operate at the 106% speed reference.

The load control block 324 becomes operative during load operation of the gas turbine power plant 100. A feedforward control embodiment of it is shown in greater schematic detail in FIG. 13D. A feedback control embodiment is employed in the preferred control system 300 as subsequently described. More particularly, the load control block 324 in FIG. 13D includes a kilowatt reference block 380 which generates a reference representation applied to a feedforward characterization block 382 through a summer block 384 to which a bias is applied. The characterized output kilowatt reference representation is applied to a summer block 386 where a calibration summation is made with the output from a reset controller 388. The output from the summer block 386 defines the corrected load fuel demand limit for application to the low fuel demand selector 316 through a transfer block 389. In startup, the transfer block 389 causes a high value to be applied to the low demand selector 316 so that the load control is nonlimiting.

For Mode 3 fixed or constant load control, transfer block 390 enables the reset controller 388 to integrate any error between actual generator kilowatts and the kilowatt reference representation from the block 380 as determined in difference block 392 to provide a trim correction to the sum block 386. Under turbine temperature load limit operation, an error between the output of block 386 and the fuel demand signal is generated by block 387 and applied to the input of the reset controller 388 by the transfer block 390 to obtain tracking action (with bias if desired) for reasons like those considered previously in connection with temperature limit control. In the temperature load limit case, the temperature control limit imposed preferably by the exhaust temperature control 322 prevent overloading of the turbine-generator and in so doing provides load control by limit action.

Fixed load operation is referred to as Mode 3 and it occurs after the generator and line breakers are closed if minimum load is selected and if fixed load control is included in the control package and selected for operation. In Mode 3 a kilowatt limit is accordingly imposed on the low fuel demand selector 316 in addition to the previously described limits. At minimum load operation, the kilowatt reference representation is fixed and, in the FIG. 13D embodiment, feedforward control action is developed as just described. On base, peak or system reserve operation in Mode 4, the reference representation generated in FIG. 13D by the block 380 is preferably romped to the maximum value causing the temperature control to take over and control the load by exhaust or blade path temperature limit.

In the preferred control system 300, a load rate of 50% per minute is provided. Under selectable emergency start, a faster load rate can be provided. Operator raise and lower pushbuttons can also be employed for load control, and when so used they increment or decrement the kilowatt reference representation. For pushbutton operation, the increment rate is 50% load per minute and the decrement rate is 100% per 30 to 40 seconds per NEMA specifications.

At the output of the low fuel demand selector 316, the fuel demand repesentation is applied to a dual fuel control where the fuel demand signal is processed to produce a gas fuel demand signal for application to the gas starting and throttle valves or a liquid fuel demand signal for aplication to the oil throttle and pressure bypass valve or as a combination of gas and liquid fuel demand signals for application to the gas and oil valves together.

To generate a speed reference repesentation in Mode 1, the following algorithm is employed in the preferred control system 300:

$$W_{R(t)} = W_{R(t-\Delta t)} + a_{(t-\Delta t)} \Delta t$$

where:
$a = fn(W_R)$ for normal acceleration (derived from FIG. 14)
$a = fe(W_R)$ for emergency acceleration derived from FIG. 14)
$W_R =$ speed reference $$W_{MIN} \leq W_R \leq W_{SYNCH}$$

$W_{R(c)} =$ initial speed value.

To compute a load demand representation, the following algorithm may be employed:

$$D_R = \frac{1}{T_D} \int_{t=Synchr}^{T=Desired\ Load} (100\%)\ dt + D_R(0);\ D_{MIN} \leq D_R \leq D_{SYS\ RES}$$

where:
$D_R =$ load reference $T_D$ = repeats/second required for fixed time to reach desired load $D_R(0)$ = Initial load value.

To determine the fuel demand representation the following algorithms may be employed:

$Q_{FW} = (W_R - W)K$ for speed $Q_{FD} = KD_R + (1/S)(D_R - D)$ for load with load control or $Q_{FD} = KD_R$ without load control.

The algorithms implemented in the preferred control system 300 are more fully described subsequently.

In addition to Mode 3 and Mode 4, the control modes of operation as defined herein further include Mode 0, Mode 1, and Mode 2. Mode 0 is the pre-ignition mode which applies to the startup period up to approximately 20% speed. During Mode 0 operation, plant status information is determined by the control system 300 for sequencing and protection purposes.

Figure 18:
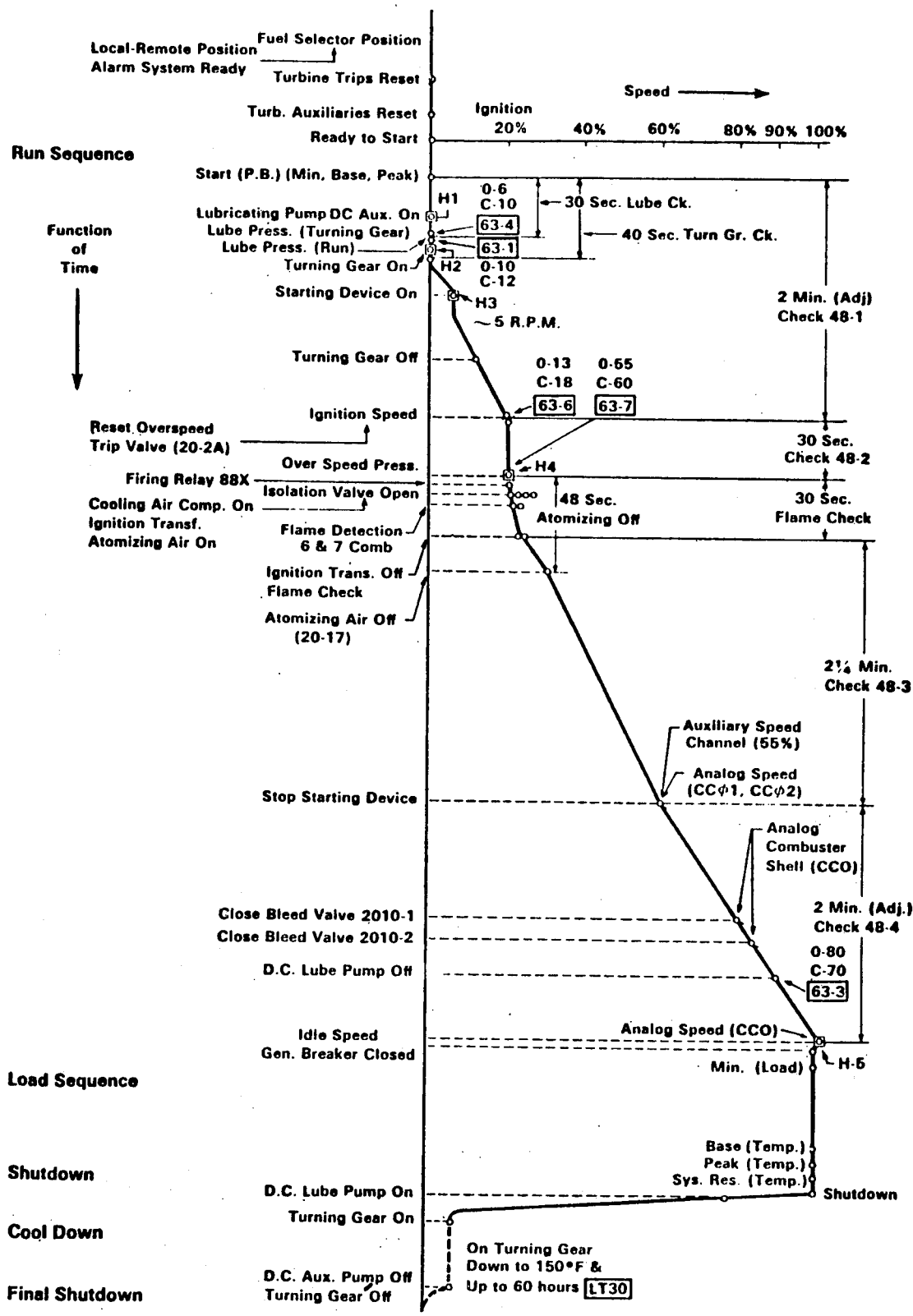
FIG. 18 shows a sequence chart for startup and shutdown operations of the gas turbine power plant.

Reference is made to FIG. 18 where there is shown a schematic diagram representative of the events involved in gas turbine startup embraced by operating Modes 0, 1 and 2 in the preferred embodiment. FIG. 18 also illustrates the sequencing involved in shutdown.

After ignition, the control loops are automatically transferred to Mode 1 by sequencing operations. The speed fuel demand reference $W_R$ is then increased as previously considered in connection with FIG. 14 for a normal or an emergency start. In addition, the surge control limit and temperature cutback control action are provided as already considered.

During Mode 2 sequence operations transfer the control for synchronization which can be performed manually or automatically. The procedure for manual and automatic synchronization in accordance with the principles of the invention is subsequently considered more fully herein. As in the case of Mode 0 operation, sequence and protection operations are interfaced with the control loops during Mode 1 and 2 operations as generally indicated in FIG. 18.

The control arrangement 302 generally protects gas turbine apparatus against factors including too high loading rates, too high speed excursions during load transients, too high fuel flow which may result in overload too low fuel flow which may result in combustor system outfires during all defined modes of operation, compressor surge and excessive turbine inlet exhaust and blade over-temperature. Further, the control arrangement 302 as emobied in the control system 300 meets all requirements set forth in the NEMA publication "Gas Turbine Governors", SM32-1960 relative to system stability and transient response and adjustment capability.

3. Control System

The control system 300 is shown in block diagram detail in FIG. 12. It includes a general purpose digital computer system comprising a central processor 304 and associated input/output interfacing equipment such as that sold by Westinghouse Electric Corporation under the trade name PRODAC 50 (P50). Generally, the P50 computer system employs a 16,000 word core memory with a word length of 14 bits and a 4.5 microsecond cycle time. The P50 is capable of handling a large volume of data and instructions so as readily to provide for handling the tasks associated with controlling and operating multiple gas turbine plant units as generally considered previously and as more fully considered subsequently.

The P50 core memory is expandable, and by addition of functional modular units the P50 is capable of substantial increase in its analog input capacity, contact closure inputs, and contact closure outputs. Data communication is provided for the P50 by 64 input and output channels, each of which provides a 14 bit parallel path into or out of the computer main frame. The P50 addressing capability permits selection of any of the 64 input/output channels, any of the 64 word addresses for each channel and any of the 14 bits in each word. Over 50,000 points in a process can thus be reached individually by the P50 computer system.

More specifically, the interfacing equipment for the computer 304 includes a contact closure input system 306 which scans contact or other similar signals representing the status of various plant and equipment conditions. The status contacts might typically be contacts of mercury wetted relays (not shown) which are operated by energization circuits (not shown) capable of sensing the predetermined conditions associated with the various plant devices. Status contact data is used for example in interlock logic functioning in control and sequence programs, protection and alarm system functioning, and programmed monitoring and logging.

Input interfacing is also provided for the computer 304 by a conventional analog input system 308 which samples analog signals from the gas turbine power plant 100 at a predetermined rate such as 30 points per second for each analog channel input and converts the signal samples to digital values for computer entry. A conventional teletypewriter system or printer 310 is also included and it is used for purposes including for example logging printouts as indicated by the reference character 312.

A conventional interrupt system 314 is provided with suitable hardware and circuitry for controlling the input and output transfer of information between the computer processor 304 and the slower input/output equipment. Thus, an interrupt signal is applied to the processor 304 when an input is ready for entry or when an output transfer has been completed. In general, the central processor 304 acts on interrupts in accordance with a conventional executive program considered in more detail hereinafter. In some cases, particular interrupts are acknowledged and operated upon without executive priority limitations. There are up to 64 independent available for the central processor 304 in the P50 computer system. Each of the employed interrupt inputs causes a separate and unique response within the computer main frame without need for additional input operations thereby allowing the processing of interrupt input signals with very little main frame duty cycle.

Output interfacing generally is provided for the computer by means of a conventional contact closure output system 316. Analog outputs are transmitted through the contact closure output system 316 under program control as subsequently considered more fully.

The plant battery 132 considered previously in connection with FIG. 1 is also illustrated in FIG. 12 since it provides for operating an inverter 318 which provides the power necessary for operating the computer system, control system and other elements in the power plant 100. The inverter 318 can be an equipment item sold by Solidstate Controls, Inc. and identified as Model No. W-CR-267-DCA. Battery charging is provided by a suitable charger 320.

The contact closure input system 306 is coupled by cabled wire pairs to the operator's console panel 120, considered previously in connection with FIG. 1, and to a remote operator's panel 322. As shown in FIG. 12, connections are also made to the contact closure input system 306 from the inverter 318 and the battery charger 320 and various turbine, protective relay, switchgear, pressure switch and gauge cabinet, and starting engine contact. In addition certain customer selected contacts and miscellaneous contacts such as those in the motor control center 130 (FIG. 1) are coupled to the contact closure input system 306.

Figure 19A:
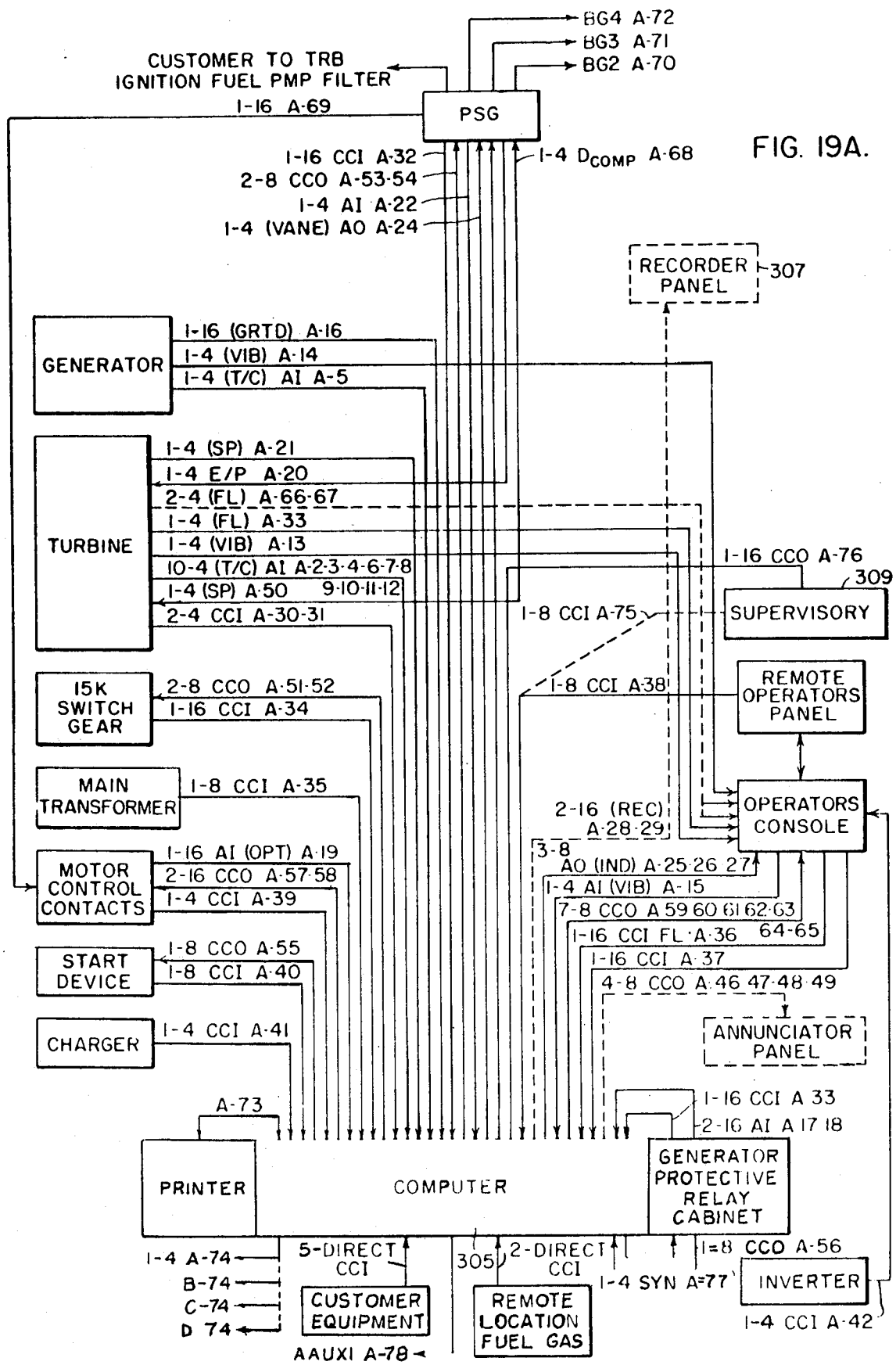
FIGS. 19A-B show a cable and wiring diagram employed for a computer control system and various power plant apparatus elements in a preferred embodiment of the invention.
Figure 19B:
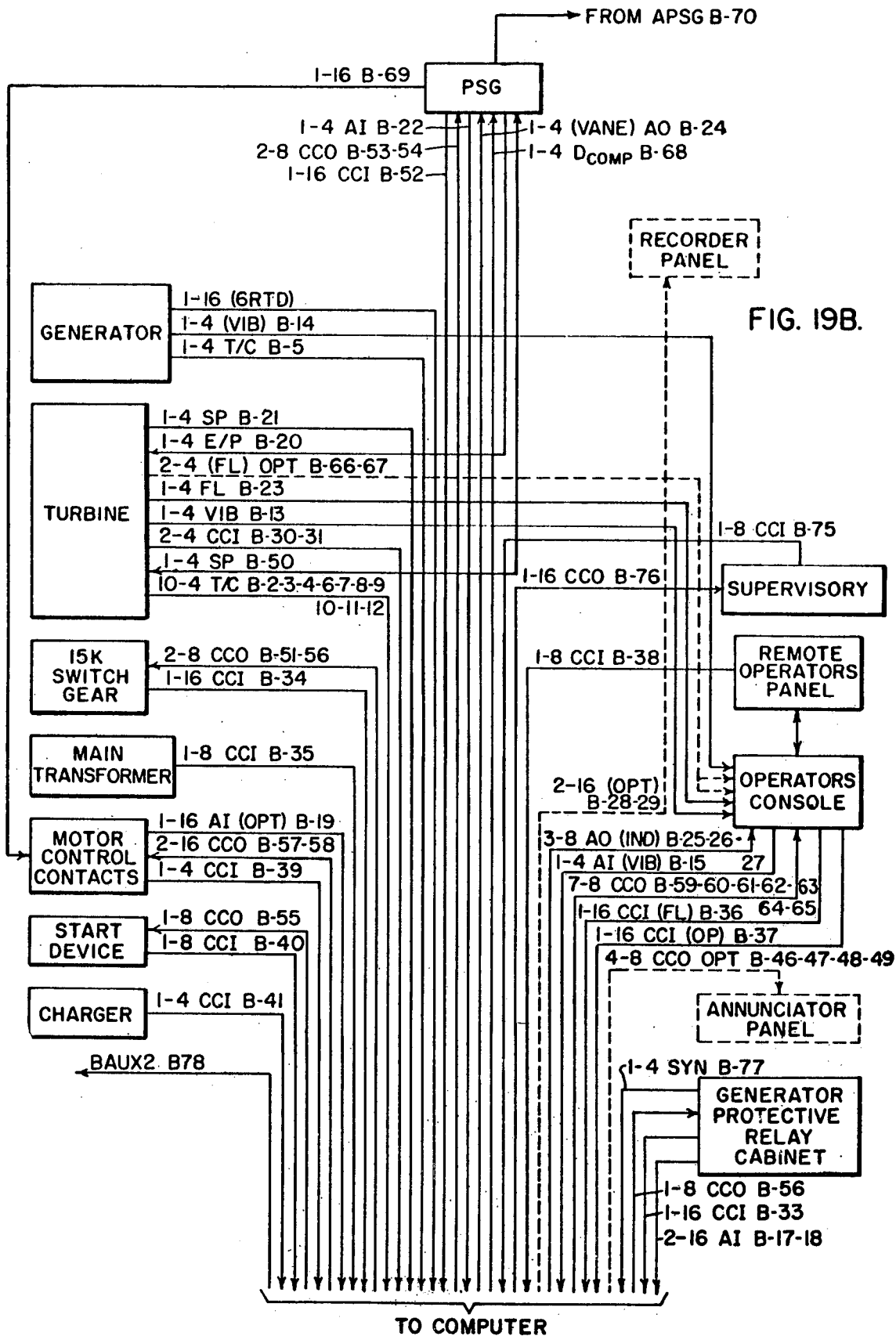

In FIGS. 19A and 19B there is schematically illustrated a cabling diagram generally corresponding to the block diagram shown in FIG. 12. However, the central processor 304 and associated computer system equipment shown in FIG. 12 are grouped together as a single computer system block 305 in FIGS. 19A and 19B. In addition, a recorder panel 307, a supervisory control 309 and an annunciator panel 311 are shown in FIGS. 19A and 19B as options.

Generally, FIG. 19A shows the cabling needed for control system interfacing with a first gas turbine power plant designated by the letter "A," and FIG. 19B shows the cabling needed for interfacing the control system with a second gas turbine power plant designated by the letter "B." As already indicated, a total of four gas turbine power plants can be operated by the P50 computer system and additional cabling diagrams similar to FIG. 19B are provided when needed for the other two gas turbine plants C and D.

Each line connection in FIG. 19A and FIG. 19B includes a designation which indentifies the mnemonic, the cable size and the type of coupling or function. For example, the designation for the topmost turbine connection in FIG. 19A indicates that its identification is A21 and that there is one four-wire pair cable used for at least one speed feedback signal. Contact closure inputs associated with the contact closure input system 306 in FIG. 12 are represented by the symbol CCI on the line connections in FIGS. 19A and 19B. The symbol CCO refers to contact closure outputs and the symbol AI refers to analog inputs.

The P50 analog input system 308 has applied to it the outputs from various plant process sensors or detectors, many of which have already been briefly considered. Various analog signals are generated by sensors associated with the gas turbine 104 for input to the computer system 305 where they are processed for various purposes. The turbine sensors include eight blade path thermocouples, eight disc cavity thermocouples, eight exhaust manifold thermocouples, eight bearing thermocouples, compressor inlet and discharge thermocouple, and, as designated by the block marked miscellaneous sensors, two oil reservoir thermocouples, a bearing oil thermocouple, a control room temperature thermocouple, and a main fuel inlet thermocouple.

A combustor shell pressure sensor and a main speed sensor and a backup speed sensor also have their ouput signals coupled to the analog input system 308. The speed sensor outputs are coupled to the analog input system 308 through an analog speed control 324 and an auxiliary speed limiter 326, respectively. A speed reference signal and a speed/load limit signal generated as outputs by the computer 304 and a fuel demand signal developed by the analog speed control 324 are all coupled to the analog input system 308 from the analog speed control 324. A turbine support metal thermocouple is included in the miscellaneous block.

Sensors associated with the generator 102 and the plant switchgear are also coupled to the computer 304. The generator temperature sensors include six stator resistance temperature detectors, an inlet air thermocouple, an outlet air thermocouple, and two bearing drain thermocoules. Vibration sensors associated with the generator 102 and the gas turbine 104 are coupled with the analog input system 308 through the operator's console 120 where the rotating equipment virbration can be monitored. As indicated by the blocks in in FIG. 12, additional sensors which are located in the protective relay cabinet generate signals representative of varius bus, line, generator and exciter electrical conditions. The operator's panel 120 also generates analog inputs including five calibration input connections as indicated by the reference character 328.

Various computer output signals are generated for operating meters at the operator's console 120 (or for operating recorders which are optional as shown in FIG. 19A) and they are applied as computer analog inputs as indicated by the reference character 330. Each instrument output circuit included in an instrument output block 31 comprises an integrating amplifier which operates in a manner like tht described subsequently in connection with the analog output integrating amplifier employed for converting the computer digital speed reference output to an analog signal value.

With respect to computer output operation, the contact closure output system 316 transfers digital speed reference, speed/load limit and fuel transfer outputs to external circuitry as indicated respectively by the reference characters 332, 334 and 336. The coupling of the contact closure output system 316 with the analog speed control 324 is within the framework of the preferred software/hardware hybrid control system. Another contact closure output 338 to the analog speed control 324 provides for a minimum fuel flow into the turbine combustor system in order to prevent flameout after ignition.

An analog dual fuel control system 337 is operated by the speed control 324 to determine the position of the liquid and gas fuel valves considered in connection with FIGS. 9 and 10. A contact closure output coupling to the dual fuel control 337 provides for transfer between fuels or relative fuel settings for two fuel or single fuel operation as indicated by the reference character 336. A guide vane control circuit 338 is also operated by the speed control 324 to control the position of the guide vanes through a guide vane electropneumatic converter 340 which actuates the positioning mechanism.

The contact closure output 316 is also connected to the operator's panel 120 and to sequence the starting engine 126. A synchronizer detection circuit 342 has bus, line and generator potential transformers coupled to its input and the contact closure output system 316 signal provides a visual panel indication for manual synchronization. The detection circuit 342 also applies signals to the analog input system 308 for automatic synchronization when such synchronization is employed as considered more fully in the aforementioned Reuther and Reed copending patent applications.

Other devices operated by contact closure outputs include the generator field breaker and the generator and line breakers 132 and 137. The motor operated generator exciter field rheostats 171 and 177 and various devices in the motor control center 130 and the pressure switch and gauge cabinet 152 also function in response to contact closure outputs. The printer or teletype 310 is operated directly in a special input/output channel to the main frame 304.

PRESSURE SWITCH AND GAUGE CABINET EQUIPMENT LIST

For a listing of items located in the pressure switch and gauge cabinet, reference is made to the aforementioned Ser. No. 082,470.

ANALOG CIRCUITRY

Figure 20A:
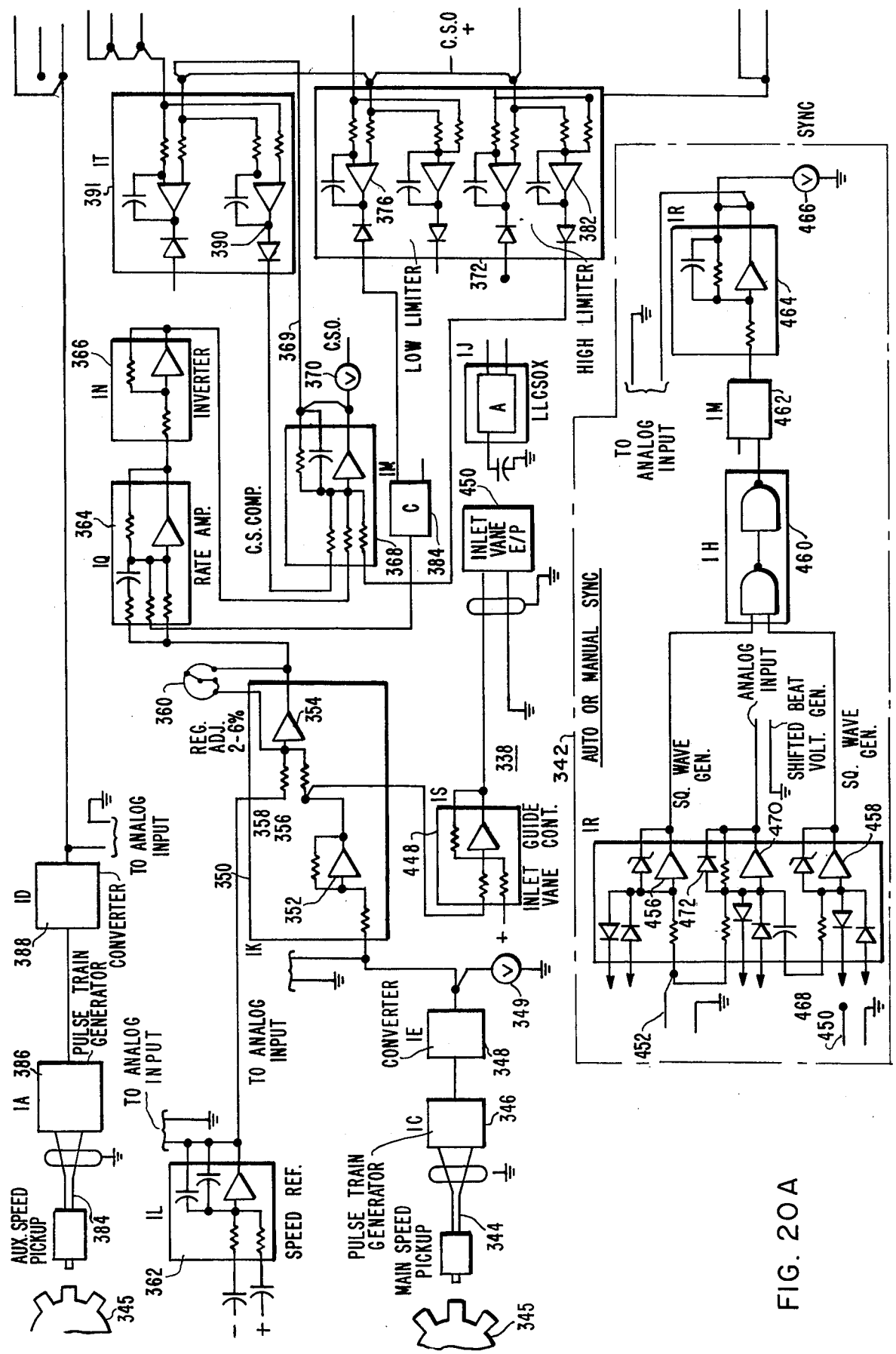
FIGS. 20A and 20B show a schematic diagram of analog circuitry associated with the computer in the control system to provide control over gas turbine fuel supply system operations and certain other plant functions.
Figure 20B:
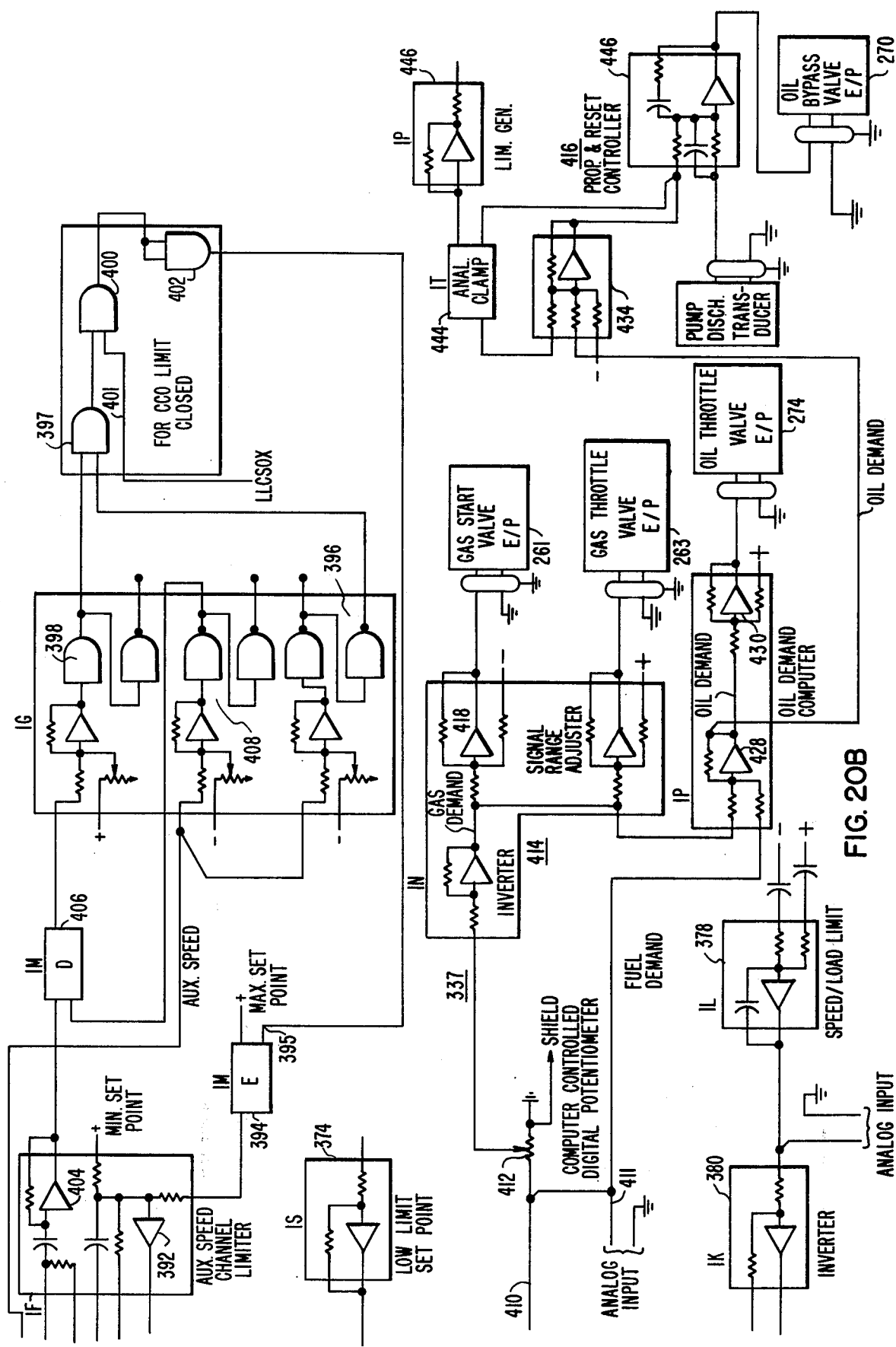

The speed control circuit 324 operates in response to a main speed signal generated by a main turbine speed sensor 344 associated with a 44 tooth magnetic rotor wheel 345 as shown in greater detail in FIG. 20. The speed sensor 344 is a conventional reluctance type device which generates a sinusoidal output waveform. Circuit block 346 converts the sinusoidal speed signal into an output signal having a constant width pulse at twice the input frequency.

Generally, the circuit block 346 includes a zero crossing sense amplifier which produces a pulse of approximately 15 microseconds duration every time the input waveform crosses zero. To detect zero crossing, to the block 346 the input is compared with zero by a two stage comparator which changes state every time the input crosses zero. The edges of the comparator square wave output are differentiated to produce a pulse train having twice the input frequency. In turn, the resultant output pulse train is applied to counter enable circuitry which initiates the operation of a clocked counter on the occurrence of each pulse. The counter enable circuitry is reset by the clocked counter 85 microseconds after the application of each set pulse. Accordingly, a circuit block output is generated by the counter enable circuitry in the form of a train of 85 microsecond pulses occurring at twice the input frequency.

The output pulse train from the circuit block 346 is applied to circuit block 348 which converts the pulse train into a direct voltage proportional to the pulse frequency. Generally, the circuit block 348 comprises a transistor switch network which is coupled to an R-C averaging network. The ON time of the transistor switch network is a constant 85 microseconds but the OFF time varies inversely with the input frequency. The averaging network generates a DC voltage output which is amplifed and it is a function of the relationship between the ON and OFF times of the transistor switch network. Accordingly, the amplitude of the averaging network output is directly proportional to the frequency of the input constant width pulse train.

From the circuit block 348, an output is applied to a turbine speed meter 349 and to the input of an error detector circuit block 350. It is noted at this point in the description that each circuit block in FIG. 20 denotes a circuit card which is mounted in the control cabinet.

The actual speed signal at the output of the circuit block 348 is also applied to the analog input system 308 (FIG. 12). The computer thereby obtains a representation of the actual turbine speed determined by the main turbine speed sensor 344.

At the input of the speed error detector circuit 350, the speed signal is amplified and inverted by an operational amplifier 352. It is then applied to the input summing junction of an error detector operational amplifier 354.

A speed reference signal as indicated by the reference 356 and an adjustable speed regulation feedback signal indicated by the reference character 358 are also applied to the error detector summing junction. An adjustable potentiometer 360 determines the gain of the amplifier 354 by determining the magnitude of the amplifier circuit feedback signal, and the potentiometer resistance variation provides for adjustment in the gain and the speed regulation over a range from 2% to 6%.

The speed reference signal is an analog signal obtained from an analog output circuit block 362 which operates as a digital to analog converter in responding to a speed reference signal generated at the computer output in digital form. Generally, the analog output block 362 comprises an integrating amplifier to which up and down computer contact closure outputs are coupled. Programmed computer operation determines the period of closure of the respective contact outputs to determine the output voltage from the analog output block 362. In turn, the output voltage from the analog output block 362 is coupled to the computer 304 through the analog input system 308. The output contacts associated with the block 362 are held open when the speed reference analog voltage is detected to be at the digital command value.

With reference again to the error detector block 350, the summation of the speed reference, actual speed and speed feedback regulation signals results in the generation of a speed error output signal for application to a proportional plus rate amplifier 364. The amplified speed error signal is then inverted to obtain the correct polarity by an inverter block 366. If no fuel demand limit action is applied, the speed error signal is further amplified by a mixer amplifier circuit block 368 to generate a contact signal output (CSO) or a fuel demand signal on line 369 for input to the fuel control system 337 and for fuel demand or control output signal monitoring by meter 370.

A clamp circuit block 372 includes two circuits which are used to impose high and low limits on the fuel demand signal. A low limit setpoint of 1.25 volts is generated by a low limit setpoint generator circuit block 374 and applied to the negative input of clamp amplifier 376 for comparison with the fuel demand signal which is applied to the positive input from the fuel demand amplifier 368.

Similarly, a high limit for the fuel demand signal is established by a setpoint signal generated by an analog output circuit block 378 and an inverter 380 and applied to the positive input of another clamp amplifier for comparison with the fuel demand signal which is also applied to the positive clamp amplifier input. The computer output signal coupled to the analog output block 378 is the lowest of the fuel demand limit representations generated by control blocks 318, 320, 322 and 324 (FIG. 13A) under programmed computer operation.

The output of the clamp amplifier 382 is coupled to the input of the amplifier block 368 to produce low select fuel demand limit action on the fuel demand signal. Similarly, the output of the clamp amplifier 376 is applied to the input of the proportional plus rate amplifier 364 through an analog switch 384 which which becomes conductive if a low fuel limit signal LLCSOX has been generated by the computer, i.e. if the fuel demand signal has reached 1.25V (logic shown in FIG. 33C), to prevent flame out particularly on load transients through low limit fuel demand action.

If the fuel demenad signal tends to drop below 1.25 volts, the low limiter clamp amplifier 376 operates through the analog switch 384 to clamp the input to the proportional plus rate amplifier at a level which results in the fuel demand signal output from the circuit block 368 having a voltage level of 1.25 volts. Similarly, the high limiter clamp amplifier 382 clamps the fuel demand amplifier 368 to prevent the fuel demand signal from exceeding the present value of the fuel demand limit as determined and output by the computer 304.

The auxiliary or backup speed limiter 326 is preferably employed to provide backup speed protection in conjundtion with the main speed control 324. The turbine speed value at which the backup speed protection is provided is above the maximum speed range over which the speed control 324 is intended to provide control. For example, the miximum speed reference value within the speed control range of the speed control 324 may be 104% rated speed and the auxiliary speed limiter circuit 326 may provide backup speed limit protection at a speed of 108% rated. The mechanical backup speed limiters associated with the fuel systems referred to previously in connection with FIGS. 9 and 10 then provide further backup speed protection at a speed of 110% rated.

An auxiliary speed sensor 384 cooperates with the 44 tooth magnetic wheel 345 on the turbine-generator rotating element to generate a sinusoidal speed signal in the manner described for the main speed 344. A pulse train is then generated by pulse train generator block 386 in the manner described for the circuit block 346 in the main speed control channel. Next, a converter block 388 generates an analog speed signal in response to the pulse train output from the circuit block 386 in the manner considered in connection with the main speed converter circuit 348.

The backup speed limit is imposed on the turbine operation by an analog clamp circuit 390 in circuit block 391. The output of the amplifier clamp circuit 390 is applied to the summing junction input of the mixing amplifier 368 to produce limit action on the fuel demand signal generated by the amplifier 368 in a manner similar to that described in connection with the limit action produced by the clamp amplifier circuit 376.

More particulary, the backup speed amplifer circuit 390 causes the fuel demand signal to be cut back to the minimum value of 1.25 volts to cause turbine deceleration without flameout when a speed limiter setpoint generator circuit 392 is caused to apply a low limit setpoint of -1.25 volts to the positive input of the clamp amplifier for comparison with the fuel demand signal which is also applied to the positive input. An analog switch 394 is made conductive by input 395 to couple a 1 volt supply to the input of the setpoint generator circuit 392 and cause the generation of the low limit setpoint if either of two logic conditions is satisfied.

To provide low limit setpoint generation and auxiliary speed backup protection if the turbine speed exceeds the predetermined limit value of 108% as a first logic condition, the auxiliary speed signal is applied to the input of a comparator circuit 396 which generates an output signal for application to an OR circuit 397 when the speed signal is too high. An AND circuit 400 responds if LLCSOX exists to generate a switching signal at the input 395 of the analog switch 394 through a logic inverter 402.

The second logic condition which causes auxiliary speed backup limit protection is preferably included so that the turbine operation is cut back if the rate of speed change is too great it any turbine speed value over a predetermined speed range such as 102% rated speed to 108% rated speed. For this purpose, the auxiliary speed signal is applied to the input of a rate amplifier 404 which generates a speed derivative signal applied to the switching path of an analog solid state switch 406.

The speed derivative signal is coupled through the switch path of the switch 406 to the input of another comparator 398 if the turbine speed is above the bottom range value of 102% rated speed. As indicated by reference character 407, a switching action input is applied to the speed derivative analog switch 406 by a comparator 408 if the auxiliary speed signal applied to its input exceeds the predetermined value corresponding to 102% rated speed. If the turbine speed is excessive, the speed derivative signal is compared to a predetermined acceleration limit by the comparator 398. If the acceleration is also excessive, an output from the comparator 398 is coupled through the logic circuits 397, 400 and 402 to the control input of the logic switch 394 which causes low limit action on the fuel demand signal through the clamp amplifier 390 as already described.

The fuel demand signal generated at the output of the fuel demand amplifier 368 accordingly is representative of the fuel needed to satisfy the computer generated speed reference, the fuel needed to satisy a computer determined limit action, the low limit fuel demand needed to prevent flameout during normal speed operations, or to cause turbine speed cutback without flameout when overspeed conditions are detected by the auxiliary speed limiter circuit 326. At an input 410 to the dual fuel control system 337, the fuel demand signal is applied across a digital potentiometer 412 which is illustrated schematically as an analog potentiometer. The fuel demand signal is also applied to the computer analog input system 308 for programmed computer operations as indicated by the reference character 411.

In the leftmost position of the dual fuel demand potentiometer 412, the fuel demand signal is fully applied to a gas fuel control system 414. In the rightmost potentiometer position, the fuel demand signal is fully applied to a liquid fuel control system 416. At intermediate potentiometer positions, the total fuel demand signal is ratioed between the gas and fuel control systems 414 and 416 to produce the individual fuel flows which satisfy gas turbine operation commands.

The digital potentiometer position is determined by programmed computer operation of contact output closures to produce the desired fuel of mixed fuel flow to the burners. Fuel transfer operations are also placed under automatic computer control through the digital potentiometer 412, but that subject is considered more fully in the aforementioned copending Reuther application.

Figure 21:
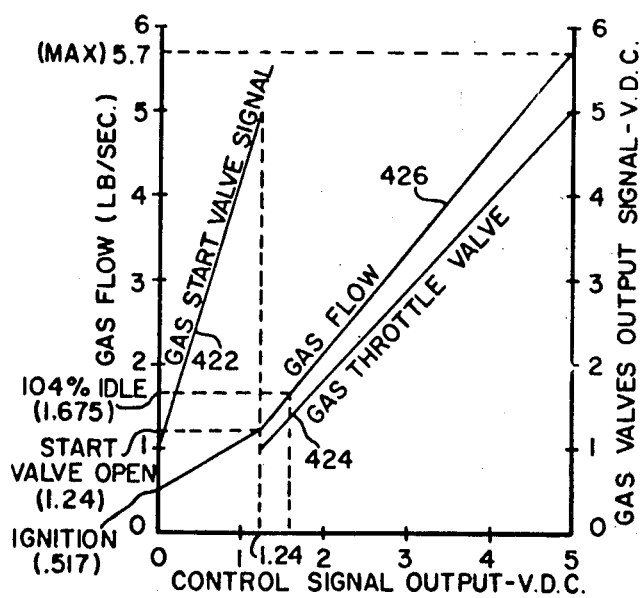

The gas fuel demand signal is applied to the input of a signal range adjuster amplifier 418 to produce the predetermined gain and bias characterization for operation of the gas start valve. Similarly, the gas demand signal is applied to the input of a signal range adjuster amplifier 420 to provide the predetermined gas throttle valve characterization. In FIG. 21, there are shown the respective characterizations 428 and 428 for the adjuster amplifiers 418 and 420. Further, there is shown a net starting valve and throttle valve gas flow characteristic 426 which results from the characterized control placed on the starting valve and throttle valve electropneumatic converters by the amplifiers 418 and 420 as a function of the fuel demand control signal.

The gas fuel demand signal and the total fuel demand signal are differenced at the summing junction of an operational amplifier 422 to generate the liquid fuel demand signal. As already indicated, the liquid fuel demand signal is equal to the total fuel demand signal when the potentiometer 412 is positioned at its rightmost location to make the gas fuel demand signal zero.

Figure 22:
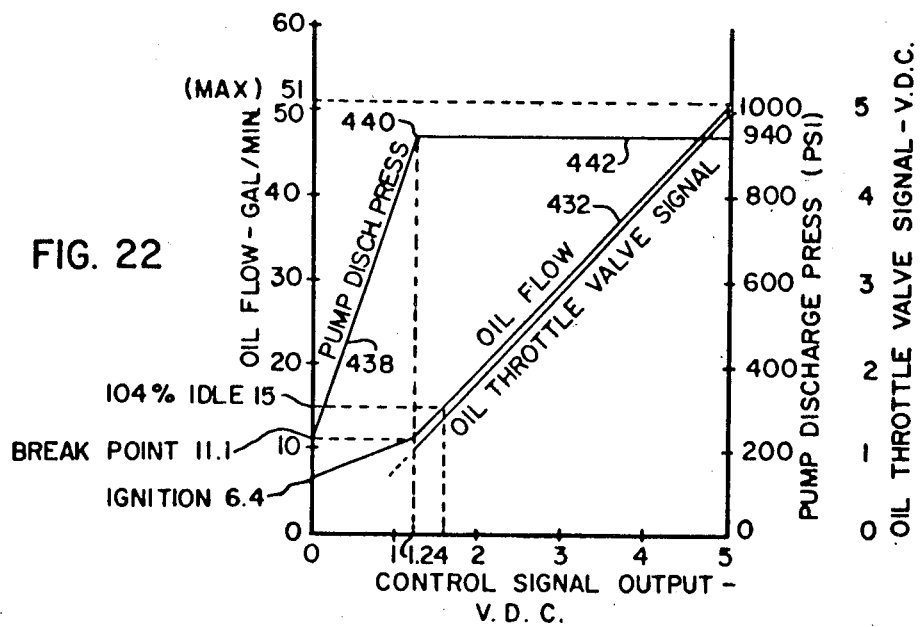
FIGS. 21-23 show certain control signal characteristics associated with the analog circuitry of FIG. 20.

A signal range adjuster amplifier 424 operates on the liquid fuel demand signal to produce control on the liquid fuel throttle valve electropneumatic converter in accordance with the characteristic 432 shown in FIG. 22. The oil demand signal is also applied to the input of an oil pressure reference generator 434 which generates a ramp reference for a proportional plus reset plus rate controller 436. The pump discharge pressure transducer (FIG. 10) generates a feedback signal which is summed with the ramp reference and the resultant error signal is operated upon with proportional plus reset plus rate action by the controler 436 to operate the liquid fuel bypass valve electropneumatic converter 270 in accordance with the pump discharge pressure characterization indicated by the reference character 438 in FIG. 22. When gas fuel is selected, the oil discharge pressure is regulated to a predetemined minimum value.

When the liquid fuel demand signal reaches a value of 1.25 volts, the pump discharge pressure ramp is terminated as indicated by the reference character 440 in FIG. 22 and the pump discharge pressure is then held constant as indicated by the reference character 442 for higher liquid fuel demand signals. Thus, an analog clamp circuit 444 compares a limit voltage generated by a limit setpoint generator 446 to the oil pressure reference signal and clamps the output from the oil pressure reference generator 434 at a value which causes the pump discharge pressure to remain constant at the value indicated by the reference character 442.

Figure 23:
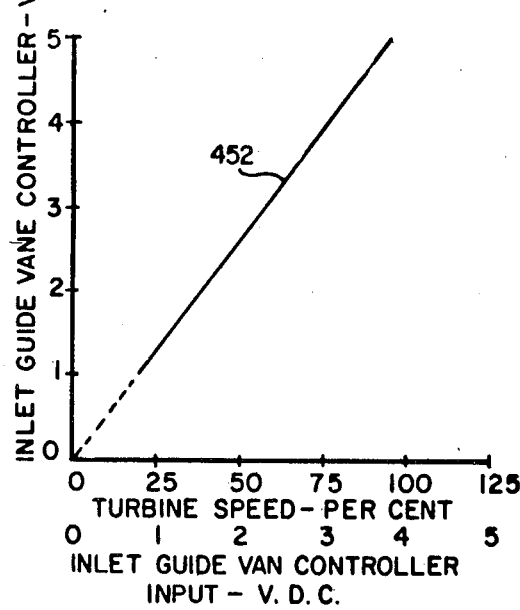

The inlet guide vane control 338 considered previously in connection with FIG. 12 includes a controller 448 which generates a guide vane position control signal as a linear function of the sensed speed signal derived from the error detector block 350 in the main speed channel. An inlet vane electropneumatic converter 450 is provided for operating the previously mentioned positioning ring of the guide vane assembly. As illustrated in FIG. 23, the controller position control signal characteristic 452 provides for a minimum open guide vane position at the 20% ignition speed value and increased opening of the guide vanes with increased turbine speed until the guide vanes are at the maximum open position at approximately 95% rated turbine speed.

The synchronizer detection circuit 342 is responsive to sensed system voltage derived in this case from a bus potential transformer as indicated by the reference character 452 and sensed generator voltage derived in this instance from a generator potential transformer as indicated by the reference character 454 to detect the relative conditions of the two sensed waveforms for operator or automatic synchronization of the generator 102 with the system by closure of the generator breaker after completion of the startup period. For line breaker synchronization, the inputs are computer switched to the proper potential transformers. Respective square wave signals are generated by Zener diode clipped amplifiers 456 and 458 to which the system and generator voltage signals are respectively applied.

The two square waves are applied to an AND circuit block 460 which generates an output only when both squarewave signals are in the ON condition. In turn, an analog switch 460 applies an input to a phase difference amplifier 464 during the time period that a signal is generated by the AND circuit block 460.

The output voltage from the phase difference amplifier is proportional to the phase difference between the generator and system voltages and it is applied to an operator's panel voltmeter 466 for use by the plant operator during manual synchronization. At the extreme limits, a 180° phase difference results in a phase difference voltage approaching zero volts and a 0° phase difference results in a phase difference voltage of 5 volts. The phase difference voltage is also applied to the computer 304 through the analog input system 308 when programmed automatic synchronization is employed.

It is also noteworthy that the generator voltage signal is phase shifted 90° by a capacitor 468 for vector summation with the system voltage signal at the input of a beat voltage generator amplifier 470. A diode 472 operates in the amplifier circuit to cause a beat frequency signal to be generated for input to the computer 304 through the analog input system 308 as a relative speed indication for programmed automatic synchronizing.

CONTROL PANELS

Figure 24:
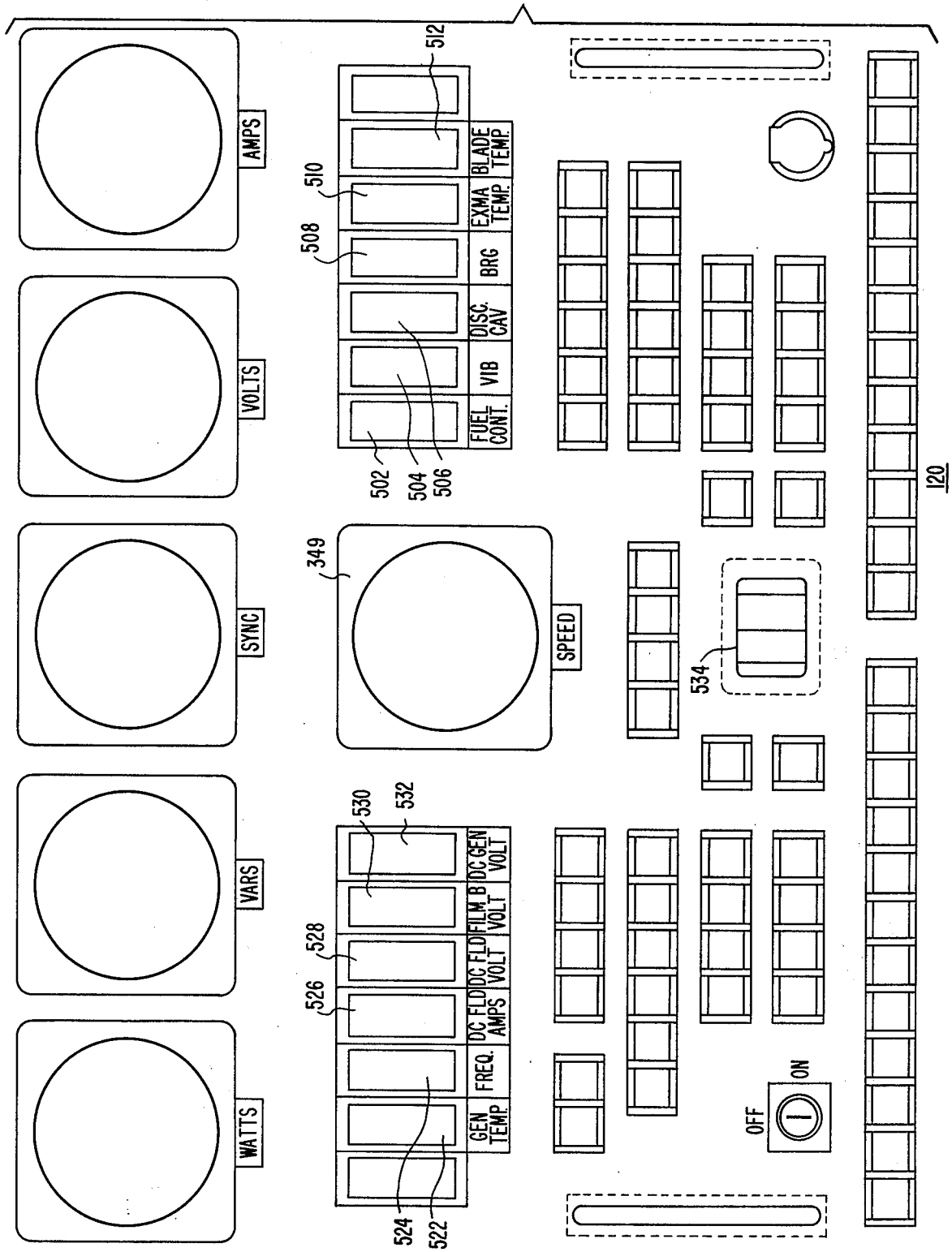
FIGS. 24 and 25 respectively show front plan views of a local operator's panel and a remote operator's panel employed in the control system.
Figure 24B:
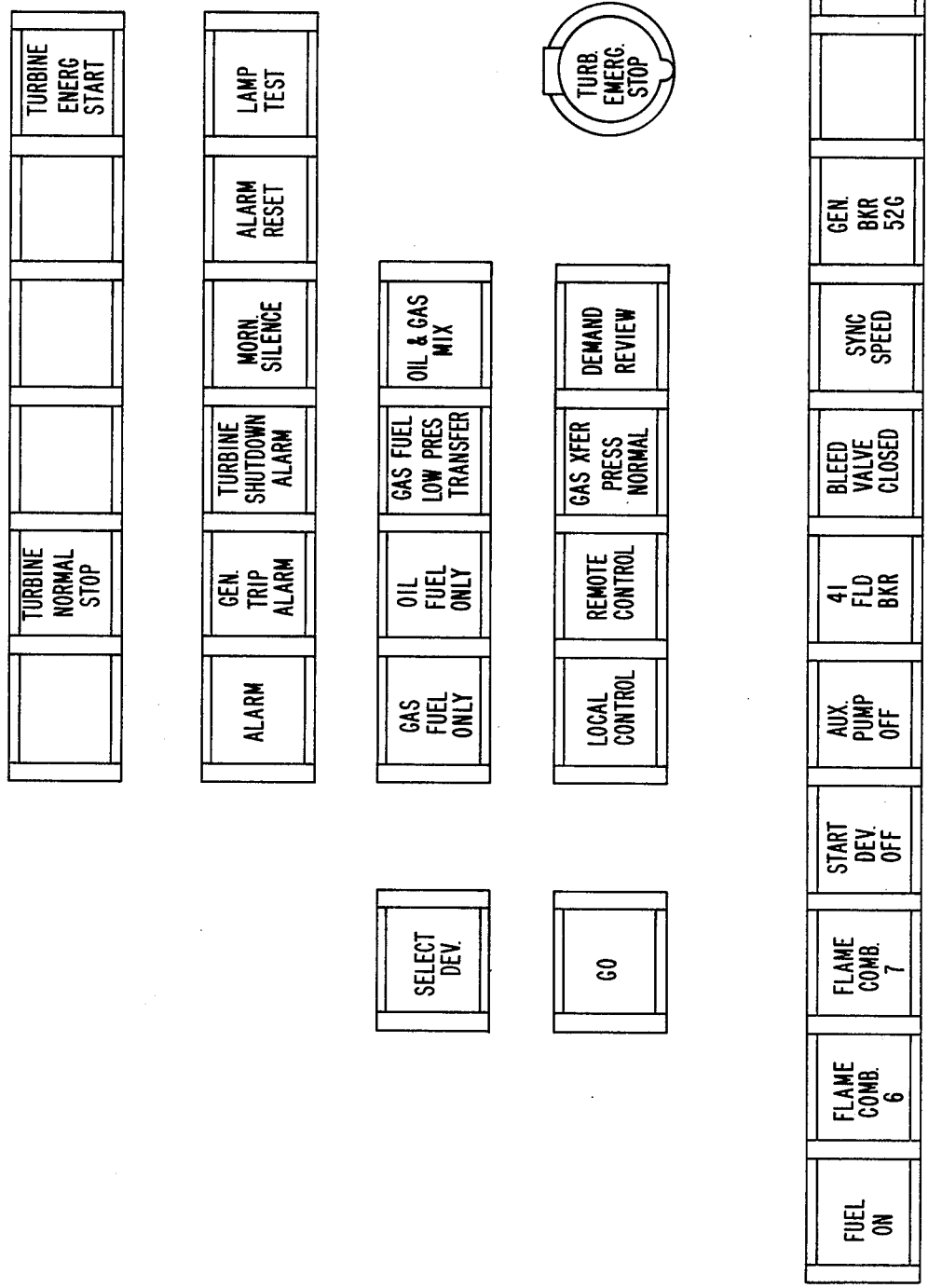

The operator's panel 120 considered in connection with FIG. 1 is included as part of an operator's console and it is shown in greater detail in FIG. 24. Continuous display meters are provided for the following turbine variables as indicated by the reference characters in parentheses:
Turbine Speed (Dual Scale) — (349)
Fuel Demand Signal — (502)
Vibration (Turbine or Generator) — (504)
Disc Cavity Temperature — (506)
Bearing Temperature (Turbine or Generator) — (508)
Exhaust Temperature — (510)
Blade Path Temperature — (512)
Continuous display meters are also provided for the following generator variables:
Watts (Dual Scale Optional) — (514)
VARS — (516)
Phase Difference for Synchronizing — (466)
Volts (Dual Scale Optional — (518)
Amperes (Dual Scale Optional) — (520)
Stator Winding Temperature — (522)
Frequency — (524)
DC Field Amperes — (526)
DC Field Volts — (528)
Running Volts — (530)
Incoming Volts — (532)
Many of the meters or indicators can display one of the several as an operational and maintenance aid. The SELECT INDICATOR and SELECT DEVICE pushbuttons are used in conjunction with a two decade thumbwheel switch 534 to select and display the desired quantities. Each selective display meter has an assigned number which can be set into the thumbwheel switch to cause that meter to be turned off when the SELECT INCICATOR pushbutton is pressed. If a variable such as a thermocouple temperature is to be displayed, a number associated with the variable is registered by the thumbwheel switch and the SELECT DEVICE pushbutton is pressed. The selected meter then indicates the selected variable.

During remote control, generator watts, VARS and phase A volts are automatically selected for the remote watt, VAR and volt meters corresponding to the watt, VAR and volt meters 514, 516 and 518. The local operator panel pushbuttons effective during remote control are:

Turbine Emergency Stop
Local Control.

Generally, a plurality of control pushbuttons are located in the illustrated arrangement beneath the meters just considered. One word of contact closure inputs and one interrupt is assigned to the operator panel 120. Identical For a listing of items located in the pressure switch and gauge cabinet, reference is made to the aforementioned Ser. No. 802, 470 . additional assignments are made for each additional operator's panel used under multiple gas turbine plant control. Within the fourteen bit contact closure input word, eight bits are assigned for reading the two decade thumbwheel switch 534 and the other six bits are employed to identify the pushbutton depressed to produce the computer input.

All of the pushbuttons cause a circuit to be closed while depressed so as to cause a single normally open pushbutton contact to be connected to a diode matrix. A pushbutton operation energizes the common interrupt the operator's panel 120 and applies voltage to a unique combination of the six bits assigned to the pushbutton. The contact closure input word is read within milliseconds and the bit combination is stored for further processing Operation of a second pushbutton while a first one is still depressed causes no additional interrupt but generally only one pushbutton should be operated at a time. Mechanical barriers are provided between adjacent pushbuttons, and critical groups of pushbuttons are mechanically interlocked.

Once a panel contact closure input word is read, it is repetitively read until the bit pattern changes to indicate that the pushbutton has been released or another button has been depressed. In this manner, raise, lower and test actions can be continued during the period of pushbutton depression.

The breaker pushbutton control switches are effective only under local, manual synchronizing control. In addition, lockout must be reset to close the field breaker and the generator breaker must be tripped before the field breaker can be tripped. To close the generator breaker, the field breaker must be closed, the master contact function must be in the ON state, lockouts must be reset and the manual synchronizing equipment must be in service. The manual synchronizing equipment also must be in service to close the line breaker.

Synchronizing ON and OFF pushbuttons are associated with both the generator and line breaker pushbuttons. If the synchronizing equipment is in service for one breaker and a similar request is made for the other breaker, the request is ignored. The SYNC ON lamps are in parallel to display the fact that the synchronizing equipment is in use regardless of the row of breaker pushbuttons under observation.

A pair of synchronizing lights are placed under the speed meter 349 as shown to act as conventional synchronizing lights driven by reduced voltage transformers in the transformers in the protective relay cabinet. The AUTO SYNC and MANUAL SYNC pushbuttons provide for selecting the synchronizing mode to provide for generator breaker closing after the gas turbine 104 has been accelerated to idle speed.

With respect to gas turbine control, pushbuttons are provided for both normal and emergency starting and stopping. The emergency stop operation causes immediate opening of the generator circuit breaker and turbine shutdown. The normal stop operation first reduces the load to minimum (approximately 10%) and turbine shutdown is then initiated.

The normal turbine start selection is combined with load selection. Thus, pressing the pushbuttons associated with minimum, base or peak load provides for initiating a normal turbine start. After the generator breaker is closed the selected load level is automatically generated. The minimum, base and peak load levels can be selected at any time, but the system reserve load level can be selected by the associated pushbutton only after the generator breaker has been closed. The SYSTEM RESERVE pushbutton accordingly cannot be used to initiate a start. On emergency start, the gas turbine unit 104 is driven to the base load level of operation after it has reached idle speed and the generator breaker has been closed. However, a different load can be selected if desired. The LOAD RAISE and LOAD LOWER pushbuttons provide manual control over speed reference during synchronizing in Mode 2 and during temperature control in Mode 4. In Mode 3, these pushbuttons control the kilowatt reference.

The operator is provided with generator control by VOLT RAISE and VOLT LOWER pushbuttons which control generator voltage during manual synchronization and after manual or automatic synchronization. A pair of pushbuttons are also provided to control a pair of contact closure outputs from the computer 304 to place the generator voltage regulator on automatic or manual operation. On automatic operation, the voltage regulator is switched into service when the generator field breaker closes. The VOLT RAISE and VOLT LOWER pushbuttons control the base adjusting rheostat is manual operation and the voltage adjusting rheostat in automatic operation.

Pushbuttons are also provided for fuel selection, in this instance gas or oil or an oil and gas mix. Another pushbutton provides for automatic transfer between gas an oil prior to burner ignition or after synchronization or from gas to oil on loss of gas supply pressure. The gas turbine unit 104 can be started on gas or oil and, if a fuel mix is selected, the gas turbine 104 starts on gas and mixes oil to a predetermined ratio after synchronization. The predetermined gas/oil ratio in the fuel mix can be varied with the use of the thumbwheel switch 534 and the SELECT DEVICE and SELECT INDICATOR pushbuttons.

On the occurrence of an alarm, the alarm light is flashed and a horn blow is caused unless the plant is under remote control. A HORN SILENCE pushbutton provides for stopping the horn blow. The ALARM RESET pushbutton causes any flashed alarm to go from the flashing condition to a steady ON condition and the turbine lockout conditions to be reset. When the faulty conditions are cleared, the alarm lamp goes dark. Generator lockout relays are flashed when tripped by the GEN TRIP ALARM light and they must be reset manually. A LAMP TEST pushbutton causes all lights on the operator's panel 120 to flash ON and OFF for lamp test purposes.

The following startup sequence lamps are located in a botton row across the bottom of the operator's panel 120:

| Color  | Function                |
|--------|-------------------------|
| Red    | Turbine Auxiliaries Reset |
| Red    | Turbine Trip Reset      |
| Green  | Ready to Start          |
| Red    | Master Control On       |
| Yellow | Auxiliary Pump On       |
| Red    | Turbine Tube Pressure 63-4 |
| Yellow | Turning Gear On         |
| Red    | Lube Pressure 63-1      |
| Yellow | Start Device On         |
| Red    | Overspeed Trip Valve    |
| Yellow | Overspeed Trip Pressure |
| White  | Ignition On             |
| Red    | Fuel On                 |
| Red    | Flame Combustor 6       |
| Red    | Flame Combustor 7       |
| White  | Start Device Off        |
| White  | Auxiliary Pump Off      |
| Red    | Field Breaker 41        |
| Red    | Bleed Valve Closed      |
| Yellow | Synchronous Speed       |
| Red    | Generator Breaker 52G   |

Some of the startup sequence lights are pushbuttons which can be depressed before or during a startup to cause the startup sequence to hold at the process point represented by the pushbutton. A HOLD pushbotton causes the speed reference to stop advancing during acceleration, and it is automatically cleared on shutdown. The hold point pushbuttons flash when selected and, at the selected hold point, the corresponding light burns steady and the HOLD pushbutton light flashes. A hold is released by depressing the GO pushbutton which has a light normally not lit but energized during lamp test for uniformity. The HOLD POINT pushbuttons are AUX PUMP ON, TURNING GEAR ON, START DEVICE ON, OS TRIP PRESS, and SYNC SPEED. Maintenance operations are facilitated with the use of the sequence lights and pushbuttons and the HOLD and GO pushbuttons. The operator's panel 120 also provides for selection of local control or remote control by the associated pushbutton. A DEMAND REVIEW pushbutton provides for printout of current alarm conditions.

One operating advantage associated with the operator's panel 120 and its interaction with other elements of the control system 300 is that selected analog and CCI points can be read and selected CCO points can be operated in conjunction with plant maintenance operations. Among other advantages, control system potentiometers and other adjustable elements can be conveniently manipulated for meter calibrations during setup procedures.

An annunciator panel to which reference was previously made in connection with FIG. 19B can be mounted on top of the operator's panel 120 on the control console. The annunciator panel can be part of an alarm system and it contains a predetermined number of lamps driven by respective contact closure outputs from the computer 304.

The vibration monitors to which reference has already been made are also mounted in the operator's control console. Similarly, flame detection monitors are mounted at the control console.

Figure 25:
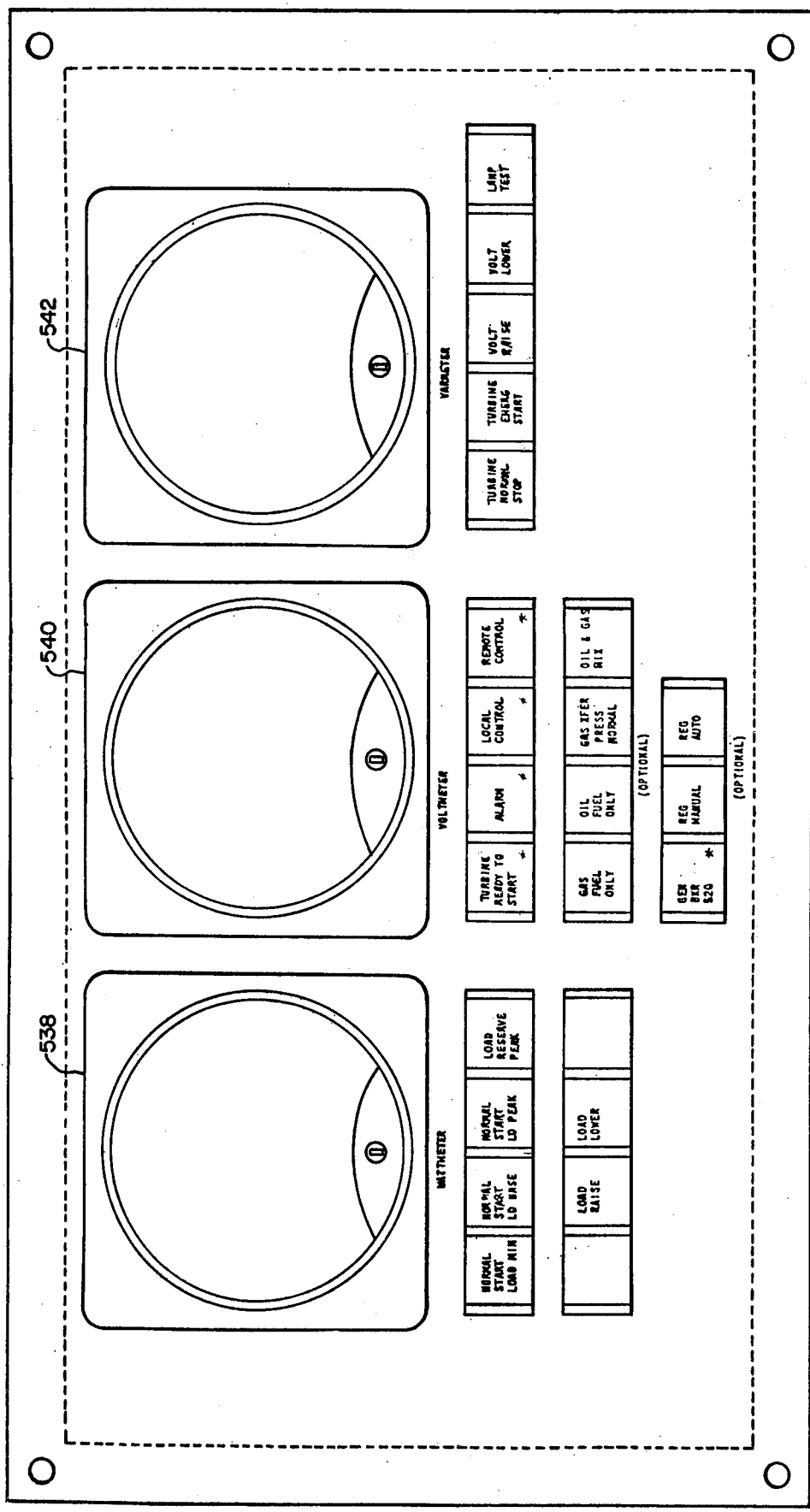

A remote control panel 536 is shown in greater detail in FIG. 25. It includes meters 538, 540 and 542 which display the indicated quantities or quantities selected at the local operator's panel in the manner previously indicated. The remote panel control pushbuttons duplicate the functions of the corresponding pushbuttons on the local operator's panel 120.

When a remote control pushbutton is depressed, a diode matrix converts the operation to an interrupt and a five bit binary code. The remote interrupt channel is provided in addition to the local operator's panel interrupt channel, and five separate contact closure inputs are provided for the remote panel 536. The lamps provided for the control pushbuttons included with the remote panel 536 are connected in parallel with corresponding lamps on the operator's panel 120. Generally, the remote panel 536 is suitable for direct wire connection up to 2500 feet from the operator's panel 120.

If supervisory control is selected, the remote control panel 536 is not used. Instead, the local supervisory contacts are coupled to the computer system 305 where a diode matrix converts them to an interrupt and a five bit code for connection to the five contact closure inputs otherwise used for remote panel operation. Seven contact closure outputs are employed to indicate the status of the lcoal operator panel lamps otherwise connected to the remote panel.

Reference is made to aforementioned Ser. No. 582,470 describing the local and remote operator's panel pushbutton codes, the operator's panel contact closure output assignments, and the entering of control parameter changes into the control system 300.

D. PROGRAM SYSTEM

1. General configuration

Figure 26:
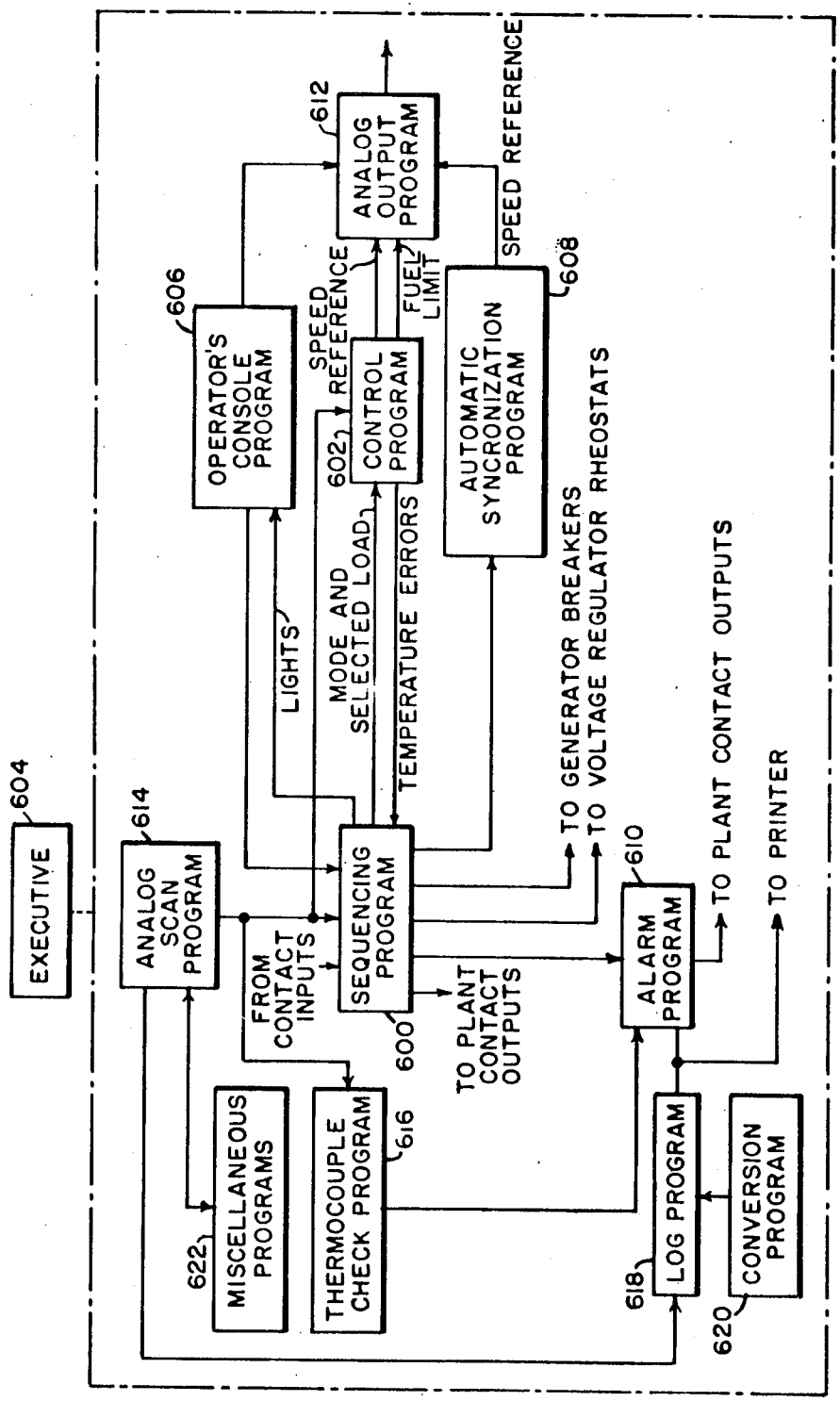
FIG. 26 shows a general block diagram of the organization of a program system employed in the control system computer.

The computer program system is organized to operate the computer system 305 so that it interacts with other control system elements and plant devices to operate the gas turbine plant 100 and other similar plants as required to produce electric power with many user advantages. As schematically illustrated in FIG. 26, the program system comprises a sequencing program 600 and a control program 602 which make most of the plant operational determinations for output to the control system interfacing and control hardware. An executive program 604 schedules the use of the computer 304 by the various programs in the software system in accordance with a predetermined priority structure. The executive program 604 also provides certain other functions considered more fully subsequently.

Generally, the sequencing program 600 accepts contact closure inputs, analog inputs, and operator console inputs from an operator console program 606 to provide through contact closure outputs plant startup and other functions including alarm and housekeeping tasks prior to, during and after startup. As indicated in FIG. 26, the sequencing program 600 supervises the control program 602 by specifying the control mode and the selected load. The control program 602 transmits date to the sequencing load. The control program 602 transmit data to the sequencing program 600 including for example hot blade path temperature indications during load operation which require plant alarm and shutdown.

An automatic synchronizaton program 608 is also supervised by the sequencing program 600 to provide for generator voltage regulator rheostat operation and turbine speed adjustment during automatic synchronization. The sequencing program 600 processes manual synchronization operation. It also transmits lamp light determinations to the operator's console program 606 and alarm determinations to an alarm program 610.

The operator's console program is a package of subprograms which provides for interfacing the operator's panel 120 with the computer 304. The alarm program 610 provides for printout of detected alarms.

During the various modes of plant operation, the control program 602 makes intermediate control determinations which result in the determination of a turbine speed reference representation and a fuel demand limit representation for application as analog signals to the analog speed control 324 as previously described. Analog outputs from the control program 602, the automatic synchronization program 608 and the operator's console program 606 are processed by an analog output pulser program 612 to provide for generation of accurate external analog voltages corresponding to the internal digital determinations. Analog inputs for the sequencing program 600 and the control program 602 and other programs are determined and stored by an analog scan executive program 614.

A thermocouple check program 616 makes a validity check on the thermocouples not checked by the sequencing program 600 or the control program and generates an alarm for alarm program printout when a thermocouple reading indicates an open circuit. A log program 618 operates in conjunction with a conversion program 620 to generate a periodic printout of the values of predetermined analog inputs. Other programs included in the program system are classified as miscellaneous programs 622.

2. Executive Systems

Generally, the executive program 604 provides for the execution of other programs on a priority basis, facilitates communication between the input and output equipment and other programs in the program system, and standardizes the handling of interrupts from the interrupt system 314. In the particular case of the P50 computer system, the executive program is a commercially available package which is operable in a wide range of applications. For a particular application like that present one, the executive program is initialized or tailored to the particular application by the entry of certain system parameters. Since the executive program is per se a part of the prior art, its functioning will be considered here only insofar as it will aid in reaching an understanding of the program system and the control system and power plant operations of the preferred embodiment.

In the program system, the individual programs are repeatedly executed, typically with only the program variables changed. The executive priority system accordingly defines the order in which programs are executed since some programs must be executed as soon as data is available while other programs are of lesser importance. In the P50executive priority structure, a dominant priority level and a secondary priority level are provided. Each of the main priority levels in turn is divided into a number of sublevels. Generally, higher numbers imply higher sublevel priority.

The priority executive program administers the priority scheme outside the priority structure. On the dominant level, programs are executed according to real time, i.e. a program which is first bid is executed first if two programs are bidding to run simultaneously. On the secondary level, the programs are executed according to a preestablished order. Any time two programs are bidding to run the program on the highest sublevel is executed first. On both main priority levels, the programs run to completion before another program can be started on that level.

Dominant level programs can be initiated periodically through an auxiliary synchronizer routine, or they may be initiated by interrupt, or they may be initiated by an error condition detected by a program execution on a sublevel of the secondary level. The secondary lower priority level priority level runs when the dominant level is not running. The secondary level in this case contains 14 sublevels which run according to a calling priority established when the executive program 604 is initialized. A sublevel program may be bitting to run, running, in time delay, suspended, or turned off. Once a sublevel is initiated, it cannot be interrupted by a sublevel with higher priority on the secondary level. When a sublevel program turns off, is suspended or enters a time delay, the sublevel program with the highest calling priority which is bidding will run. Generally, the majority of the programs in the gas turbine power plant program system are assigned to the secondary level.

The priority executive element of the executive program 604 comprises the following executive programs:

1. Bid Executive for the Dominant Level— This program permits a program or an interrupt routine to place a dominant sublevel into the bidding state; a program on the dominant level cannot bid for another program on the dominant level.

2. Bid Executive for the Secondary Level 13 This program permits a program or an interrupt routine to place a secondary sublevel into the bidding state.

3. Turn Off Program Executive for the Dominant Level.

4. Turn Off Program Executive for the Secondary Level .

5. Time Delay Executive for the Secondary Level —. This program routine is available only on the secondary level and it provides for downcounting a time delay with the synchronizer interrupt routine.

6. Suspend Program Executive for the Secondary Level — This program is also only available on the secondary level and it permits a call for an indefinite time delay.

7. Unsuspend Program Executive for the Secondary Level — This program is used in conjunction with the suspend program executive.

The following table provides a definition of the priority levels employed in the program system used to operate the P50computer system 305:

PRIORITY LEVELS

| Dominant Level Programs |
| --- |
| 1. Analog output pulsing, span adjust and scan. |
| 2. Operator's Console A. |
| 3. Operator's Console B. |
| 4. Operator's Console C. |

-continued
PRIORITY LEVELS

5. Operator's Console D.
6. Automatic Synchronizing A
7. Automatic Synchronizing B.
8. Automatic Synchronizing C.
9. Automatic Synchronizing D.
10. Spare
11. Spare
12. Spare
13. Spare
14. Spare

Secondary Sublevel Programs

| Sublevel | Description |
|---|---|
| 14 | Spare |
| 13 | Message Writer Device O |
| 12 | Operator's Console |
| 11 | Sequencer |
| 10 | Control |
| 9 | Dead Computer |
| 8 | Analog Output |
| 7 | Alarm |
| 6 | Spare |
| 5 | Logging |
| 4 | Horn and Alarm Lamp |
| 3 | Cold Junction Comp. |
| 2 | Thermocouple Check |
| 1 | Programmer's Console |
| 0 | Confidence Check Conex |

The executive program 640 also includes an input-/output program which is available to control the communication of digital variables between the computer 304 and the input/output systems. In this case, only the output contacts are grouped into registers to be placed under executive program control. Requests for contact outputs are queued by the input/output executive program and control is returned to the calling program until a hardware interrupt indicates the external circuitry is ready to accept a contact output. Input contacts are random accessed in the present case. The input/output executive element of the executive program 604 further includes the following subelements:
 Bidding Subroutine
 Input/Output BCD Character Routines
 Contact Closure Output Executive
 Programmer's console Executive
 Message Writer Executive.

Generally, an interrupt is initiated by a piece of hardware external to the computer 304. An interrupt stops the current program execution unless it is locked out or temporarily inhibited. The interruption causes a branch to an interrupt routine which is identified by the interrupt and the program structure. Generally, all interrupt routines provide for saving and restoring registers so that the interrupted program can again be processed from the interrupt point. Lockout can be generated by hardware or software.

Executive interrupts initiate programs which are executed under hardware interrupt lockout. Process interrupts initiate programs which are executed under software lockout on the dominant level.

The following executive interrupt routines are included in the executive program 604:
 Synchronizer Interrupt
 Contact Closure Output Completion Interrupt
 Programmer's Console Attention Interrupt
 Programmer's Console Input Interrupt
 Programmer's Console Output Interrupt
 Device Output Completion Interrupt.

The executive program 604 also includes a multiply/-divide program. The multiply routine develops a 28 bit product from two 14-bit factors and the divide routine produces a 14 bit quotient from a 28 bit dividend and a 14 bit divisor. A binary to BCD conversion program is also included in the executive program 604 to convert binary numbers to decimal numbers which are placed in designated storage locations.

3. Programmer's Console Package

The programmer's programs are provided to facilitate communication with the P50computer. Generally, the console package provides a means for loading programs into the computer, executing programs, loading constants or instructions and dumping areas of main and extended core memory. Core locations can be dumped in binary or tape or in octal or a keyboard.

As already indicated, the programmer's console package operates within the priority structure of the executive program 604 and its elements are generally classified as a part of that program. After the programmer's console package has been bid by depressing a programmer;3 s console interrupt button, the keyboard set is turned on and an input is requested. An input consists of a two letter mnemonic followed either by a space and up to four constants or by a return. If more than two letters precede the space or the return, only the last two letters are considered by the computer. The resulting two letter mnemonic is compared to the defines mnenonics and if no mnemonic is found in correspondence to the entered mnemonic and error is printed.

If the entered two letter mnemonic is equal to a stored mnemonic, a transfer to the proper program is made and if a space followed the mnemonic code any constants preceding the return wil be input. The number of constants depneds on the function being initiated. Constants may be entered in octal or decimal and a plus or minus sign preceding a constant specifies it to be a decimal number while unsigned integers are treated as being octal. Constants are terminated by a slash or by a return.

If the correction character left parenthesis "(" is encountered, all digits following the last slash or the space are ignored. If more than four constants are entered before a return, an error is printed and the programmer's console package turns the keyboard set off. If the number of constants entered is different from that required by the function being initiated, an error is printed and the keyboard set is turned off.

When a return is input to the programmer's console package, a transfer is made to the particular console program requested with the constants stored in the order in which they were input. When the programmer's console program completes the requested activity further constants are entered in the same manner as the initial constants if they are required.

The programmer's console package in the executive program includes the following programs:
 1. Binary Load — Provides for loading a binary program tape through the programmer's console tape reader into main core.
 2. Binary Punch — Causes the programmer's console punch to punch in binary a core area or core location, a transfer code or a stop code depending upon the number of input constants.
 3. Check Tape — Provides for comparing a binary program tape with the main core contents on a word-by-word basis.

4. Numeric Load — Provides for making numeric entires into main memory.

5. Octal Dump — Provides for printing the contents of a core area of location in octal.

6. Run On Machine.

7. Set Limits — Provides for entry of alarm limits and the like.

8. Update Time — Provides for setting hours, minutes and seconds into the computer. In addition, the programmer's console package includes an analog value to engineering units conversion program considered subsequently in connection with the log program.

4. Operator's Console Program

Figure 28:
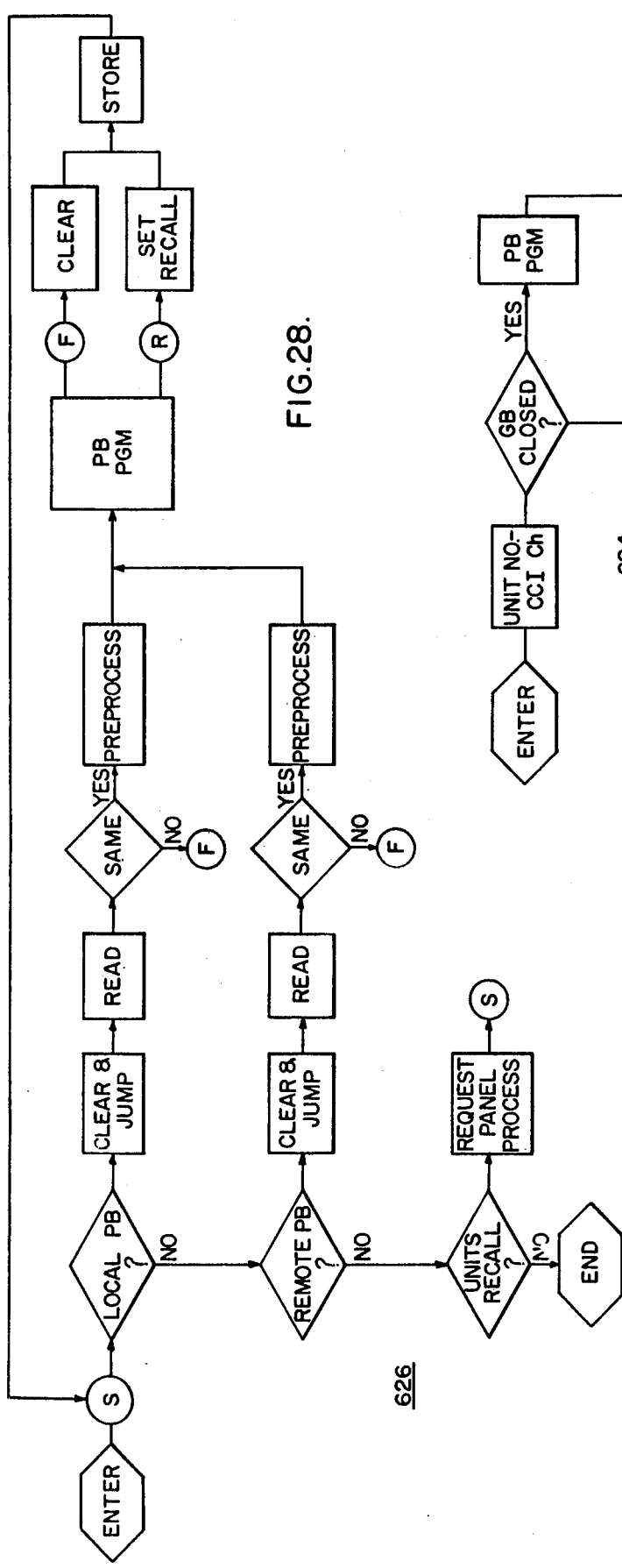
FIGS. 27 and 28 show respective flowcharts representative of operations associated with the operator's panel.
Figure 27:
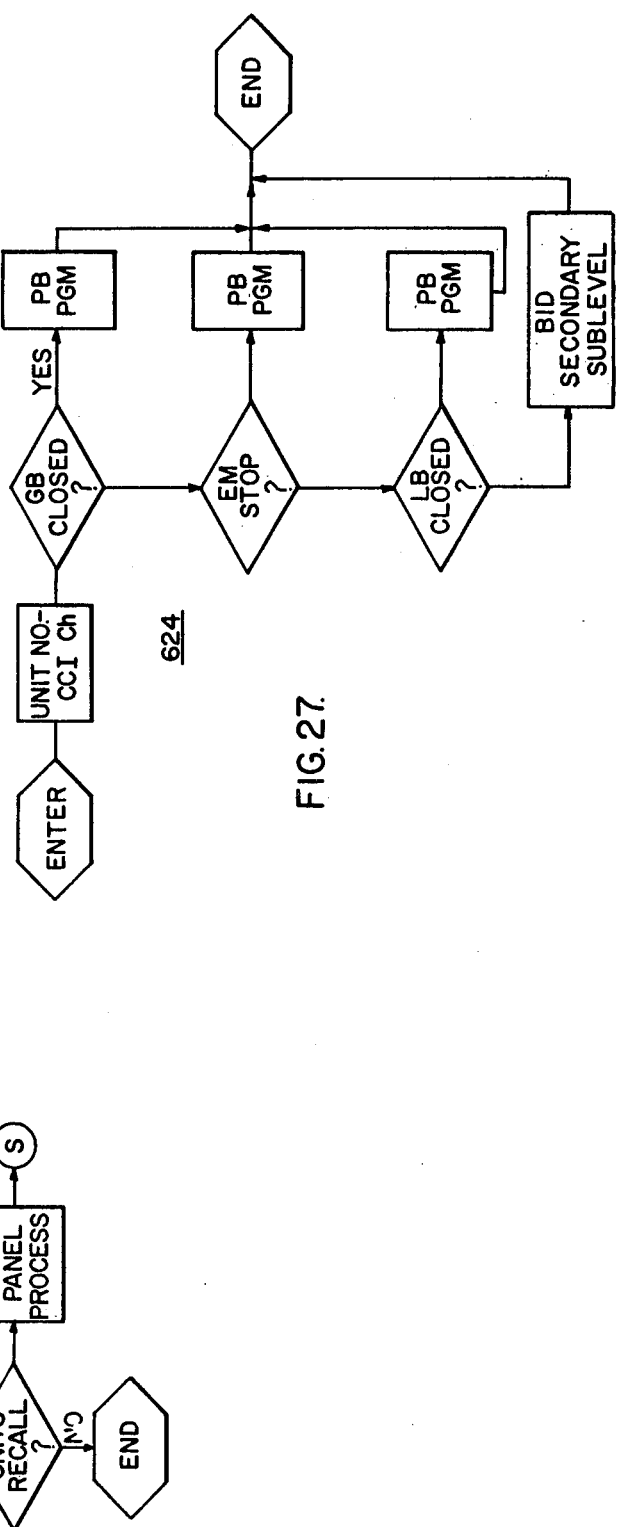

Flowcharts for the operator's console program are shown in FIGS. 27 and 28. Generally, a depressed local operator's pushbutton causes a unique six bit code and a panel interrupt. The interrupt routine bids a dominant level operator's console program represented by flowchart 624 in FIG. 27. A similar flowchart (not shown) applies for the remote direct wire control panel or for supervisory control.

The dominant level operator's console program first identifies the gas turbine or plant number and stores the contact closure input channel number for the local operator's panel associated with the identified turbine. The contact closure input channel includes six bits for the pushbutton code and eight bits for the thumbwheel switch input.

Determinations are then made as to whether generator breaker closing, line breaker closing or emergency shutdown has been requested. If so, immediate processing of the requested pushbutton control program is initiated. If not, a flag corresponding to the associated turbine is set in the secondary sublevel program and it is put into the bidding state.

The operator's console secondary sublevel program is represented by flowchart 626 in FIG. 28. When the secondary sublevel program is executed, a check is made of the local panel flags under lockout to determine whether any require processing. If a local panel flag has been set, that flag is cleared, a turbine identifying number is registered, lockout is cleared and a jump is made to a local operator's read program. The associated contact closure input is again read and compared with the previous input and if it is the same a preprocessor block is caused to pick up needed logical variables and a jump is made to the individual pushbutton program required by the panel pushbutton operation. Generally, the pushbutton programs are associated with other program blocks in the program system such as the sequencing program 600 or the control program 602. If no local panel flags have been set, an examination is made of the remote panel flags and if a remote panel flag has been set action similar to that just described for the local pushbutton flag is initiated for the remote panel flag.

Generally, the pushbuttons cause bits to be set in three words for each turbine in resident tables considered subsequently in connection with the sequence program 600. Some pushbuttons, such as the LOCAL and REMOTE pushbuttons have flip-flop action and the associated pushbutton programs accordingly run once and go to a final exit junction F. Other pushbuttons cause a bit set only as long as the pushbutton is depressed so that after the pushbutton program is run, it exits through a recall junction R. The F exit causes all bits in the operator's console bit table to be cleared except the flip-flop bits and then causes a jump to a program called STORE which post-processes and transfers the operator's console bit table to the turbine resident tables used by the sequencing program 600. Lockout is then set and a jump is made to the beginning S of the oerator's console secondary sublevel program to determine whether any other panel inputs need to be processed The R exit causes a recall flag to be set and a jump to be made to the store program.

After all operator panel inputs have been processed, an examination is made of the recall flags for each panel. If one of the recall is set, it is cleared, a common recall flag is decremented and a flag is set requesting the associated panel to be processed.

After all panel recall flags have been examined, the common recall flag is checked. If any operator panel inputs need to be reprocessed after a short time delay, the common recall flag is not zero. In such case, the common recall flag is reset to zero and the program is put into time delay after which the secondary sublevel program is restarted at junction S. When the common recall flag is set a zero, the sublevel program is turned off.

If is noteworthy that the SELECT INDICATOR and SELECT DEVICE pushbuttons are associated with programs used to load addresses into a table in the analog output program 612 to indicate from an analog input table associated with the analog scan program 614 those values which are to be displayed on the various operator's panel instruments. The analog output program 612 is subsequently considered more fully.

5. Analog Scan Program

Generally, the analog scan program provides an executive function in reading all analog points associated with the power plant 100 and any similar plant units. The frequency at which the analog points are read is determined by the needs of the process operation, and in this instance it is set at 30 points per second. The analog scan program can be executed under hardware or software interrupt lockout The analog scan program 614 is arranged such that all points which require reading within a predefined shortest time period are read within that period, and an appropriate fraction of other groups of analog points that must be read within longer periods are also read within the shortest time period. For example, slightly more than one-fifth of all inputs that require reading within a 5 second period are read during the same base period of 1 second.

The analog input system 308 (FIG. 12) includes a digital to analog converter and a multiplexer circuit. After each converter cycle, an interrupt starts the execution of the analog scan program 614. All points set up during the last converter cycle are read and the multiplexer is set for the next group of points as soon as possible after the interrupt has been received. At the last input command, the converter cycle is reinitiated and the necessary housekeeping and address modifying functions are performed to set up the input and output commands for the next converter interrupt.

For thermocouples, cold junction correction is added by the analog scan program before the value is stored in core. Thermocouple data processing is otherwise executed by the check program 616 or the control program.

6. Analog Output Program

Figure 30A:
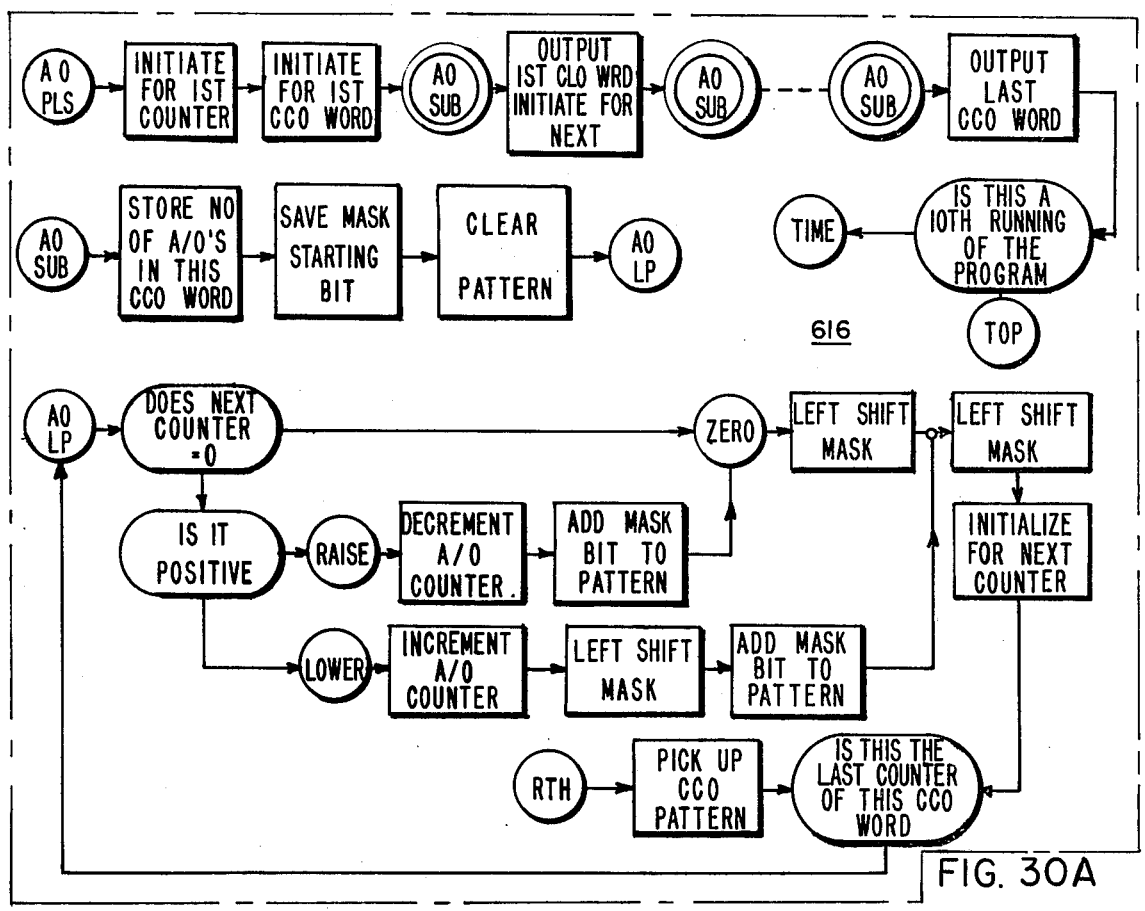
FIGS. 30A-C show flowcharts associated with an analog output program which is employed in the computer to cause the generation of output analog signals.
Figure 30B:
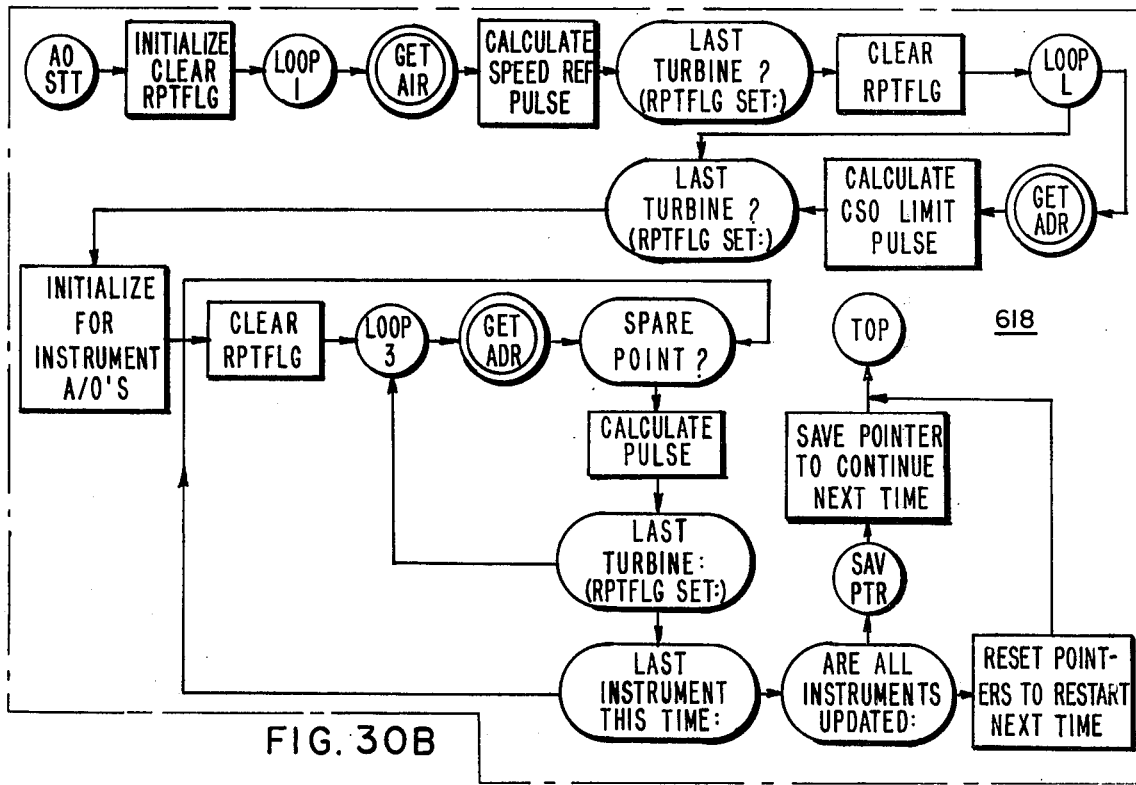
Figure 30C:
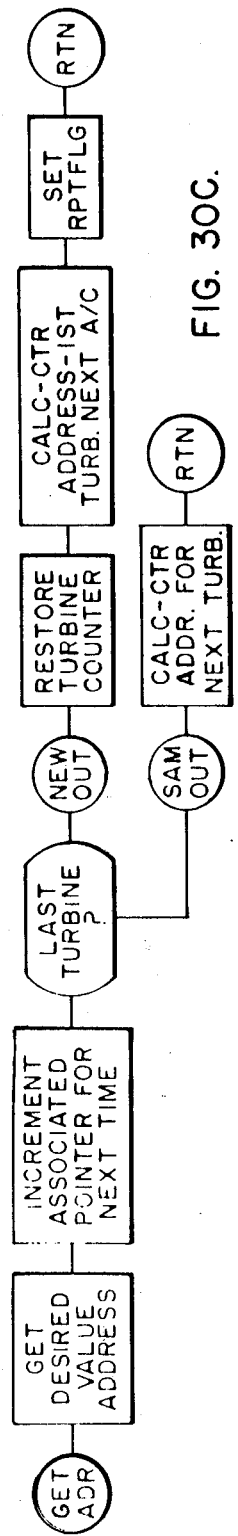

As previously considered, the general approach employed for generating analog outputs is to employ external holding type operational amplifiers with the amplifier outputs measured by the computer through the analog input system 308. The measured value is compared with the desired value and the difference is employed in determining how long raise or lower contact closure outputs must be closed to make the holding amplifier integrate to the desired value. The raise or lower value is computed in tenths of a second and it is determined by an element of the analog output program 612 which is run on a secondary level while the actual closure output pulsing is performed by a pulser element of the analog output program 612 run on a dominant level every tenth of a second. The secondary level analog output program element is run every second for speed reference and load limit and every five seconds for the remaining outputs. FIG. 30A illustrates a flowchart representative of the dominant level pulser element 616 of the analog output program 612. Flowcharts 618 and 620 representative of the secondary sublevel analog output program element are shown in FIGS. 30B and 30C.

The pulser program employs a counter table having a highest address at location AOCTR. One counter is provided for each analog output and the table is repeated for each turbine plant placed under control. The pulser program examines each analog output counter and if it is zero the associated raise and lower contact closure outputs are opened. If the counter is positive it is decremented by one and the raise contact closure output is closed. If the counter is negative, it is incremented by one and the lower contact closure output is closed.

The raise and lower contact closure outputs appear in two contact closure output registers and part of two other contact closure output registers for each turbine. The raise and lower contact closure always as adjacent bits with the lower contact closure output being the odd-high bit. a macro AOM is defined which, in conjunction with a subroutine AOSUB, formulates and outputs one contact closure output word. The variables to be specified by each macro are determined by a one bit mask indicating the lowest raise bit to the output, a number indicating the number of adjacent analog contact closure output pairs to be formulated, and bits and registers used in the contact closure output call. The macro is repeated for each contact closure output word. The order of analog outputs in the counter table corresponds to the order of the register numbers in the macros and the order of the bits in the individual contact closure output word.

After initialization, the secondary sublevel analog output program element loads the counter table in three parts. First, the speed reference counters are loaded for all turbines. As observed in FIG. 20, these contact closure outputs are associated with an R-C delay in the hold integrator amplifier inputs, and an anticipation scheme is employed to take into account the energy stored in the capacitor. From the difference in the program calculated and desired value and the measured value for a speed reference output, there is subtracted any anticipated additional change as calculated the previous second, the error is limited to a value corresponding to a one second pulse. Half of the error is saved as the anticipated change which would not yet have occured by the next second, and the error is right shifted several times and becomes the counter value.

Next, the fuel demand signal limit reference counters are loaded for all turbines. The count in this case is the difference between the desired and the measured values rightshifted several times for count scaling. Finally, instrument analog outputs are processed next. The instrument analog outputs are scanned every five seconds so that one fifth of them are output each second for each turbine. To calculate the pulse counter value, the desired value is added to an offset and the sum is multiplied by a constant. After shifting to the correct binary point, the measured value is subtracted and the difference is right-shifted several times for count scaling.

The length of tables and loop counters is correctly adjusted for various numbers of turbines by setting NOMCH in the symbol table equal to the number of turbines. The length of the counter table (AOCTR), the desired value address table (DVTB), and the speed reference anticipated change table (ANTTB) vary with the number of turbines while the other counter tables stay fixed in length. A desired value table DTTB contains the address of ASLP VALUE table locations which are to be output. For instruments, the desired value table is loaded by the operator's console program 606 and its order is also determined by this program.

A measured value table MVTB contains the addresses for turbine A of the ASLP VALUE table locations which contain the last measured value of the analog outputs. Because of interleaving in the ASLP VALUE table, the addreses for the other turbines are determinable. A conversion offset table COTB and a conversion slope table CSTB contain constants employed by the instrument analog output operations. A counter address table CTATB is employed to reconcile the difference in order of handling the instruments by the operator's console program 606 and the analog output pulser element of the analog output program 612. A counter table AOCTR contains the remaining time in tenths of a second that each integrator contact closure output should be closed.

7. Sequencing Program a. Functional Philosophy

Figure 31:
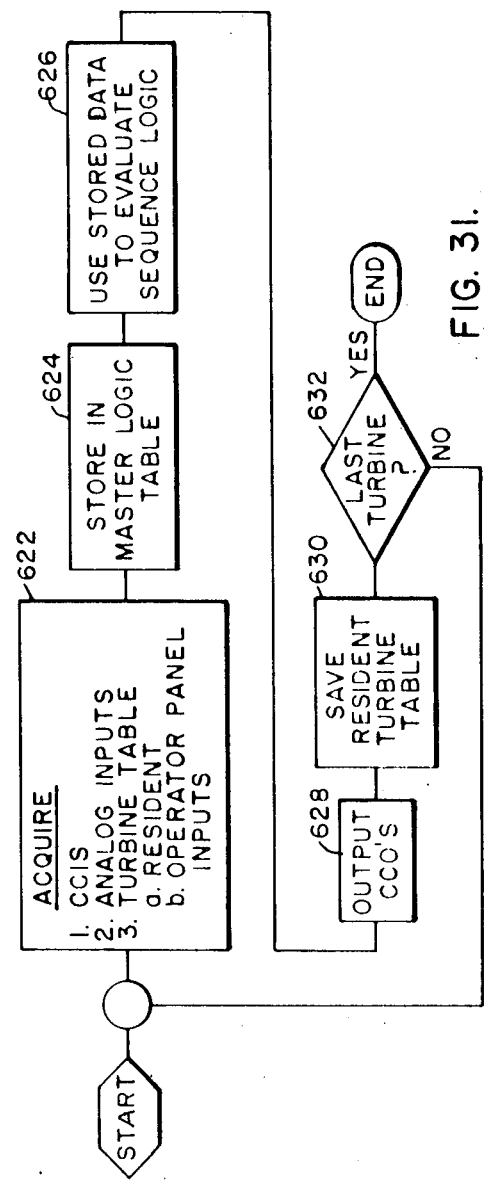
FIG. 31 illustrates a flowchart for a sequencing program associated principally with startup operations for the gas turbine.

Generally, the sequencing program 600 is represented by a flowchart shown in FIG. 31 and it is run once every second to provide the plant sequencing operations required during turbine startup, to provide certain alarm detections and to provide sequencing for various plant tasks during time periods other than the turbine startup time period. As indicated by block 622, certain information regarding the status of the turbine plant 100 and other controlled plants is required for sequencing program execution. The required plant status information which is acquired includes continuous analog data and contact input closures generated by operator panel switches pressure switches, and other plant devices. The acquired information is stored in a master logic table as indicated by the block 624. Next, in providing ultimately for better plant startup management and better plant management generally, the stored data is employed in the evaluation of a plurality of blocks of sequence logic as indicated by block 626.

The results of the evaluation of the sequence logic may require communication with other programs in the program system in which event the results are stored for used by those programs. As indicated by block 628, the results of the evaluation of the sequence logic may also require certain contact closure outputs. In block 630, a resident table of turbine data acquired from core memory by the acquisition block 622 is saved in the original core memory location while nonresident turbine data comprising operator panel inputs is allowed to be destroyed.

Block 632 then determines whether any additional turbines need to be processed in the current run of the sequencing program 600. If not, the sequencing program 600 is ended. If one or more gas turbines remain for sequencing logic determinations in the current run of the sequencing program 600, the program 600 is re-executed for the next turbine and the process is repeated until the last turbine has been serviced with sequence logic porcessing in the current sequencing program execution.

Figure 32:
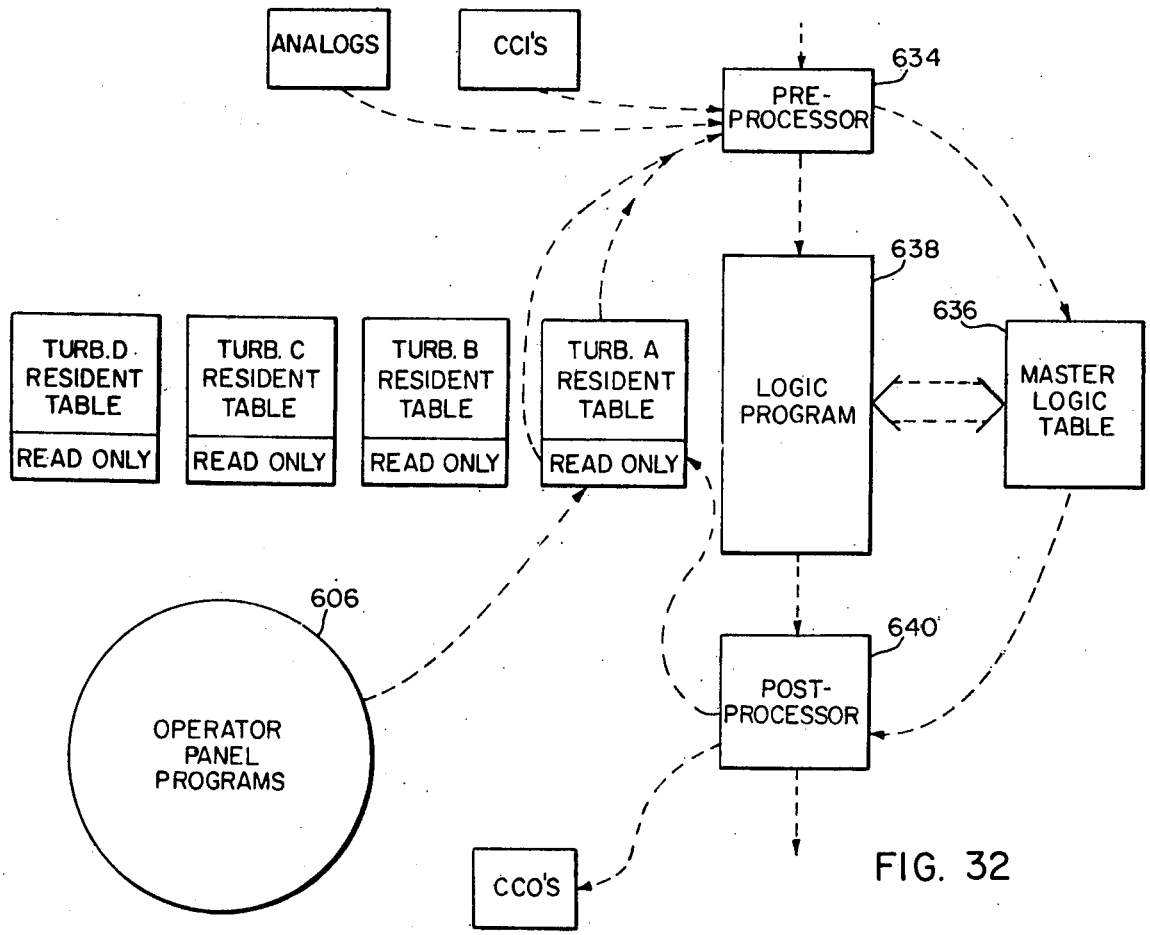
FIG. 32 shows a data flow diagram which illustrates the manner in which the sequencing program is executed to provide multiple power plant operations with a single control computer.

In FIG. 32, there is illustrated a data flow map for the sequencing program 600. As shown, there are four turbine data tables for the respectively designated gas turbines, A, B, C and D. Each gas turbine data table comprises a resident portion and a read only portion which is derived from the operator panel program 606. A preprocessor block 634 corresponds to the block 622 shown in FIG. 31, and it obtains data from analog inputs, contact closure inputs, the resident turbine A table and the read only turbine A table. The acquired data is stored in a master logic table as indicated by block 636 which corresponds to block 624 in FIG. 31. The master logic table 636 is employed in the execution of logic program block 638 which corresponds to block 626 in FIG. 31.

After the sequence logic has been evaluated by the program 638 a postprocessor 640 is entered and it corresponds to blocks 628, 630 and 632 in FIG. 31. Thus, contact closure outputs are generated and the turbine a resident table is saved. The postprocessor 640 then provides for a repeat program execution for turbine B table data if a second gas turbine plant is under control. Similarly, repeat executions are made to provide for entry and restorage of turbine C table data and turbine D table data if C and D gas turbine plants are under control. After the last turbine sequence program execution has been completed, an exit is made form the postprocessor block 640.

b. Sequencing Program Data Tables And Preprocess and Postprocess Routine

To obtain further information which shows the core organization of the turbine resident read/writer and read only tables, contact closure input and contact closure output data tables, the master logic table and turbine alarm data tables, reference is made to aforementioned (W.E. 40,062). In addition, further information on the contact closure input routines, analog input routines and cntact closure output routines employed in the blocks 622 and 628 can also be obtained in Ser. No. 082,470.

c. Plant Sequence Functions

Generally, the sequence control subsystem embraces certain logic operations which provide for an orderly advance of the process through startup, run and shutdown operations while providing many operating adantages. In providing sequence operations, the sequence control subsystem includes the sequencing program which interacts with the control program and with plant devices to provide direction to process events and simultaneously to provide plant and turbine protection.

The plant sequence functions associated with startup of the gas turbine 104 to operate the power plant 100 having previously been generally considered in connection with the startup chart shown in FIG. 18. In the startup process, a programmed computer master contactor function and operation selectors are employed to force the sequence of starting and operation to assure that turbine startup will normally take place over a fixed predefined time interval for the reasons previously considered. For plant startup to be enabled, certain plant conditions must exist.

Thus, the software master contactor serves to establish and disestablish logic conditions necessary for initiating the making and breaking of external control circuits for equipment startup and shutdown operations under predetermined plant and equipment conditions. All maintenance and transfer switches including the following must be in the correct position for starting:

| Motor Control Center (43 MC) | Pressure Switch & Guage Cabinet (43 PSG) |
|---|---|
| Diesel Heater | Ignition |
| Lube Oil Reservoir | Overspeed Trip |
| Instrument Air | Isolation Gas |
| Turbine Cooling Air No. 1 | Isolation Oil |
| Turbine Cooling Air No. 2 | Instrument Air Isolation |
| Vapor Extractor | |
| Lube Oil Cooler - Low | |
| Lube Oil Cooler - High | |
| Atomizing Air | |
| Auxiliary Lube Pump | |
| Lube Oil Circulating Pump | |
| Fuel Transfer Pump AC | |
| Fuel Transfer Pump DC | |

In addition, the turbine unit speed must be below 10% rated speed, the field breaker must be correctly positioned and all turbine malfunctions must be corrected. When the turbine unit is available for startup, the TURBINE AUX RESET and TURBINE TRIP RESET sequence lamps are lit and a third lamp READY TO START is lit if both of the reset lamps are lit.

Other conditions which should be preset include the closing of all associated control and service breakers as well as AB breakers which supply power to motor circuits. If the computer system 305 had been deenergized, the computer breakers must be closed and the computer must be started and the time of day entered. All alarm conditions must be acknowledged and lockout relays reset. A remote or local operator's control selection also must be made.

More prestart checks include:
1. At least one of each pair of flame detector contacts open.
2. Oil reservoir not too cold.
3. Speed reference & fuel demand signals in proper range.
4. Safe run switch on PSGC positioned properly.
5. Voltage regulator motor operated rheostats (voltage adjust & base) in preset start position.
6. Dead computer system reset & 48V CCI detection voltage source available.

Under local control, the LOAD MINIMUM or LOAD BASE or LOAD PEAK or EMERGENCY START pushbutton can be used to initiate a gas turbine startup. A master contactor function is then enabled to cause an auxiliary lubrication pump starter to be energized and an instrument air solenoid valve 20–35 (IEEE) to be opened. In addition, a combustor shell pressure transducer line drain solenoid valve 20–25

(IEEE) is closed and the AC or DC fuel transfer pump is energized. After the auxiliary lubrication pump builds up sufficient pressure to operate a pressure switch 63-4 (IEEE), a starter for the turning gear is operated. Thirty seconds are allowed by a timer 62Q (IEEE) for lubrication pressure to build up or the turbine unit is shut down. The sequence is continued if the turning gear line starter is operated. Next, the master contactor function enables startup operations for the starting engine 126 if lubrication oil pressure causes the operation of a pressure switch 63-1 (IEEE).

At about 15% rated speed, the turning gear motor is desirably turned off. However, it may be kept on to a higher speed such as 50% to keep the diesel on where diesel seal in is not used. At firing speed as sensed by an axial compressor pressure switch 63-6 (IEEE), a turbine overspeed trip solenoid 20-2A (IEEE) and under pneumatic control, a vent solenoid 20-3B (IEEE) are energized to reset. With adequate buildup of overspeed trip solenoid oil pressure, a pressure switch 63-7 (IEEE) is closed to allow ignition.

The ignition sequence includes energizing the ignition transformer and setting the fuel control circuits as determined from the mode of fuel selected by the operator. A selectable time period, in this case 30 seconds is allowed for establishing flame in both detected combustor baskets or, after three ignition attempts with appropriate purge times, the unit is shut down. An ignition timing function allows certain predetermined purge time between successive ignition attempts. Atomizing air flow is initiated as required for liquid or oil fuel supply.

At approximately 60% rated speed, shutdown of the starting engine 126 is initiated. As successive predetermined combustor shell pressures are detected near synchronous speed, the respective bleed valves are closed.

During the time period from the ignition to synchronous operation, the control system 300 is placed in the Mode 1 operation, and the gas turbine speed reference is increased in a program controlled nonlinear manner to determine the fuel valve positioning. With the compressor inlet temperature at 80° F, the desired acceleration is achieved with the turbine inlet temperature limited to 200° F for a normal start and 1500° F for an emergency start.

When the turbine has been advanced to idle (or top or synchronous) speed, it is ready to be synchronized and the control system 300 is transferred to Mode 2 operation in which either manual or automatic synchronizing is performed following field breaker closure. When the turbine-generator unit is synchronized and the generator breaker is closed, the control system 300 is transferred to Mode 3 or Mode 4 operation and the speed reference is set at a value of 106% rated speed. Load is ramped to a predetermined level at a predetermined rate under programmed computer operation as previously generally considered.

With respect to maintenance operations, the computer 304 is programmed to count the number of normal and emergency starts and to accumulate the number of hours at various levels of load operation. Maintenence procedures are speeded by the availability of the five hold points in the starting sequence considered previously in connection with the operator's panel 120 and the availability of manual procedures for operating the voltage regulator and for synchronizing from the operator's panel 120. The ability to display thermocouple temperatures, vibration levels, and various other variables and the ability to change limits through use of the operator's console package also provides maintenance convenience.

Shutdown of the gas turbine is caused if any of three time checks fail during the startup sequence. The first time check which measures time from initiation of the master contactor function to ignition speed has already been considered. In addition, a check is made on the time from detection of flame in both combustor baskets to 60% speed. Further, a check is made on the time from starting engine trip at 60% rated speed to idle speed.

If a normal shutdown is requested locally or remotely the load is first cut back at a predetermined rate until minimum load is reached and the generator main and field breakers and the fuel valves are then tripped. In an emergency shutdown, the generator main and field breakers and the fuel valves are tripped immediately without reducing the load to the minimum level. All trouble shutdowns are classified as emergency shutdowns.

The gas turbine 104 coasts down during shutdown and as the oil pressure from the shaft driven pump drops the DC auxiliary lubrication oil pump is energized. At about 15% rated speed, or at a higher speed such as 50% rated, the turning gear speed equal to about 5 RPM, a turning gear overrunning clutch engages to allow the turning gear motor to rotate the turbine at the turning gear speed. After the cooling period of up to 60 hours, the turning gear and the auxiliary lubrication oil pump are stopped and the shutdown sequence is completed.

d. Sequence Logic Charts

In FIGS. 33A through 33F, there are shown logic diagrams representing the various alarm and sequencing functions performed by the sequencing program 600 in the block 626 (FIG. 31) each time it is executed. Predetermined logic building blocks are employed in defining the conditions for the performance of the sequencing program functions. Each block contains a symbol identifying its function and a number of alphanumeric character providing a program block identification. The logic function identifying symbol is generally located above the program block identification character. The following is a list of the logic symbols and the logic functions to which they correspond:

| | |
|---|---|
| A | And |
| OR | OR |
| FL | FLIP FLOP |
| SS | SINGLE SHOT |
| DB | DEAD BAND |
| NOT | INVERSION |
| TDH | TIME DELAY - HOURS |
| TDS | TIME DELAY - SECONDS |

With respect to flip-flops FL, the letter S signifies a set input and the letter C signifies a clear input. On the rightmost side of each flip-flop block, the numerals 1 and 0 indicate outputs and the 1 output is assumed to have a logic state of 1 when the flip-flop is set and the 0 output is assumed to have a logic state of 1 when the flip-flop is cleared.

Figure 33A:
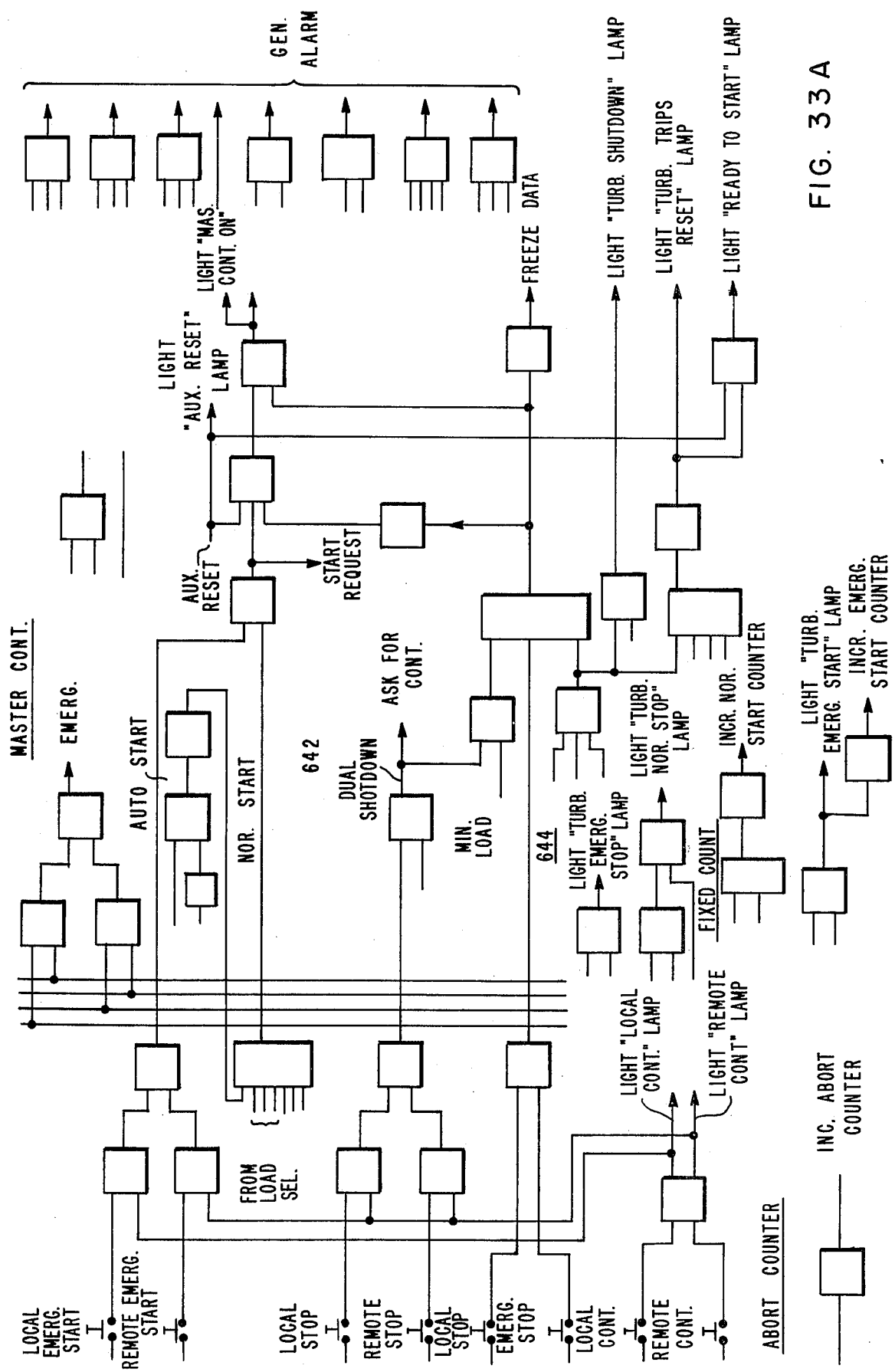

In FIG. 33A, there is principally shown the logic associated with start/stop operations and the master contactor or control function to which reference has already been made. Generally, logic diagram 642 pertains to the master contactor or control function generated by flip-flop FL7 as a function of pushbutton operations and other conditions. Similarly, logic diagram 644 relates to the generation of a shutdown operation in response to pushbutton, shutdown alarm and other conditions. Thus, shutdown OR block OR6 resets the master contact function flip-flop FL7 when a shutdown is initiated. In the logic diagram 644, the alarm shutdowns are initiated by line L86 through block OR4 as derived from the lower left area of FIG. 33D. On shutdown, single shot block 6 provides for registering predetermined data. Shutdown operation of the starting engine is set forth in FIG. 33B.

Other sequencing program logic functions set forth in logic diagram form in FIG. 33A include a plurality of generator alarms designated as OR GEN BLK blocks. In addition, block OR1 provides for immediate shutdown on blade path over-temperature through block OR4. Single shot blocks 4, 5 and 14 respectively provide normal start counts, emergency start counts, and abort counts. A list of miscellaneous alarms is also included.

In FIG. 33B, there are shown principally the logic diagrams associated with the turbine sequencing functions from the point in time at which the master contact or function is initiated up to ignition. In logic diagram 646, flip-flop FL9 registers the master contactor function from line L4 to energize the auxiliary lubrication oil pump line starter. The turbine turning gear starter is then energized by a block A9 if no HOLD is present. The logic block A9 also causes the turning gear motor to be turned off at the selected speed such as 15% rated as in FIG. 18 or at 50% rated as in the application described herein. If the lubrication pressure does not build up within 30 seconds, the turbine shuts down. FL9 is cleared after a minimum of 60 hours cooloff to control turning gear cooloff operation.

Block OR14 provides for instrument air valve solenoid energization in response to the master contactor function L4. On shutdown, the instrument air is left on until coastdown to about 10% rated where 63-6 is reset. Block A10 causes diesel startup once the block input conditions are satisfied including the master contactor function L4, turning gear energization and adequate lubrication oil pressure. Overspeed trip valve solenoid operation and gas valve solenoid operation are initiated by block A11 when the gas turbine 104 has reached firing speed and when purge time has expired.

Once the input logic conditions are satisfied for block A17, the ignition relay is caused to be energized by block A20 and a time delay function is initiated by block TD19. When fuel oil is selected, block A20 provides for appropriately timed introduction of atomizing air into the combustor baskets. Other functions performed in firing logic diagram 648 include flame detector logic processing for alarms as provided by blocks A21 through A24. The logic for combustor basket purging and multiple ignition attempts and turbine shutdown following ignition failure is also included in logic diagram 648.

Other logic functions included in FIG. 33B are the time of ignition speed check provided by AND block A13 and the time check for flame verification to 60% speed provided by block A68A. The conditions which define starting motor trip are processed by block OR38 and diesel shutdown is initiated by block OR10 at 60% rated speed. Operation of the compressor bleed valve solenoids, the evaporative cooler, the circulating oil pump, and the lubrication oil cooler fan are provided as indicated by the associated logic blocks.

The sequencing logic associated with Mode 2 operation, i.e. synchronizing, is principally set forth in FIG. 33C. Under the indicated logic conditions, block OR41 in logic diagram 650 provides for field breaker closure. Manual field breaker operation is provided through block AOC while automatic operation is provided through block A41. Automatic and manual field breaker trip is provided through blocks OR42, A42 and SS42.

In logic diagram 652, block OR45 verifies bleed valve closure. If block FLOC indicates a manual sync selection, block AOC provides for generator breaker closure when block FLOC receives a set pulse from the GEN SYNC pushbutton if the GEN BKR CLOSE pushbutton is depressed. Automatic generator breaker closure is provided by block A45 after the automatic synchronization program 608 in response to a request made by block A45 when the appropriate conditions for synchronization are established. Generator breaker trip is provided by block SS47 and by the indicated bearing condition.

Automatic closing of the generator onto a dead bus is provided outside of the automatic synchronizing program. Further, programming interlocking is provided to make sure no more than one generator breaker will attempt to close onto the dead bus simultaneously by the added, unnumbered OR, NOT and TD blocks. Generator voltage must have built up above 13KV.

Generator voltage control is provided by logic diagram 654 in accordance with operator selections detected by block FL1. The panel RAISE and LOWER pushbuttons cause base rheostat adjustment through the two topmost blocks A1 and voltage adjust rheostat operation through the two lowermost blocks A1. As already considered, voltage adjust rheostat position defines a voltage setpoint to which the local control circuitry resulates the generator voltage. Line breaker functioning is provided as indicated by logic diagram 656. Block A44 provides a time check for operation from starting engine trip to idle speed. Disc cavity temperature alarms are generated by blocks OR80 and A80. Another function includes in FIG. 33C is low limit action provided on the fuel demand signal by block FF91.

The logic processing of local and remote shutdown conditions is shown in logic diagram 658 in FIG 33D. Blocks OR66 and OR68 cause shutdown through block FF68A and line L86 considered previously in connection with FIG. 33A. The various alarm conditions which result in shutdown are subsequently set forth in connection with consideration of the alarm program 610.

It is noteworthy that a multiple shot provision is provided for shutdown. Instead of the usual shutdown and lockout procedure which requires an attendant on the site for restart, a selection can be made by the plant owner as to when lockout will occur. Thus, a number of nonlockout shutdowns is specified for a selected time interval and lockout only occurs when the actual number of shutdowns in the selected time interval exceeds the selected shutdown number by one. For example, lockout may be set if more than one shutdown occurs within a 1 hour time period.

Other logic features included in FIG. 33D include block OR73-77 which inhibits start under the indicated logic conditions and the various blocks A and OR which generate vibration alarms. Further, remote shutdown and lockout is generated by block FL71. Miscellaneous alarms are provided by blocks A69, A68, A PATCH, and OR PATCH.

Figure 33E:
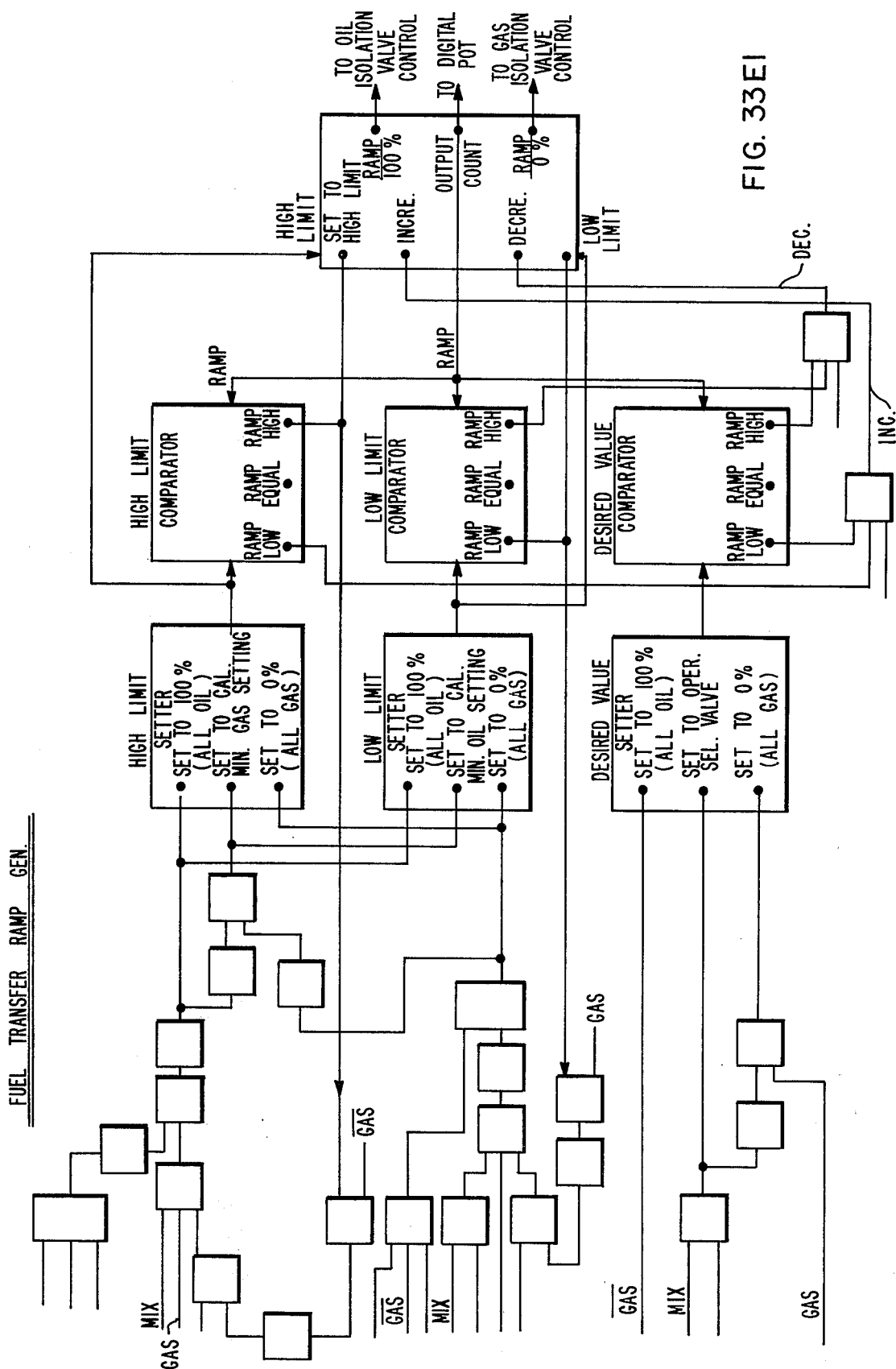

In FIGS. 33E, logic diagram 660 provides the logic which processes the fuel selection pushbutton settings in determining the fuel control to be operated in the external circuitry at block FL81. Logic diagram 652 relates to a fuel transfer ramp generator which is considered more fully in the previously mentioned copending Reuther patent application. Finally, logic diagram 664 pertains to AC-DC fuel transfer pump control.

The logic associated with control program mode selection for interface with the control program 602 is set forth in logic diagram 666 in FIG. 33F. Block OR91 and the four blocks FL91 provide the output indications of the control mode. In logic diagram 668, a five state flip-flop FL responds to the indicated logic blocks to detect the pushbutton load selection. The outputs of the block FL are employed in the control program mode selection logic diagram 666 and in the control program 602. The logic employed for incrementing and decrementing the kilowatt reference from the operator's panel 120 is included in the control program 602.

In logic diagram 670, there are provided the logic blocks needed for responding to the various sequence pushbutton and the HOLD pushbutton to determine when each of the five hold logic blocks FLOC should be set to signal a call for the associated hold. Logic diagram 670 also provides for holding the speed reference during acceleration. HOLD 5 is selected to avoid time out on sequence times. In addition, blocks A89 and OR89 provide for the previously described pushbutton flash conditions. The sequential illumination process on the panel 120 during startup logically and conveniently provides a display of startup information to the plant operator.

e. Macro Instructions For Sequencing Logic And Logic Subroutines And Related Macros In order to improve the efficiency with which desired functions are implemented in machine language instructions for process control, a group of Macro instructions are employed to provide direct programming of repetitive and interacting elemental function blocks for assembly into machine language. The Macro instructions accordingly provide a compiler type function in the programming process for control system applications. In this case, a set of Macros are constructed to provide for direct programming of logic blocks in a logic system. The Logic Macros generally facilitate process control programming and are particularly advantageous in gas turbine power plant applications because of the volume of sequencing logic involved therein and, accordingly, because of the large amount of programming effort that can be avoided with use of the Logic Macros.

Generally, an assembly or higher level program for a particular computer operates in response to an input statement to generate a machine language form of the input statement. The assembly program is characterized with a set of instructions, and these instructions are used as language elements in making the input statement.

In the present case, the standard P50 assembly program has a Macro instruction capability, i.e. it is internally structured to accept macros initially defined by assembly language elements. Entry of the Logic Macros into the assembly program enables it to respond to a coding for the Logic Macros during assembly of another program which has been written with use of the Logic Macros along with assembly language elements. Accordingly, with the use of a Logic Macro, the assembly program is made to respond to the Macro mnemonic and other related key data elements which follow the mnemonic to generate an entire set of machine language instructions which would otherwise have to be individually entered into the assembly program as individual statements. In use of the assembled program, the Macro generated set of instructions then operates to perform the specified logic function. It is also noteworthy that certain Macros are structured so that the assembly program generates only the necessary machine language statements for processing particular input conditions specified for the Macro as opposed to generating the entire set of possible machine language instructions needed to embrace all of the possible input conditions.

The Logic Macros are made small enough for efficient use in "in line" or "on line" program execution, i.e. for repeated use as opposed to a jump to a single external subroutine. Further, they can be interspersed with assembly language statements or used alone in sequential combinations in the process of writing a program in assembly language. In use, the various Logic Macros represent logic functions for which various input logic conditions can be specified. Each Macro causes the assembly program to generate a set of instructions which operate on the specified Macro input conditions to generate a machine language instruction block which will execute the logic functions defined by the Macro for the specified input conditions. Similar types of results are achieved with the use of Control Macros also employed in the preferred embodiment.

The Logic and Control Macro details are herein based on the assembly language available for the P50 computer. Other computer applications of the macros involve the use of other languages associated with those applications.

8. Control Program

Figure 34:
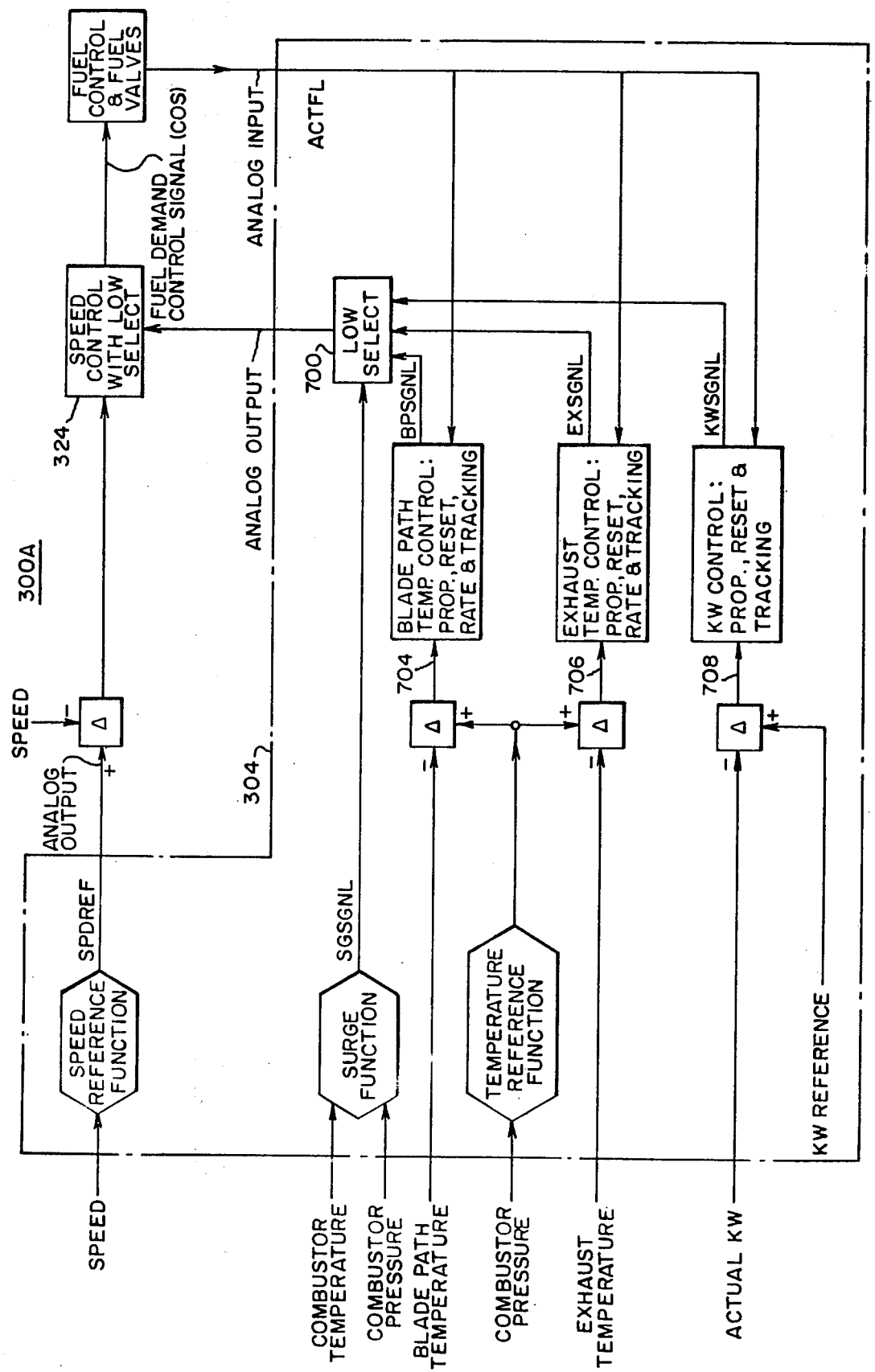
FIG. 34 shows a block diagram of a control loop arrangement implemented in the preferred embodiment.

The control program 602 interacts with the sequencing program 600 generally to provide for control loop determination of the operation of the gas turbine power plant 100, and like plants if provided, in accordance with the control arrangement considered in connection with FIG. 34. As just considered, the sequencing program 600 is organized to provide efficient and reliable interfacing with the plant and the operator panel in determining the control mode in which the control program 602 is to be operated. Control mode directives are made compatible with protective turbine performance and orderly management over advances in the gas turbine operational process. The control system 300 is in this embodiment provided with a control loop arrangement 300A in which the hybrid interface is preferably made as shown to provide for software speed reference generation and software selection of a single low fuel demand limit in a software low select block 700 for application to the analog hardware speed control 324.

The output fuel demand signal is selected as the lowest of a speed error fuel demand signal and the computer output fuel demand limit signal as previously considered. The actual fuel demand control signal ACTEL is read as an analog input for tracking in various software control paths as considered more fully subsequently. Surge limit, blade path and exhaust temperature limit and load limit control loops are all provided with software control functions which respond to external data and generate outputs to the software low select block 700 as indicated by the respective reference characters 702, 704, 706 and 708.

Data flow for the control program 602 is similar to that considered previously in connection with the sequencing program 600. Thus, the control program 602 first provides for preprocessing of analog input data and other data in block 710 for use in block 712 where the gas turbine control functions are performed.

In the first execution of the control program 602, the preprocessor block 710 acquires a resident control data table for turbine A thereby acquiring all the required values which represent the current status of turbine A. For example, the resident table stores such values as the previous inputs and outputs for the reset functions and rate functions. Other tabled values include function generator tables for all functions along with control function gains.

The resident control data table also includes the address of the turbine sequencing resident table which enables the preprocessor 710 to access to sequencing table and determine the control mode of operation, the selected load and emergency or normal startup status. After acquisition of the sequencing data for the turbine A, an analog data acquisition is employed to obtain the analog data needed for control program execution. The analog data required includes the eight blade path temperatures, the eight exhaust temperatures, compressor inlet temperatures, combustor shell pressure, actual fuel signal demand and actual kilowatt output. Critical analog inputs such as compressor inlet temperature and combustor shell pressure are preferably given special reliability checks by sequencing logic in FIG. 33.

Figure 42:
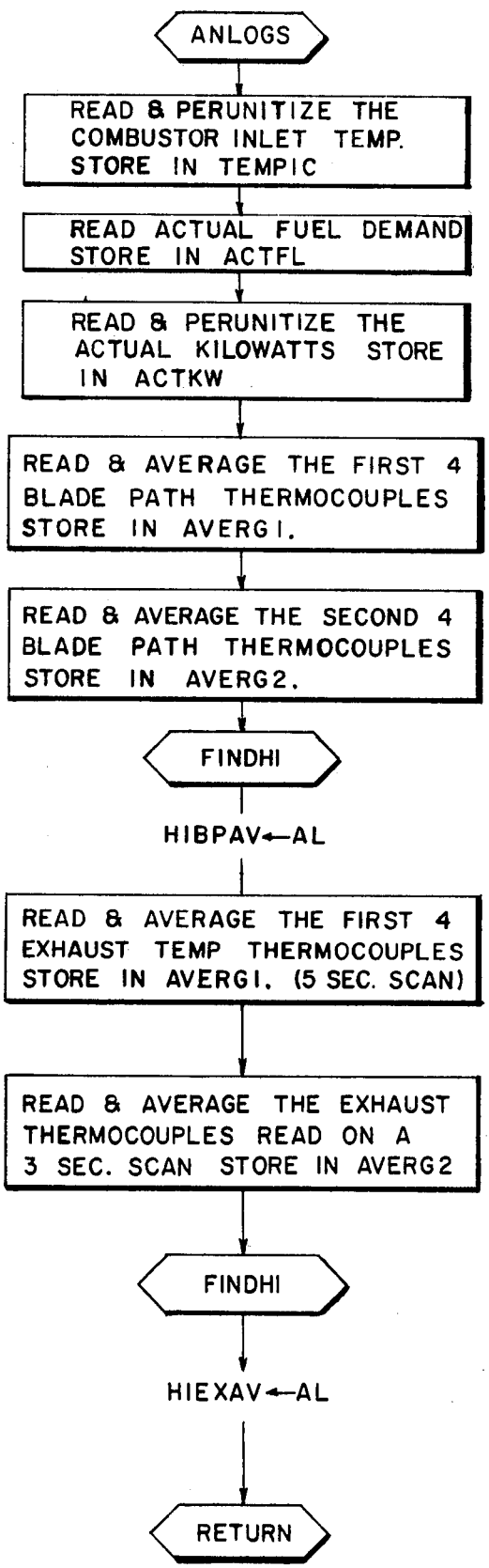
FIG. 42 illustrates a flowchart which represents the operations of an analog input routine employed in the control program.
Figure 43:
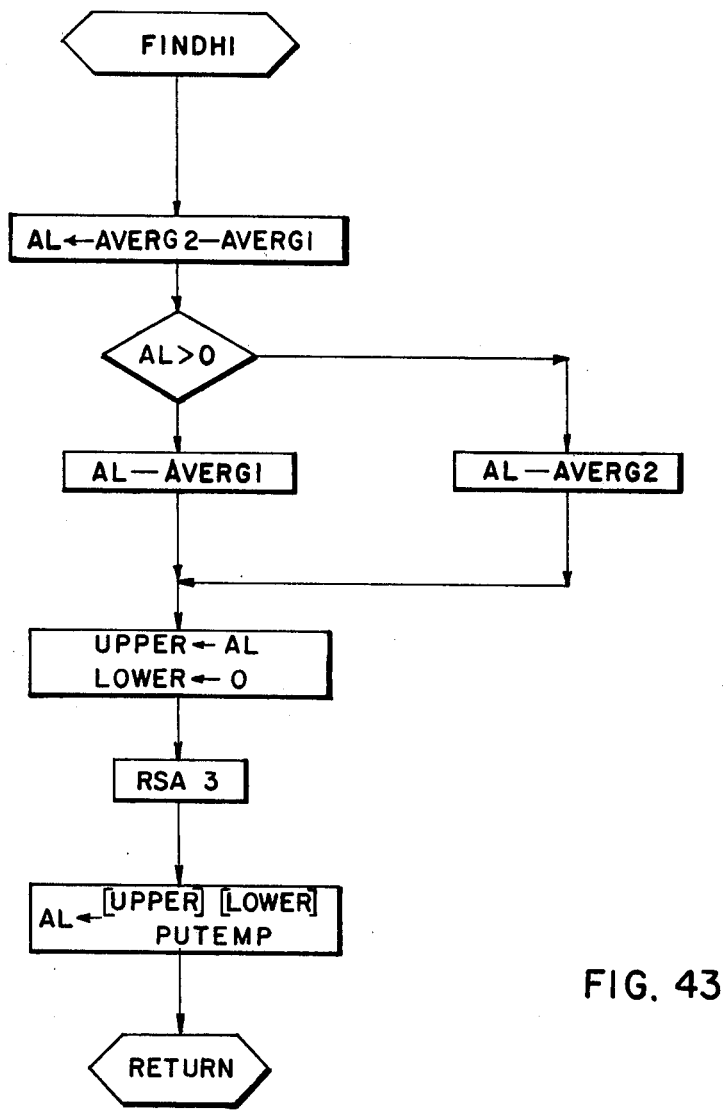
FIG. 43 shows a flowchart for a high temperature finding routine associated with the blade path and exhaust temperature processing in the analog input routine.

Preprocessing of the blade path and exhaust path temperature representations to find the respective high averages in the manner previously considered in connection with FIG. 15 is performed by the preprocessor block 710 as somewhat detailed in FIGS. 42 and 43 after the analog data is acquired. It is noted in further detail that the control program processing of the blade and exhaust temperature representations includes checking each thermocouple for open circuits. If a large negative test voltage value is detected for a thermocouple, the output of that thermocouple is discarded in calculating the average temperature indication. After the temperature average is calculated, each thermocouple output is compared to the average for its group and if it is lower than the average by more than a predetermined amount, the low thermocouple values are discarded and the average blade and/or exhaust temperature is recomputed. The described computational cycle is repeated until no low values are determined or until no values are left for discard in which case an alarm is generated. Data processing for the important blade and exhaust process thermocouples in this manner provides reliable plant protection against overheating and foreshortened turbine life.

Next, the turbine control block 712 is executed and it makes use of the acquired data including the sequencing, analog and resident control data which is stored in a table indicated by the block 714. After completion of the execution of the turbine control block 712, a postprocessor block 714 is executed to transfer an updated resident control table for turbine A back to its resident core area. The program process just considered is then repeated for turbines B, C and D according to the number of gas turbine plants placed under control. After the last turbine has been serviced with control program execution, an exit is made from the control program postprocessor block 714.

Figure 37:
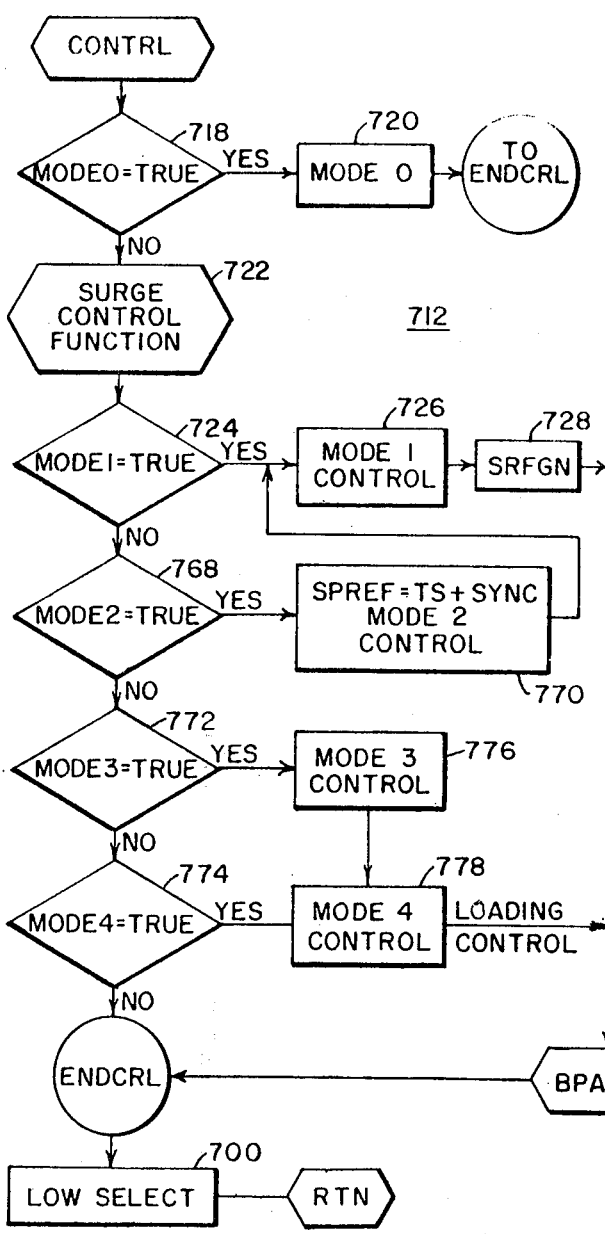
FIG. 37 illustrates a flowchart which represents control program operations in the preferred embodiment.

In FIG. 37, the control block 712 is shown in greater detail. A determination is first made from the turbine sequencing table by block 718 whether the turbine under control is in Mode 0 status. If so, block 720 is executed but no control action is taken since Mode 0 is an initialization mode. Thus, block 720 zeroes the previous value locations for the blade path and exhaust temperature control and resets error flags. Block 720 also provides for tracking the actual turbine speed so that a smooth transition is made in the computer generated speed reference during transfer from Mode 0 to Mode 1.

If the control is not in Mode 0, block 722 next determines the surge control function for use in the surge limit control loop (FIG. 34) in all other modes of operation. To prevent compressor surge under excessive pumping demand, the surge control function determines a maximum fuel demand limit as a function of the compressor inlet temperature and the combustor shell pressure (compressor outlet pressure) which are obtained from reliability checked analog inputs.

As previously considered generally in connection with FIG. 15, the surge limit functional determination is made with the employment of stored nonlinear curve data which is representative of the nonlinear turbine surge operating limit over startup and load operating ranges. In this instance, the pair of nonlinear curves 326 and 328 are stored for respective compressor inlet temperatures of 120° F and −40° F. The curves 326 and 328 are stored by the use of five points on each curve and intermediate curve points are determined by a linear interpolation routine considered previously in connection with the sequencing Logic Macro instructions. Curve points for compressor inlet temperatures between −40° F and 120° F are determined by a second linear interpolation procedure so that a dual interpolation operation is employed for a determination of the surge control function.

Once the combustor shell pressure is identified, the double linear interpolation is made along and between the curves 326 and 328. If the combustor shell pressure is below the point at which the coincident portions 330 of the curves 326 and 328 become applicable, the ordinate of the applicable surge limit function is determined by intercurve interpolation on the basis of measured compressor inlet temperature to define the surge limit value of startup fuel demand. In order to make the ordinate interpolation, interpolations are first made to determine points on the startup portions of the curves 326 and 328 corresponding to the measured combustor shell pressure. Surge limit determination is also made by linear interpolation, and in this case double linear interpolation, on the curve portions 330 during load operations, but the ordinate interpolation is applied to common points to generate the same point. As a result of the nonlinear surge function implementation, closer operation to turbine design limits is enabled.

After determination of the surge control function, block 724 determines whether the system is in operating Mode 1. If it is, block 726 is entered to provide for gas turbine acceleration control from ignition speed of approximately 1000 RPM to the top speed of 4894

Figures 38, 39:
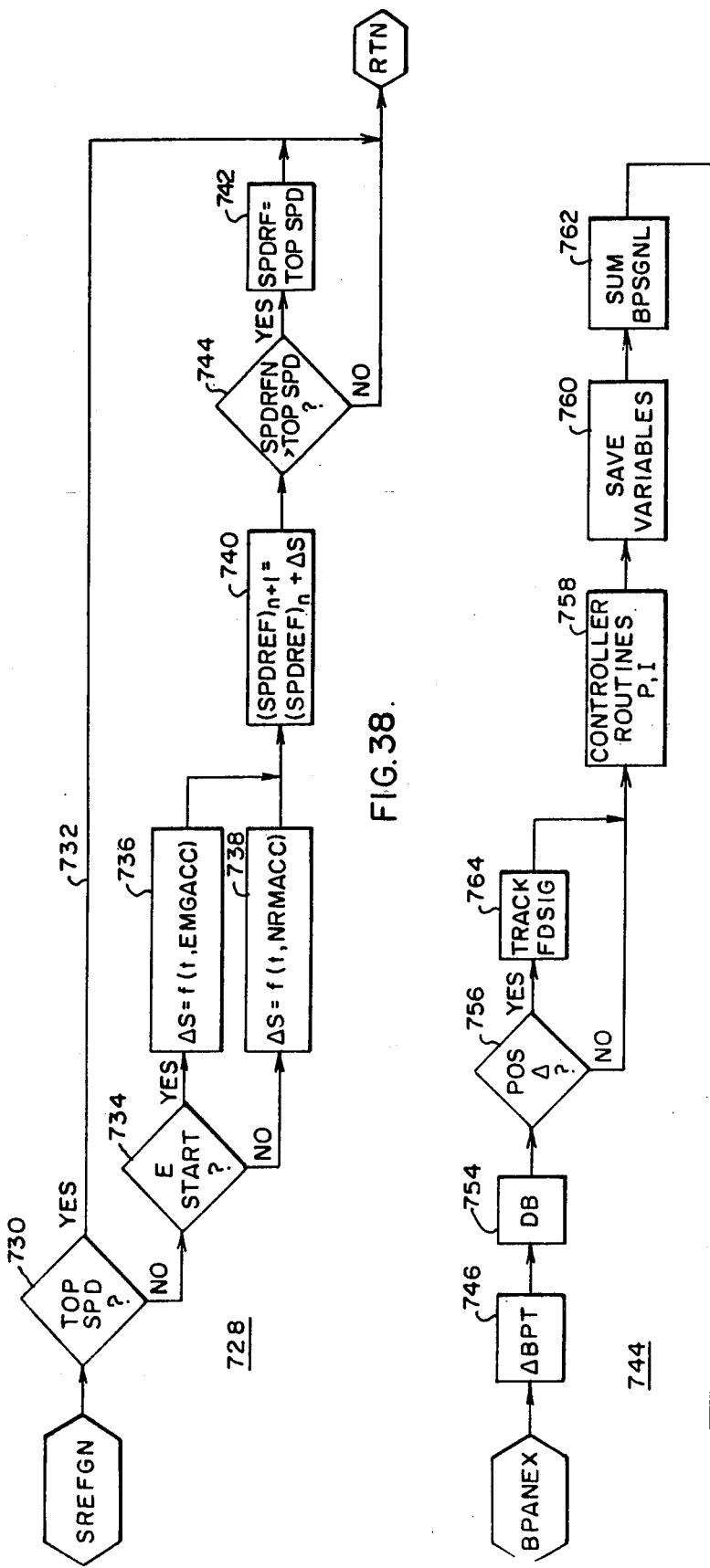
FIG. 38 shows a more detailed flowchart for a speed reference generation function included in the program of FIG. 37.
FIG. 39 shows a more detailed flowchart for a gas turbine blade path and exhaust temperature limit function employed in the program of FIG. 37.

RPM. Block 726 provides for fuel demand signal tracking in the same manner as that subsequently described in connection with blocks 764 and 767 (FIG. 39) and further generates a temperature reference with the use of stored curve data previously considered in connection with FIG. 16. The temperature reference curves 334 and 336 are nonlinear and respectively represent turbine discharge temperature conditions associated with respective constant turbine inlet temperatures of 1200° F and 1500° F for normal and emergency startups as a function of combustor shell pressure. Five points are stored for each curve 334 or 336 as indicated and linear interpolation is employed between points on the same curve as considered in connection with FIG. 15. To determine the current applicable temperature reference, the block 726 accordingly determines the acquired analog value of combustor shell pressure and whether the startup is in a normal or in an emergency status. Gas turbine operation with greater constancy of operation at design turbine inlet temperature is better enabled by the use of a nonlinear temperature reference in the block 726 and in block 792 subsequently considered.

Block 728 operates next in Mode 1 control to determine the speed reference for analog output to the speed control 324 from the computer 304. As shown in greater detail in FIG. 38, the speed reference program block 728 first provides for determining whether the gas turbine 104 is at top or substantially synchronous speed as indicated by block 730. For the top speed condition, the speed reference routine is bypassed as indicated by the reference character 732 and a return is made to the turbine control program execution. Below top speed, block 734 determines whether an emergency start has been requested and if it has, block 736 determines the change in the speed reference required for operation during the next sampling time interval from data representative of the curve 307 shown in FIG. 13. If a normal start has been requested, block 738 determines the speed reference charge in accordance with data representative of the curve 306 in FIG. 13.

As previously indicated, the nonlinear curves 306 and 307 respective and advantageously provide for fixed normal and fixed emergency startup times while holding substantially constant turbine inlet gas temperature. The faster emergency startup curve 307 corresponds to a higher turbine inlet temperature operation and, it may be noted, higher turbine temperature transients which produce greater stress damage to the turbine parts. Although blade temperature or surge limit control may possibly extend the startup period, the normal programmed fixed startup time, in this case from ignition speed to synchronous speed, is normally achieved to provide the previously considered advantages of fixed time startup.

Each of the speed curves 306 or 307 in FIG. 13 is placed in core storage with the use of five data points as indicated. The indicated speed curve slopes or accelerations corresponding to the denoted speed curve points are stored and a linear interpolation process is used to determine acceleration values at working time points between the time points corresponding to the stored curve points. As presented previously in connection with parameter change entries into the computer 704, a speed reference change calculation for block 736 or 738 is based upon the slope of the speed curve at the next preceding sample time point and the change in time associated with the next sample period (FIG. 54).

In block 740, the new speed reference is calculated by adding the calculated small speed reference step change to the preceding speed reference. The acceleration formula set forth in connection with parameter changes applies to FIG. 54 and it is used in making the speed change calculations. The speed reference algorithm previously noted in connection with section B provides an underlying representation of the speed reference generation.

Among other advantages associated with the speed reference generation scheme, the plant operator can switch between normal and emergency start procedures at any time in the startup process with smooth transition since no large steps occur in the speed reference function and accordingly no undesirable operating transients are imposed on the gas turbine 104. It is also noteworthy that a 0 speed change is added to the speed reference when the HOLD pushbutton is pressed.

A top speed limit is next placed on the speed reference by block 742 if block 744 detects an excessive speed reference value. If the speed reference is not excessive or if the speed reference is set at top speed, the speed reference value is stored and a return is made to the execution of the control block 712.

Generally, the blade path temperature control loop responds faster than the exhaust temperature control loop and it is therefore the controlling factor in Mode 1 control. The exhaust temperature control loop and the load limit control loop are both normally tracking the fuel demand signal during Mode 1 control for reasons of control loop availability. FIG. 40B illustrates the conditions of the various control loops considered during Mode 1 control.

Figure 40C:
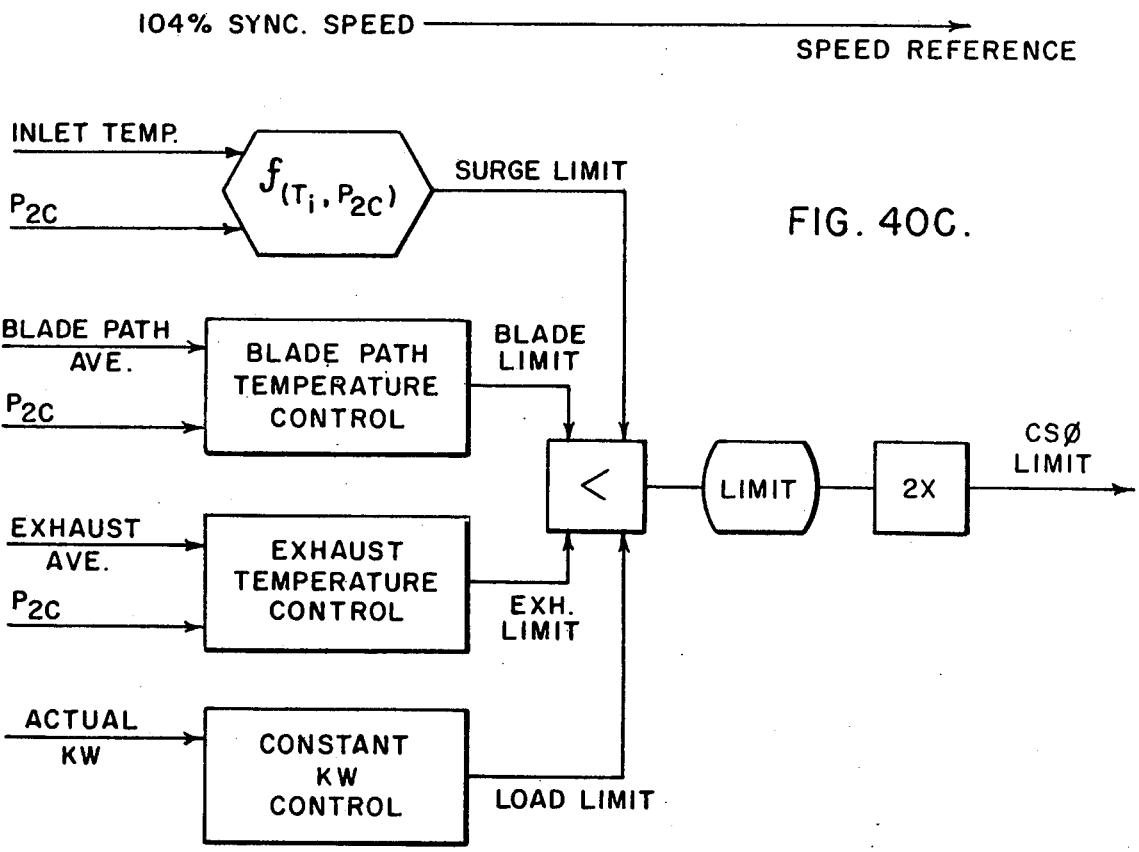

As detailed in FIGS. 40B and 40C all control Modes including Mode 1 employ a fuel demand limit check in the control path to keep the output fuel demand signal within the range of 0 to 2.5 volts as indicated in block 746. A multiplication by a factor of 2 is made in block 748 to put the analog output signal in the range of 0 to 5 volts.

In execution of the block 744 in the temperature limit routine 744, a determination is first made in block 746 of the temperature error by taking the difference between the temperature reference previously derived in the block 726 (or the block 792 in FIG. 46) and the actual and preprocessed average blade path temperature. As shown in FIG. 41A, the software blade path temperature control configuration includes a rate function 748 which is applied to the average blade path temperature representation. The temperature representation and its derivative are added together in summer 750.

Figure 53:
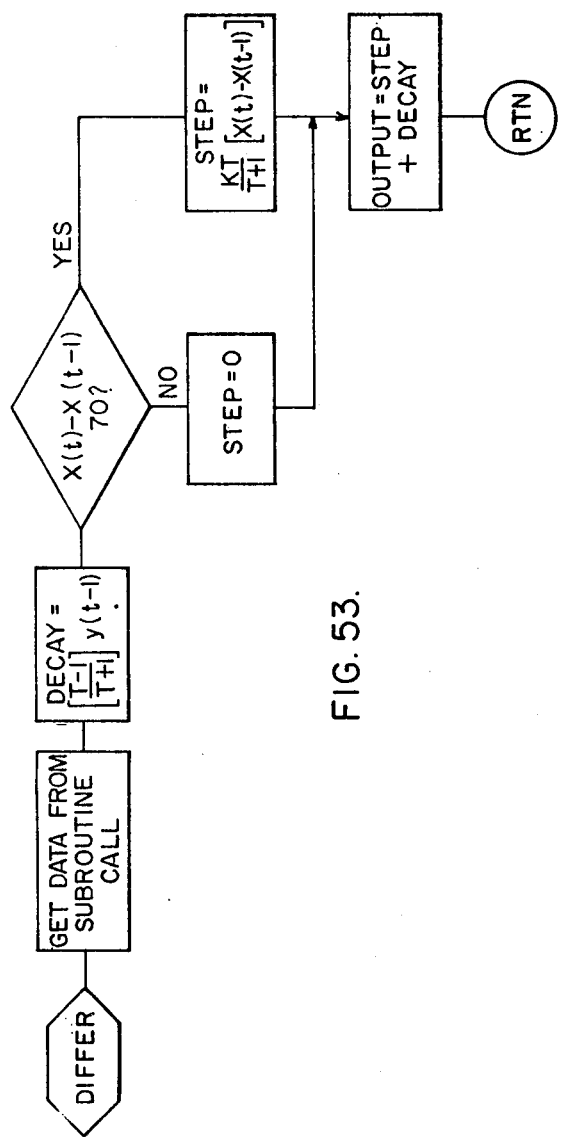
FIG. 53 shows a flowchart for a rate function employed in temperature limit operations.

FIG. 53 shows the rate function and its software control channel interaction in greater detail. Thus, after the necessary data is obtained, a decay term is calculated and if the temperature is increasing a step term is determined and added to the decay term. If the temperature is decreasing, no step term is used and the output is made equal to the decay term. FIG. 45 illustrates the process employed for differentiation.

As a result, the summer 750 in FIG. 41A has a temperature value and at most a remanent decay term applied to it during temperature drops so that tracking is provided for decreasing temperature. On temperature increases, the summer 750 generates the sum of a temperature value and an instantaneous step term and a decay term for anticipatory or predictive limit control with rising blade path temperature.

To obtain backup transient termperature limit protection, a summer 752 (FIG. 41A) provides a blade path offset to the temperature reference previously determined in the flowchart block 726 (FIG. 37) by an amount of 50° F in control Modes 3 and 4 during which the slower responding exhaust control channel provides primary temperature limit control, but no offset is made in control Modes 1 and 2. The preprocessing performed by blocks 748, 750 and 752 in the control configuration of FIG. 41A is performed by the program block 746 in FIG. 39.

A predetermined deadband is applied to the determined blade path temperature error in block 754. If an error exists outside the deadband determined in the block 754, its sign is determined in block 756. If the blade path temperature error is negative, control action is imposed by block 758 with a proportional routine and an integral routine. The blade path temperature and temperature error variables are then stored by block 760 and block 762 sums the results of the proportional and integral operations of block 758 to generate the blade path output limit representation BPSGNL. If the blade path temperature error is positive, block 764 obtains the fuel demand signal FDSIG or SCO in the hardware speed control 324, sets the blade path temperature error representation to zero and causes the reset function in block 758 to track the fuel demand signal (as indicated in the control configuration in FIG. 34). The blade path temperature representation is then kept slightly above the control signal output so that it is ready to take limit control if required.

After execution of the block 762, the exhaust temperature control or tracking action is determined in a series of blocks similar to those just considered in connection with blade path temperature control and tracking action. However, block 765 provides no offset for the temperature reference as indicated in the software control configuration for exhaust temperature control shown in FIG. 41B. Further, a save variables block 769 provides for storing the exhaust temperature error and the track function output initiated by block 767. Block 760 also saves the blade path variables.

The tracking action provided for by blocks 764 and 767 in the temperature limit loops enables the loops to enter their limit control configuration with faster control action following a change in temperature error from positive to negative since the reset routines do not have to integrate back from some saturated output value. In particular, the tracking action is such that the reset block output never exceeds the fuel demand signal by more than a difference value, in this case a value corresponding to .12 volts.

Figure 44:
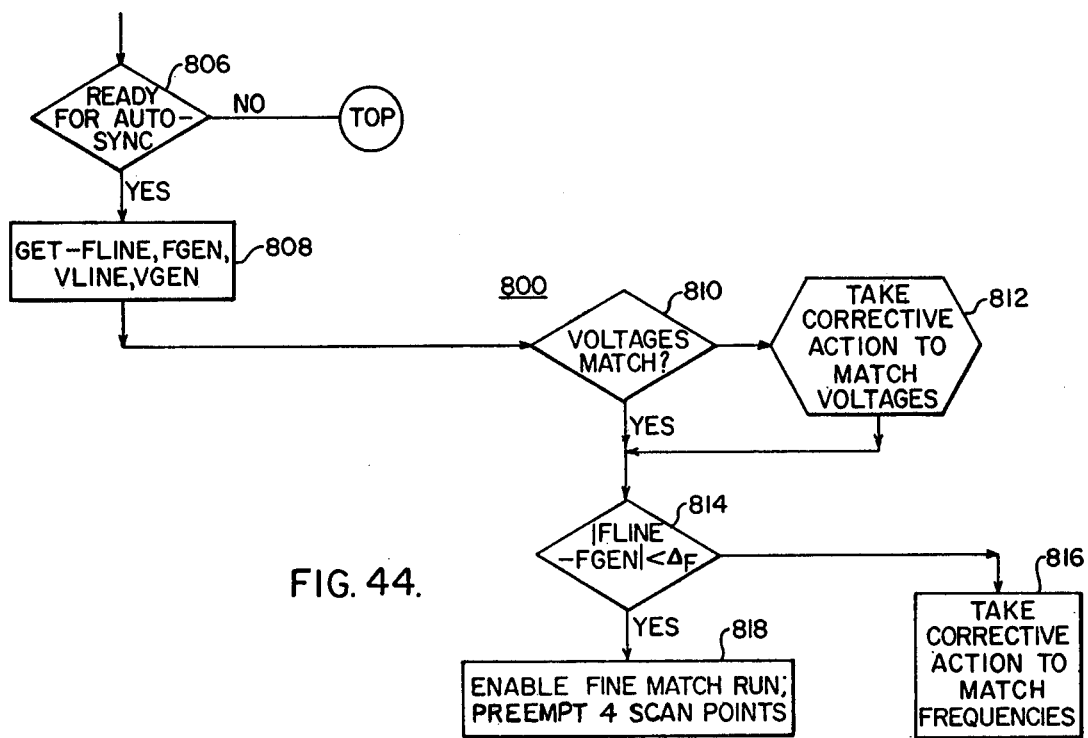
Figure 50:
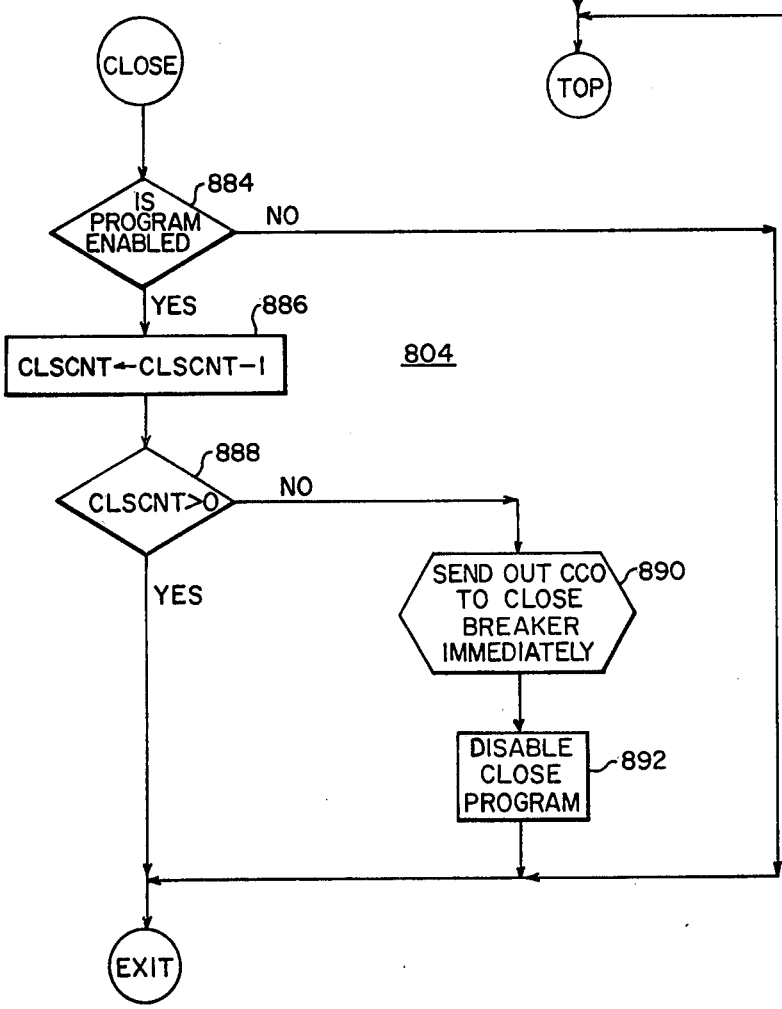

To obtain the tracking action, the desired difference value is added to the low selected fuel demand signal and the result is differenced from the output of a reset or integrator routine and applied to the input of the reset routine. FIG. 44 shows the process employed for integration. The output of the integration operation accordingly tracks the fuel demand signal with a positive bias. The described tracking operation accordingly allows the tracking control loop to enter quickly into fuel control if required by a change in the error quantity controlled by the tracking control loop, yet the fuel signal tracking output of the tracking control loop is sufficiently high to provide some degree of control freedom for the control loop which is actively controlling fuel through the low fuel demand selector block 700 (software) or the hardware low select arrangement previously described.

After the exhaust temperature output limit is determined in block 766 a return is made to the routine 712 in FIG. 37. Next, a software low selection is made by block 700 in the Mode 1 control program execution. Repeated executions of the control routine 712 are made during the time period that the gas turbine 104 is placed under sequencing and acceleration operations in Mode 1 control.

Once the actual synchronous speed reaches 98%, block 768 in FIG. 37 directs the program into Mode 2 control operations. In block 770, the speed reference is set equal to the last speed reference value plus any speed change entered into the control loop by manual synchronization operations or by automatic synchronization program execution. Further, the program operations are redirected through blocks 726, 728, 744 and 700 as in the case of Mode 1 control.

More particularly, the automatic synchronization program 608 (FIG. 26) in this case preferably includes a rough matcher subprogram 800 (FIG. 29A), a fine matcher subprogram 802 (FIG. 29B) and a breaker close subprogram 804 (FIG. 29C), If the AUTO SYNC operator's switch has been pressed, the block 768 automatically initiates automatic synchronization program execution during plant startup or during a change from isolated plant operation to system tie operation. In the latter case, the speed reference will have been held by the block 728 at the 106% rated speed value and upon initiation by automatic synchronization program execution the speed reference value is normally dropped by automatic synchronization program operation to the value needed for synchronization with the power network. In the case of start-up, the speed reference will have reached some value between top or synchronous or rated speed and 98% top speed when actual turbine speed reaches 98% top speed causing entry to the synchronization block 770. Considerations similar to those just related apply to entry to the block 770 when manual synchronization has been selected by the operator. As already generally indicated, speed changes needed for manual or automatic synchronization are implemented by the block 770 by adding manually or automatically determined synchronization speed reference changes to the next previous calculated speed reference value until the conditions for synchronization are satisfied and synchronization is performed. Thereafter, the speed reference is set at 106% and the speed control loop essentially acts in a back-up capacity during load control operations.

Figure 29A:
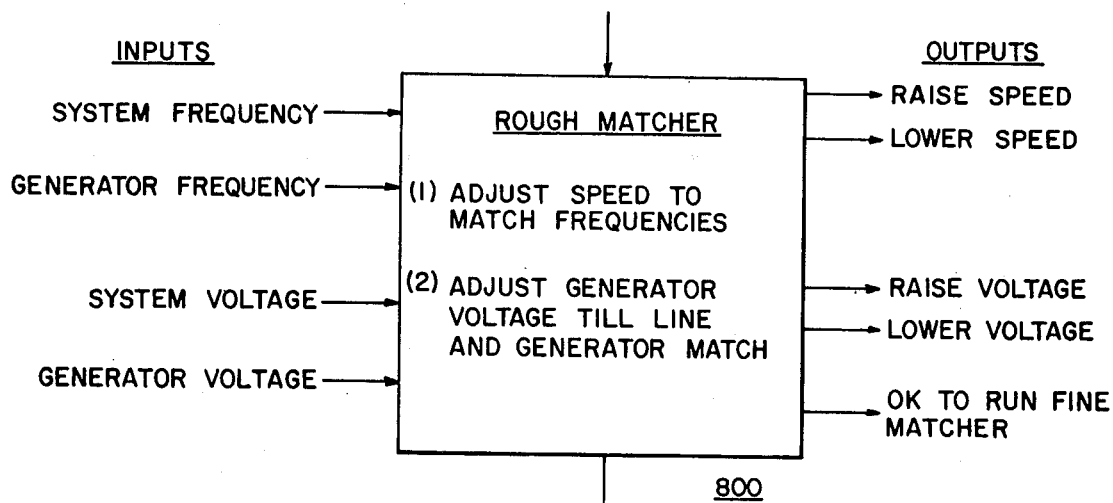
FIGS. 29A-29C show respective data flow diagrams of respective elements of an automatic synchronization program employed in the computer.

In FIG. 29A, data flow for the rough matcher subprogram 800 is generally illustrated. The rough matcher is run once each second and it generates determinations as to whether voltage and or speed rays or lower control signal pulses are needed to match the generator and system voltages and frequencies within respective predetermined tolerance ranges. Thus, data based on the system and generator frequency and voltage sensor outputs is employed in the rough matcher subprogram execution.. When the rough matcher requirements have been met, the fine match subprogram 802 is called when the rough matcher subprogram 800 sets a flag to enable fine matching to proceed. At this point, voltage conditions are acceptable for synchronization but further refinement is needed in the turbine speed adjustment before breaker closure is to be initiated.

In FIG. 44, a program flow chart is shown for the rough frequency matcher subprogram 800 with operation of the MODE 2 control block 770, block 806 determines whether automatic synchronization has been selected and whether other conditions needed for automatic synchronization are satisfied. If so, execution of the automatic synchronization program is permitted to continue and block 808 provides for acquisition of the needed frequency and voltage data. If the voltages do not match as determined in block 810, block 812 provides a corrective action determination for voltage matching. Generator voltage control is achieved by the generation of control signal pulses which cause adjustment of the exciter field energization as considered in connection with FIG. 4. When adequate voltage matching has been achieved, block 814 determines whether the magnitude of the difference between the line and generator frequencies is less than a predetermined value which refines the dividing point between the rough matching frequency function and the fine matching frequency function. In the present embodiment, the difference or slip frequency can be as high as 3 Hz. or more while still retaining high resolution in the rough frequency matching function. If rough frequency matching is required, block 816 generates incremental changes to be made in the SPDRF. When the rough frequency matching condition is determined to be satisfied by block 814, block 818 enables execution of the fine frequency matcher subprogram 802 and it preempts four analog scan points for reasons considered in connection with the fine matcher subprogram 802.

Figure 29B:
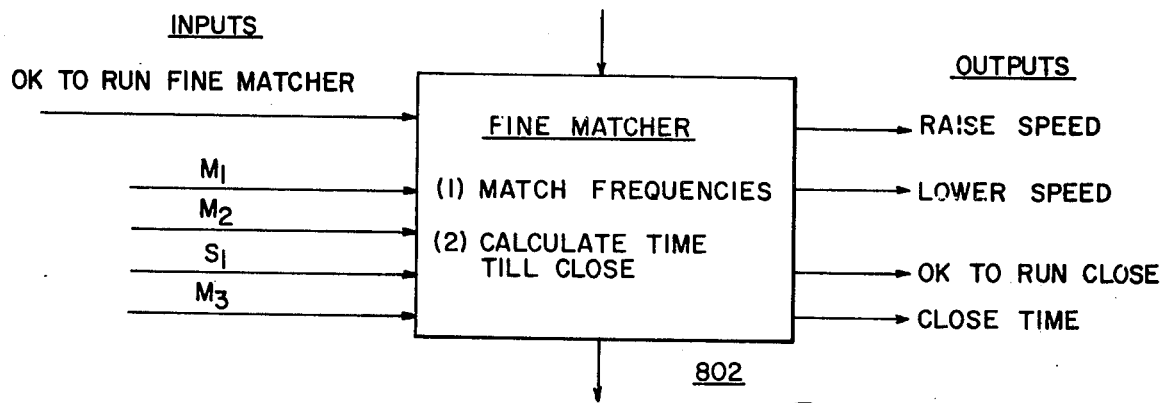

Data flow for the fine matcher subprogram 802 is illustrated in FIG. 29B. Flow charts for the fine matcher subprogram 802 are shown in FIG. 45, and FIGS. 47 through 50. The fine matcher also runs once each second and it employs data inputs obtained from the synchronizer detect circuit 342 (FIG. 12 and FIG. 20). Generally, determinations are made by the fine matcher as to whether turbine speed must be raised or lowered, whether the breaker close subprogram can be run and the point in time when the breaker closure signal is to be generated.

The computer inputs from the external circuitry 342 of FIG. 20 includes (1) a main synchronizer signal in the form of a triangular phase difference waveform (FIGS. 11A and 11B) generated by the phase difference amplifier 464 and (2) an auxiliary synchronization signal in the form of a shifted beat voltage signal (FIGS. 11A and 11B) from the beat voltage generator amplifier 470. Generally, a process control computer system operates at a predetermined analog point scan rate, and the scan points are assigned such that each analog point is scanned with a predetermined frequency equal to or less than a maximum frequency equal to the scan cycle frequency. Typically, the maximum scan rate is one second as in the case of the P50 computer system. Phase difference detection in the present case is preferably performed in the external circuitry 342 to obtain the advantage of high accuracy in phase difference detection without excessive duty cycle load on the computer. In other cases where higher computer sampling rates are available and are economically acceptable, it may be desirable to provide programmed computer performance of the phase difference detection function.

A one second analog scan rate causes a requirement that the slip frequency be less than 0.25 Hz. before the fine matcher can be called in order that the fine matcher can function properly in conjunction with normal analog scan system functioning in the processing of the main synchronization input data for speed matching purposes. In turn, the resulting burden on the rough matcher of matching speed to a slip frequency of 0.25 Hz. would ordinarily be excessive due to accuracy limits of most frequency transducers.

To preclude these difficulties, four successive analog scan points are advantageously preempted in each analog scan cycle following the call for the fine matcher by the rough matcher in rough matcher block 818 after a slip frequency up to 3 Hz. is reached. In applications where materially different analog scan characteristics exist for the digital computer system, the automatic synchronization program organization and its interaction with the analog scan may differ from that described herein.

Figure 11A:
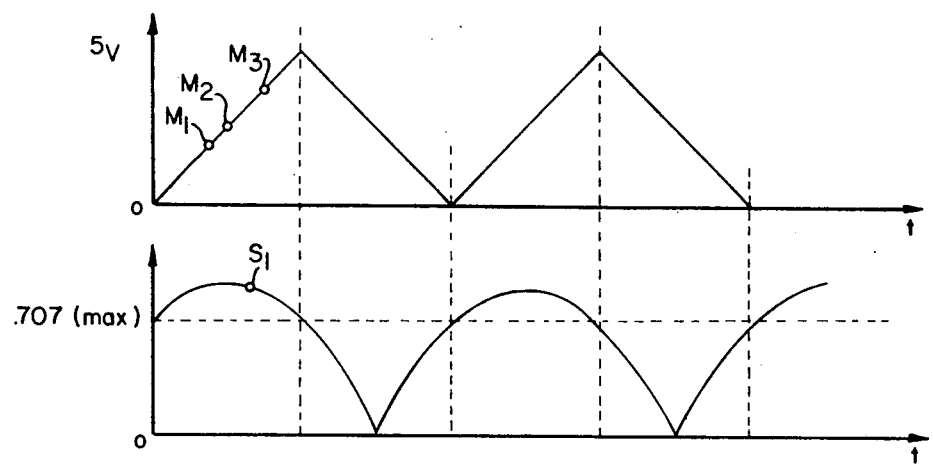
FIGS. 11A and 11B show respective sets of curves representing synchronizer signal inputs for programmed computer synchronization operations in accordance with the principles of the invention.

More particularly, the preempted scan points are preferably successive (i.e. within 4 30 second in the P50 30 point per second analog input system) and the points read and the sequence of reading are preferably: (1) the main synchronizer input signal at time $t_1$, (2) the main synchronizer input signal at time $t_2$, (3) the auxiliary synchronizer input signal at time $t_3$ and (4) the main synchronizer input signal at time $t_4$. These points are illustrated in FIGS. 11A where the generator frequency $f_g$ is higher than the system frequency $f_1$ and in FIG. 11B where the system frequency is greater than the generator frequency.

FIG. 45 shows a flow chart of program steps followed by the fine matcher after rough speed matching is satisfied. Once the analog scan program has scanned the predetermined fine matcher preemption scan points identified to it by the rough matcher subprogram 800, the fine matcher subprogram 802 is called and an enabling check is made in block 820. If enabled by the rough matcher, a slope check is made in block 822 relative to the triangular phase difference waveform.

Generally, the slope check is needed to determine whether a raise or lower speed reference pulse is required to be transmitted to the external turbine speed controller. Thus, if the slope of the main synchronizer input signal $M_3$ minus $M_1$ is positive and the value of the auxiliary synchronizer input signal $S_1$ is greater than a predetermined value equal in this instance to 0.707 × $S_{1MAX}$ or if the quantity $M_3$ minus $M_1$ is negative and $S_1$ is less than the set value, the generator is detected as running too fast and a lower speed reference pulse is required for the speed control loop. On the other hand, if the quantity $M_3$ minus $M_1$ is positive and $S_1$ is less than the set value or if the quantity $M_3$ minus $M_1$ is negative and $S_1$ is greater than the set value, the generator is detected as running too slow and the speed reference raise signal or pulse is needed for the turbine speed control. To verify that the readings are being taken on a straight line portion of the main synchronizer input signal and not over a portion which embraces one of the waveform valleys or peaks, the $M_2$ reading is employed. The validity check is made by determining whether the quantity $M_3$ minus $M_1$ is approximately equal to three ($M_2$ minus $M_1$). The check is made in block 824.

If the slope calculation is not validated, the fine match subprogram execution is ended for the current cycle. In the case of slope validity, the current fine matcher program cycle is continued and block 826 defines the slip CPSCNT as being equal to the slope $M_3$ minus $M_1$. Block 828 then determines whether the slip CPSCNT is less than a predetermined value, in this case the quantity 82 which is the triangular waveform slope representation which corresponds to a pre-specified maximum allowable slip frequency of 0.1 Hz.

If the slip frequency is greater than the allowed value, block 830 disables the breaker close subprogram and block 832 initializes two counters TRYCNT and ZROCNT at respective values of 20 and 5. Block 834 then determines the desired speed change from the difference between the actual and the desired slopes for the triangular waveform in terms of the desired units such as Hz., generator revolutions per minute, ASLP units, or turbine revolutions per minute as indicated in the block 834.

Figure 11B:
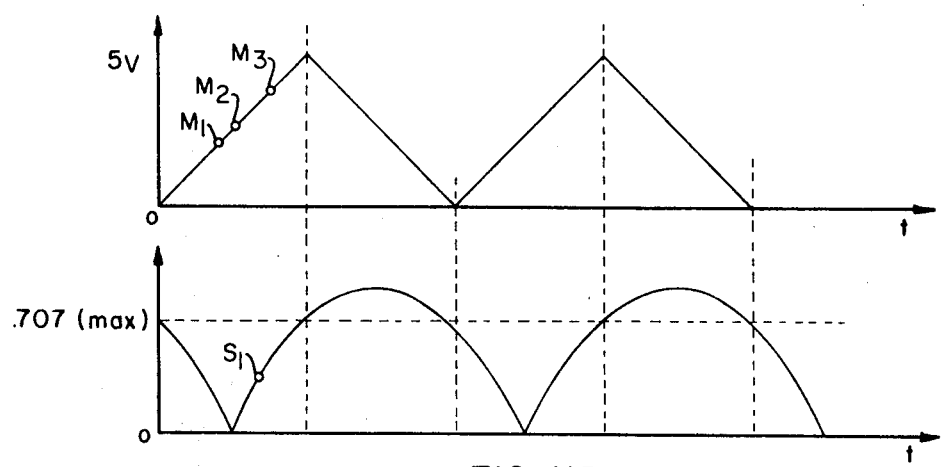

As shown in FIG. 47, a determination is next made as to whether the speed change requires a raising or lowering of turbine speed. If blocks 836 and 838 indicate that the main synchronization slope is greater than zero, and the auxiliary synchronization value is greater than ONLEV, i.e., greater than $0.707 \times S_{1MAX}$ as previously indicated, or if blocks 836 and 838 indicate that the main synchronizer signal slope is not greater than zero and $S_1$ is not greater than ONLEV, the fast generator condition of FIG. 11A is detected and turbine slowdown is called for by block 840 in the amount of the change calculation made in block 834. Similarly, if blocks 836 and 838 and blocks 836 and 837 determine opposite conditions from those just described, the slow generator condition of FIG. 11B is detected and turbine speed-up is called for by block 842 in the amount of the change calculation made in the block 834. The fine matcher subprogram 802 is then exited.

Figure 48:
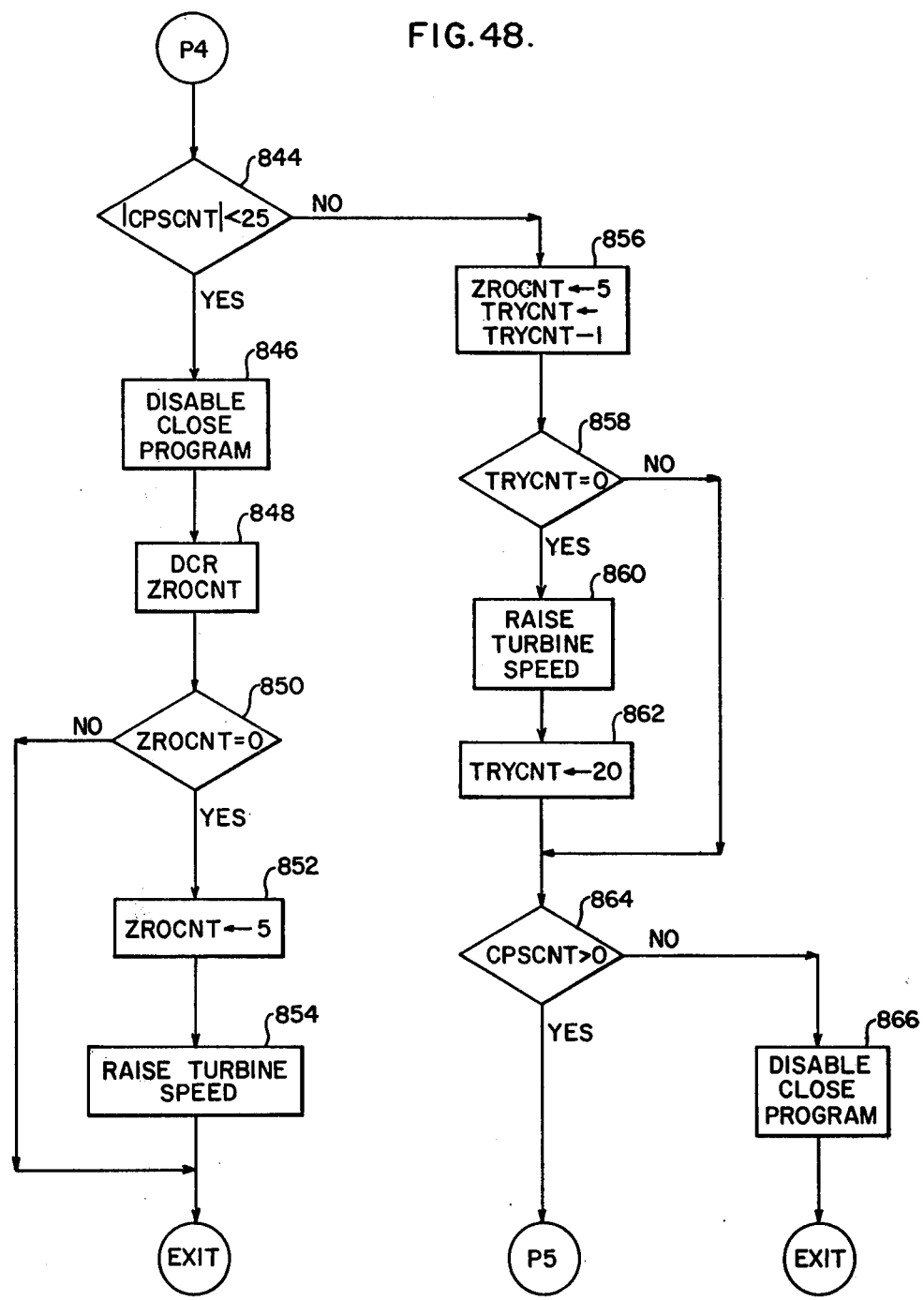

When the subfrequency is determined to be less than 0.1 Hz. by block 828, a determination is next made as to whether the absolute magnitude of the slope is less than 25 in block 844 in the flow chart of FIG. 48. If it is, the breaker close subprogram 804 is disabled by block 846, since a prespecified minimum slip condition for synchronization is unsatisfied. Next, down counting of the counter ZROCNT is initiated and performed by block 848. When five program cycles (i.e. 5 seconds) have been counted by block 848 at the below minimum slip condition as determined by block 850, the counter ZROCNT is reset by block 852 and the turbine speed reference is caused to be raised by a small increment generated by block 854 to increase the slip frequency and remove the system from its presumed hangup condition. The fine matcher subprogram 802 is then exited to await the next and subsequent program cycles and new calculations based on the resulting higher slip frequency.

Once the slip frequency has become valued within a range corresponding to the slope range of 25 to 82 as determined by blocks 828 and 844, block 856 sets ZROCNT to 5 and initiates and performs downcounting of the counter TRYCNT to limit the time during which synchronization is attempted within the slope range of 25 to 82 at a fixed speed reference generated from the computer. If 20 seconds has passed as determined by block 858, the turbine speed reference is raised by a fixed amount by block 860 again on the presumption that a hangup or near hangup condition has been reached. Block 862 then resets the counter TRYCNT.

Following block 862 and following a negative decision from block 858, block 864 determines whether the main synchronizer signal slope is positive or negative. If negative, the breaker close subprogram 804 is disabled by block 866 since the generator and system voltage waveforms are determined to be slipping away from phase coincidence, and the fine matcher subprogram execution is ended. If the slope is determined to be positive, it is known that the two voltages are slipping toward phase coincidence and block 868 in the flow chart of FIG. 49 is entered for a valid breaker closing time calculation.

To calculate predictively the time to the next phase coincidence from the last read point $M_3$ on the main synchronizer waveform, there are employed the slope of the main synchronizer signal, the value of $M_3$ and the maximum value of the main synchronizer signal which occurs at the predicted phase coincidence point. Previously, the quantity $M_3$ minus $M_1$ has been referred to as the slope CPSCNT of the main synchronizer signal and this stems from the fact that the points $M_1$ and $M_3$ are read 3/30 or 1/10 second apart, i.e. the quantity $M_3$ minus $M_1$ is the main synchronizer signal slope per 1 10 second. The time to the next phase coincidence point is equal to the time difference between $M_3$ and the next maximum value of the main synchronizer triangular waveform, and accordingly the time to phase coincidence in tenths of a second is equal to the voltage quantity $V_{MAX}$ minus $M_3$ divided by the absolute magnitude of the slope quantity $M_3$ minus $M_1$ or CPSCNT.

The time T which will be allowed to pass between the last reading $M_3$ and the issuance of a breaker closure signal is calculated by subtracting the stored characteristic closing time of the circuit breaker to be operated for synchronization (i.e. the generator breaker in this case) from the calculated time to phase coincidence. The resulting time value T is stored for use by the breakeer closure subprogram 804.

Figure 49:
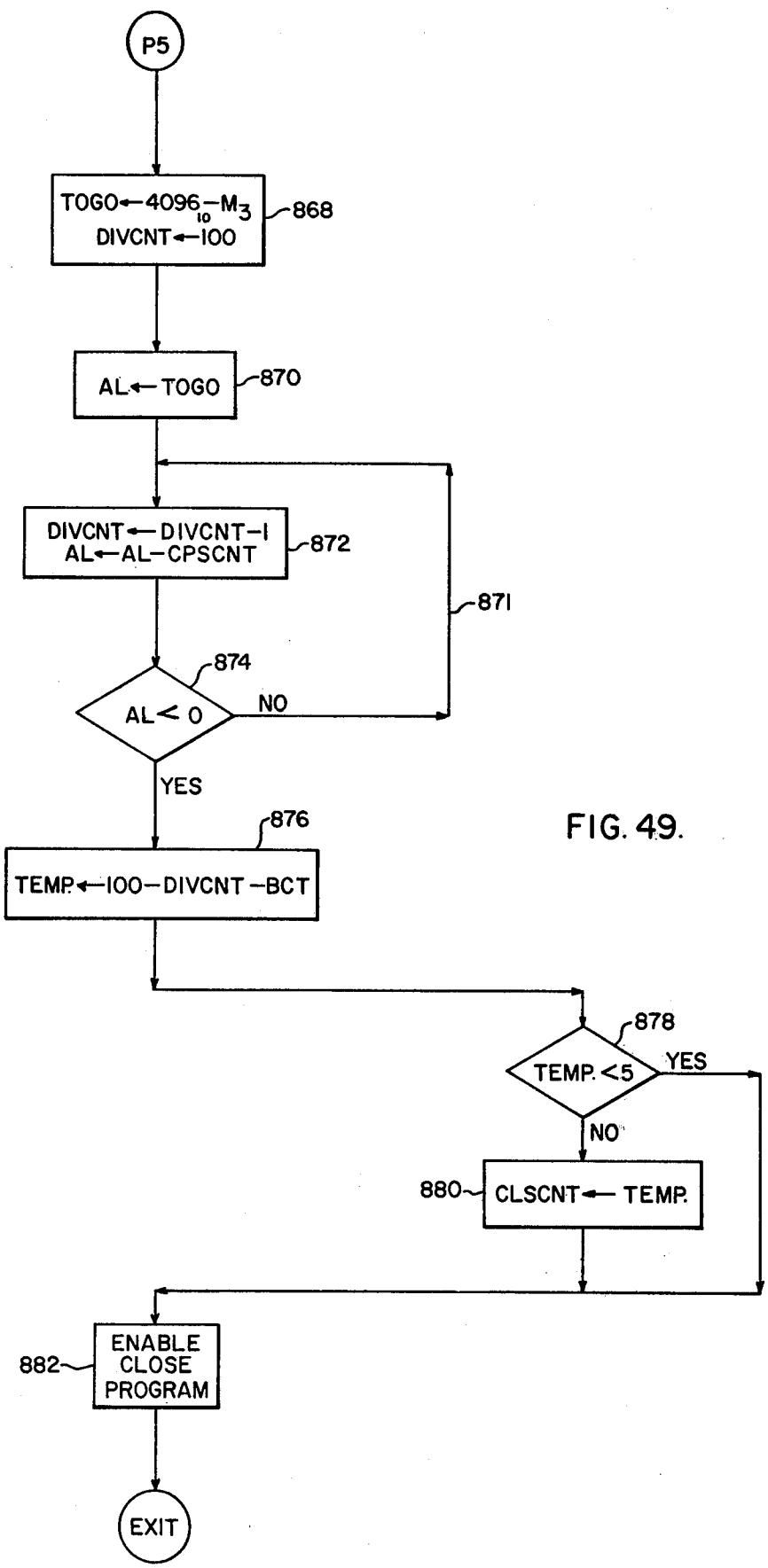

As flow charted in FIG. 49, the block 868 sets a division counter DIVCNT equal to 100 and determines a difference value corresponding to $V_{MAX}$ minus $M_3$, i.e. $M_3$ is subtracted from the base 10 number 4096 corresponding to the octal number 10,000 which is the computer counterpart of the 5V maximum value for the main synchronizer signal. Blocks 870, 872, 874 and 876 substantially perform a division operation to determine the previously defined time period between $M_3$ and phase coincidence. Thus, the slope CPSCNT is divided into the quantity 4096 minus $M_3$ to produce in block 876 a quantity TEMP which defines the time T to phase coincidence in tenths of a second. Next, block 878 determines whether TEMP is less than a predetermined value of 5, and if it is the time to phase coincidence is insufficient to allow for breaker closure time, the breaker closure subprogram 804 is disabled and the fine matcher program cycle is ended. If the time period TEMP is greater than 5 (i.e. more than 0.5 seconds), a block 880 sets a counter CLSCNT equal to TEMP. Since blocks 828, 844 and 864 have already determined that the slip frequency magnitude is satisfactory and the phase difference is closing toward zero, the blocks 878 and 880 provide the only additional factors needed for a breaker closure go condition and block 882 accordingly enables the breaker close subprogram 804 just prior to termination of the fine matcher program cycle.

Figure 29C:
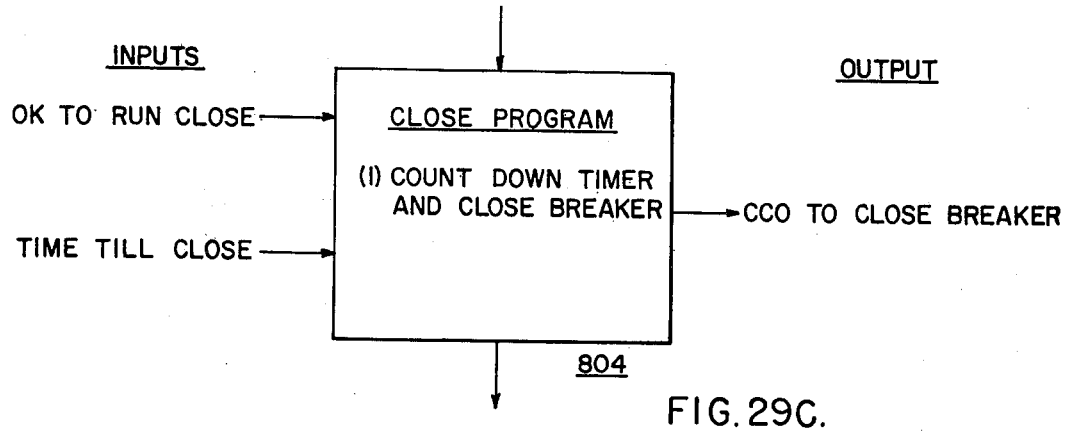
Figure 51:
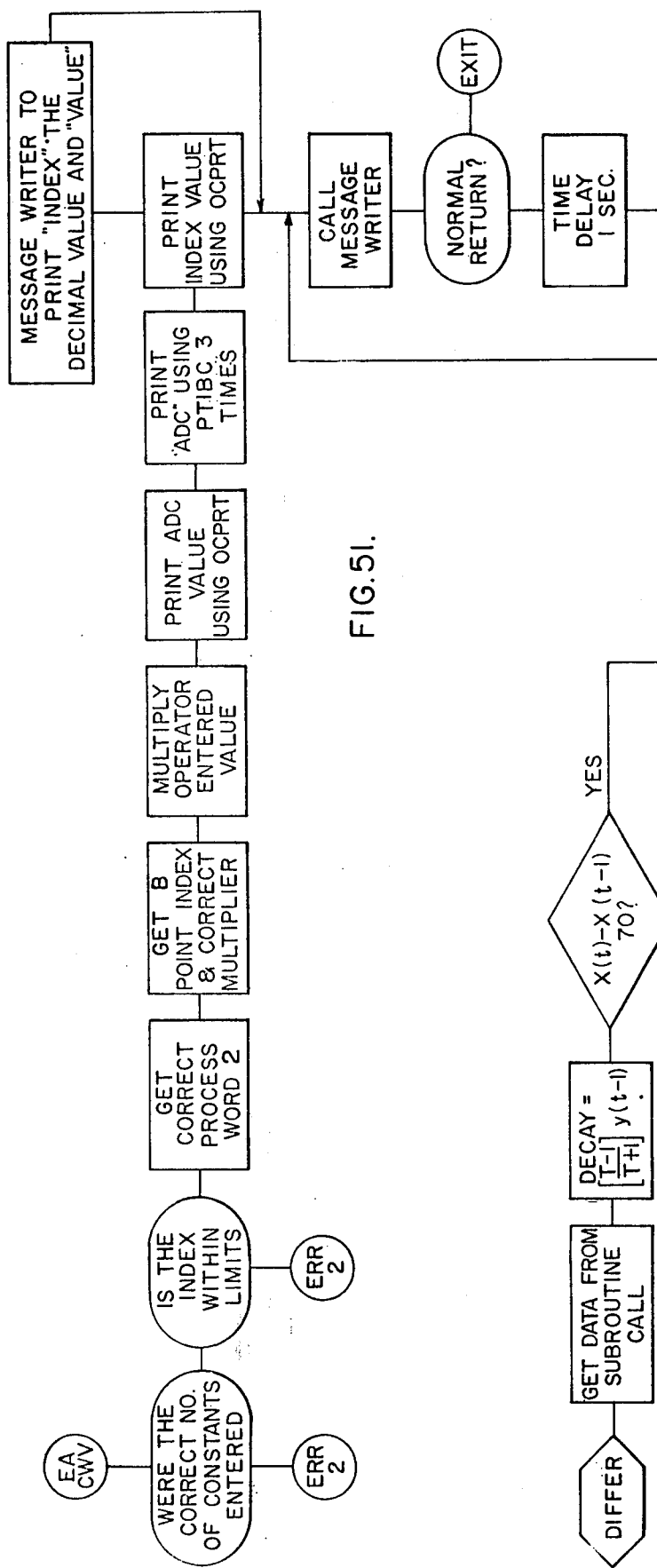
FIG. 51A shows a diagram of the overall organization and data flow relationships for the automatic synchronization program.
FIGS. 51B and 51C show respective diagrams depicting various characteristics of the functioning of the automatic synchronization program.

The breaker close subprogram 804 runs every 110 of a second. Data flow for it is shown in FIG. 29C. As shown in the flow chart of FIG. 51, a block 884 terminates the breaker close subprogram run, if the program has not been enabled. If the subprogram 804 has been enabled by the fine matcher block 882, the counter CLSCNT is decremented by 1 in a block 886. If the resultant count is greater than zero as determined in a block 888, the program run is ended and respective downcounts are registered for each successive program run until the counter CLSCNT reaches zero. The expired time during the downcount is then equal to the time to phase coincidence from $M_3$ and a block 890 causes immediate generation of a contact closure output which commands generator breaker operation. A block 892 then disables the breaker close subprogram 804 prior to the end of the program run.

Figure 51A:
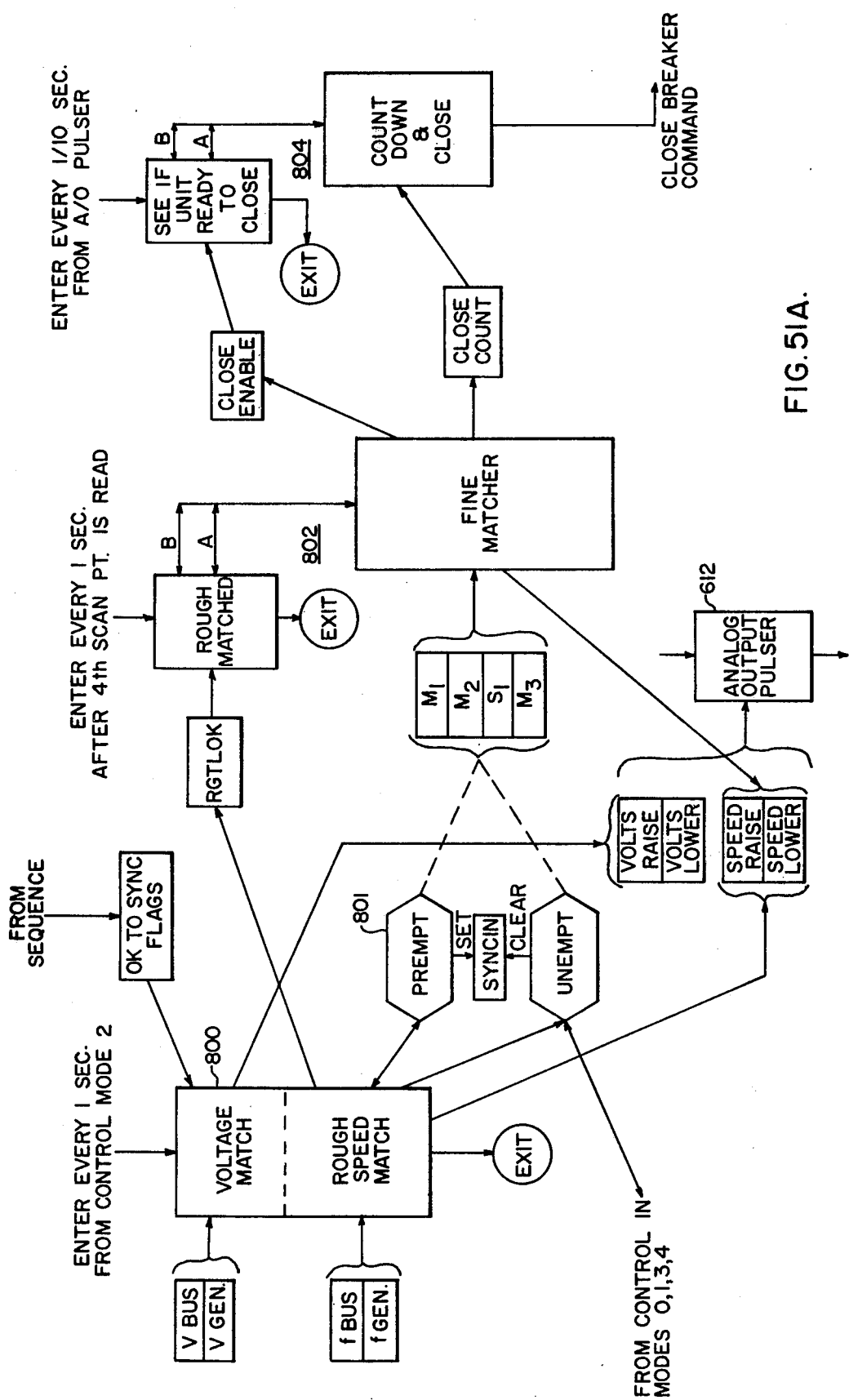

The overall automatic synchronization program organization with related data flow is shown in FIG. 51A. Thus, the rough matcher subprogram 800, the fine matcher subprogram 802 and the breaker close subprogram 804 are run as indicated. The analog output pulser program 612 provides for voltage and speed matching requirements determined by the rough matcher 800. Once rough speed matching and voltage matching are achieved, the fine matcher 802 is enabled and analog scan points normally reserved in this case for blade path temperature readings are preempted as indicated by a block 801 for reading of the analog synchronizer inputs. Blade path temperature points are selected for preemption since the blade path temperature variable has relatively little process significance during the synchronization time period. When fine matching is achieved, the breaker closure subprogram 804 is enabled and a close breaker command is generated at the proper time point.

Figure 51B:
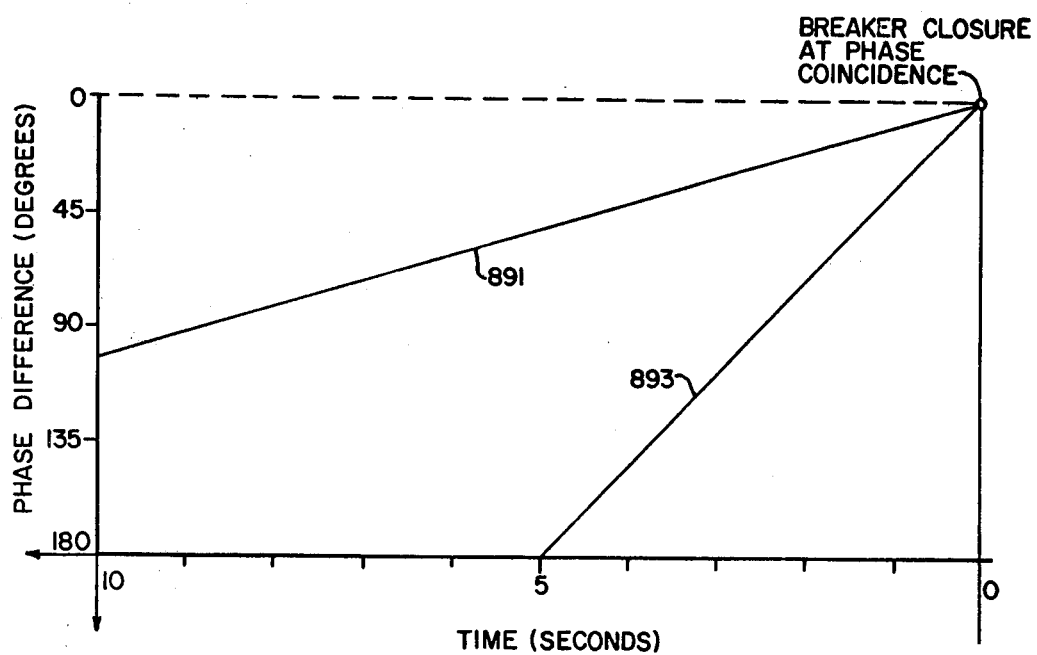
Figure 51C:
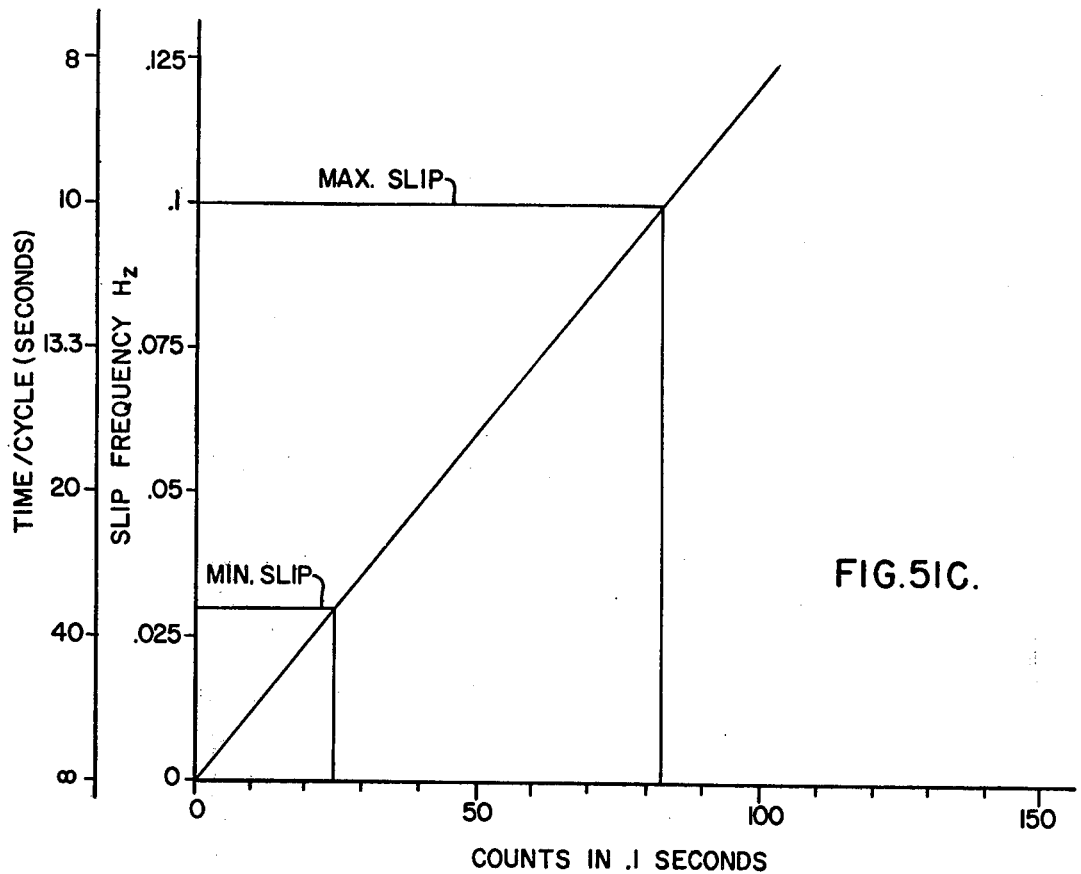

FIG. 51B illustrates the range of conditions under which closing calculations are executed under program control to produce a predetermined synchronization window such as the indicated 10° window. Line 891 represents the maximum main synchronizer signal slope for synchronization as determined by the block 828. A dotted line is located at the minimum advance phase angle at which breaker closure calculations can be initiated and completed.

Figure 35:
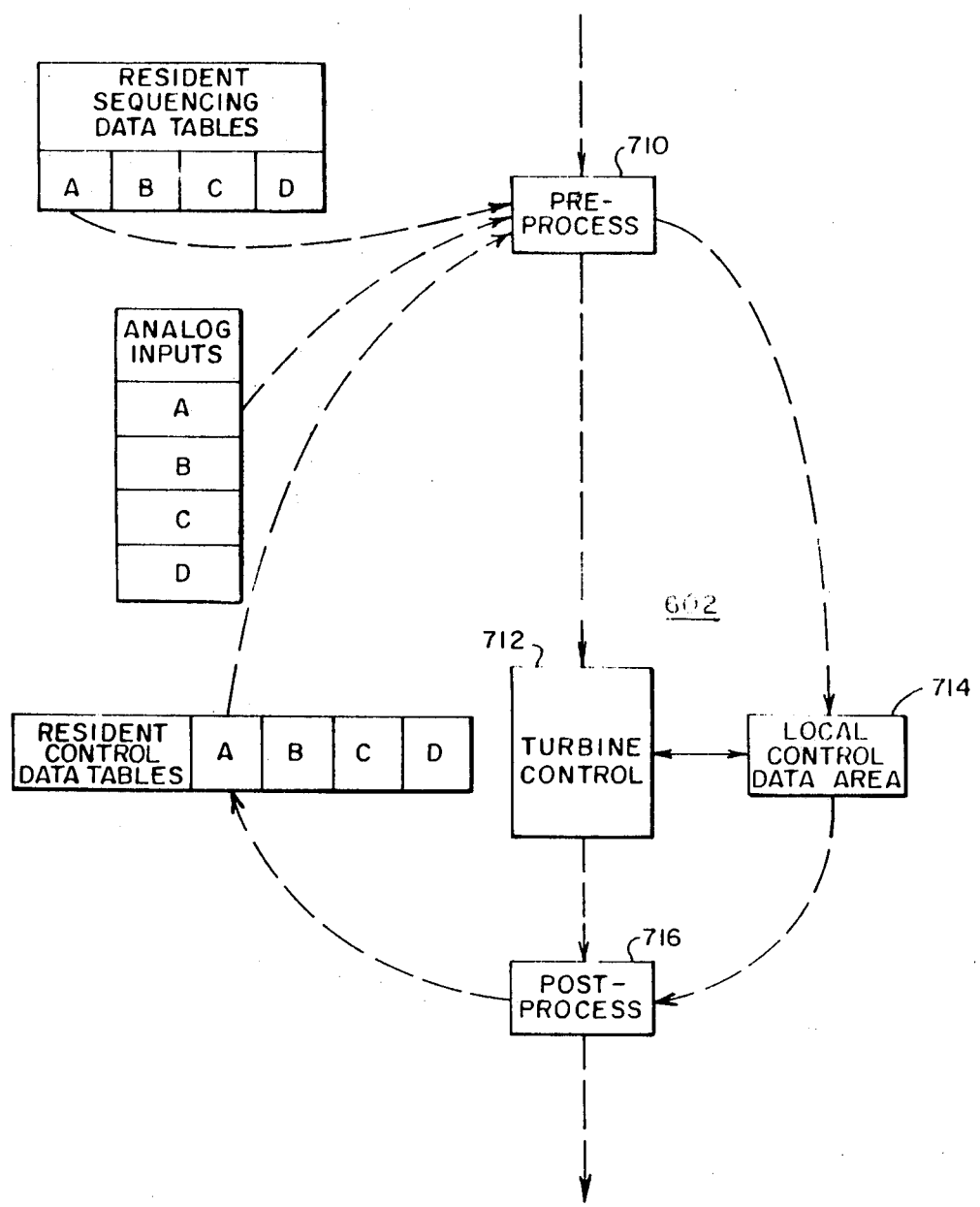
FIG. 35 shows a data flow diagram associated with control program operations during controlled operation of multiple gas turbine power plants with a single control computer.
Figure 36:
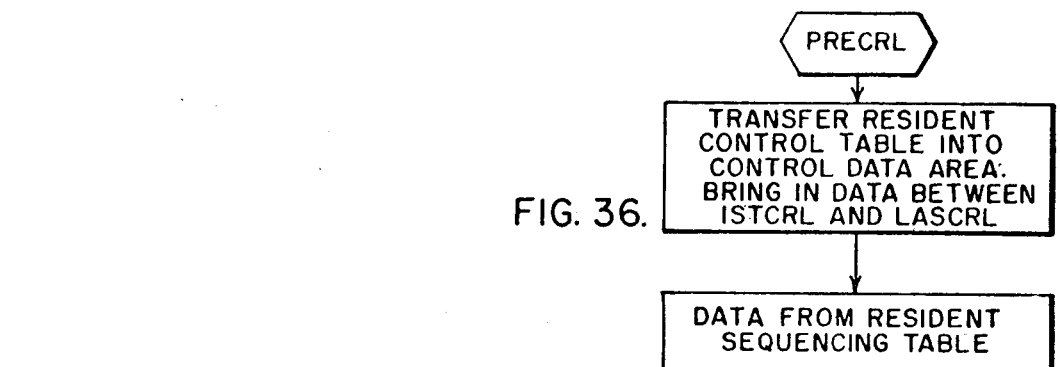
FIG. 36 illustrates a flowchart representative of preprocessor operations in the flow diagram of FIG. 35.

The multiple turbine control scheme considered in connection with FIG. 35 applies to the automatic synchronization program 608 to provide a common controller for automatic synchronization of multiple power plant trains with a power system. Thus, the programs just considered are run to produce automatic synchronization for each turbine under control when it reaches Mode 2 operation.

High reliability and better than 5° phase difference accuracy are economically and efficiently achieved in the described power plant operations. Typically, less than 45 seconds is required for synchronization once Mode 2 control is reached.

If desired, the auxiliary synchronizer input can be omitted, and the fine speed adjustment is then accomplished with the employment of a random speed adjust signal which provides either raise or lower action on the turbine speed. If it is determined that the slope of the main synchronizer input signal $M_3$ minus $M_1$ has decreased when the next sampling is determined, it is then known that the random speed adjust signal just issued had been in the right direction. On the basis of this established fact, speed adjust signals are generated in the same direction until speed matching is achieved in the predefined tolerance or until the main synchronizer waveform slope begins to increase. If increasing main synchronizer waveform slope is detected, speed adjust signals are generated in the opposite direction. The described alternative procedure is then continued until matching is achieved and the generator breaker is closed.

After synchronization, block 722 or 744 directs control program operations to a Mode 3 control block 776 or a Mode 4 control block 778 according to the operator's panel selection. As shown in greater detail in FIG. 46, the Mode 3 block 776 provides for determining kilowatt error from the difference between the kilowatt reference and actual kilowatts in block 780. Proportional and integral controller routines are then applied to the kilowatt error in block 782 and the resultant controller outputs are summed in block 784 in order to provide for constant kilowatt control with temperature limit backup in Mode 3. The kilowatt reference employed in the error determination block 780 is adjustable with the RAISE and LOWER pushbuttons on the operator's panel.

Figure 40D:
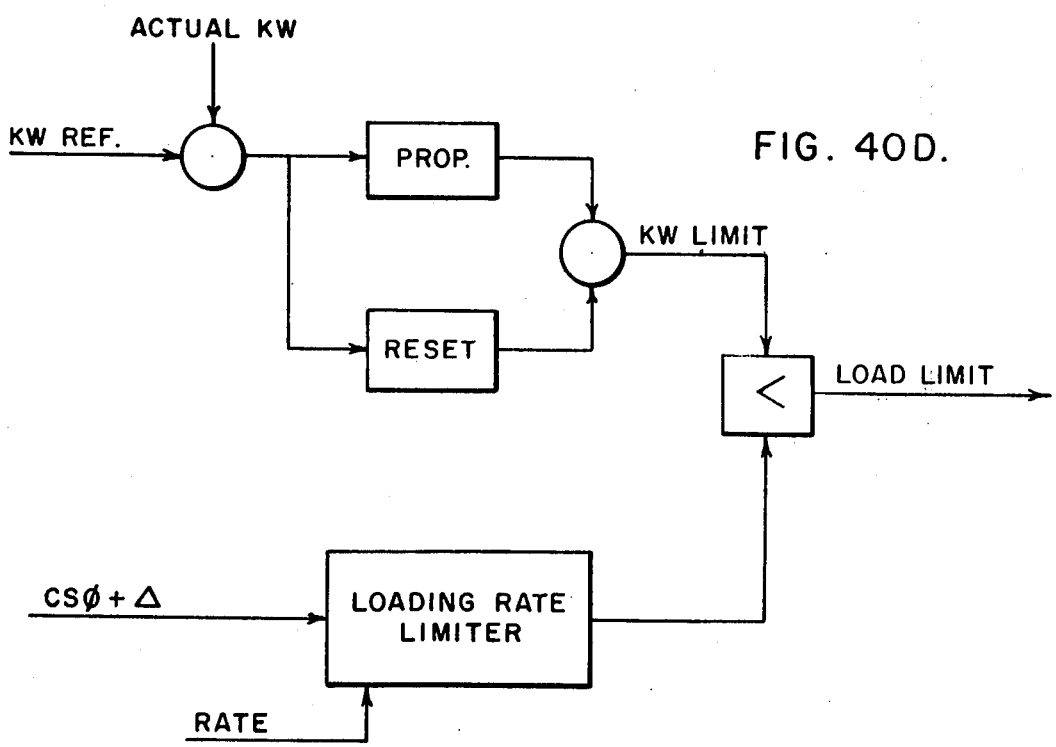

A loading rate limit is determined by block 786 to prevent excessive thermal transients due to excessive loading rates under automatic or manual incremental loading. The rate limit action is performed to produce the loading rates previously described. As shown in FIG. 40D, the loading rate limiter is a function generator which tracks the fuel demand signal CSO with a positive bias for control availability during nonramping periods. Once a load reference change is generated, the loading rate limiter adds a step term to its output to operate through the load and loading rate low select block (FIG. 40) and allow the fuel demand signal to ramp at the preset rate.

Figures 46, 52:
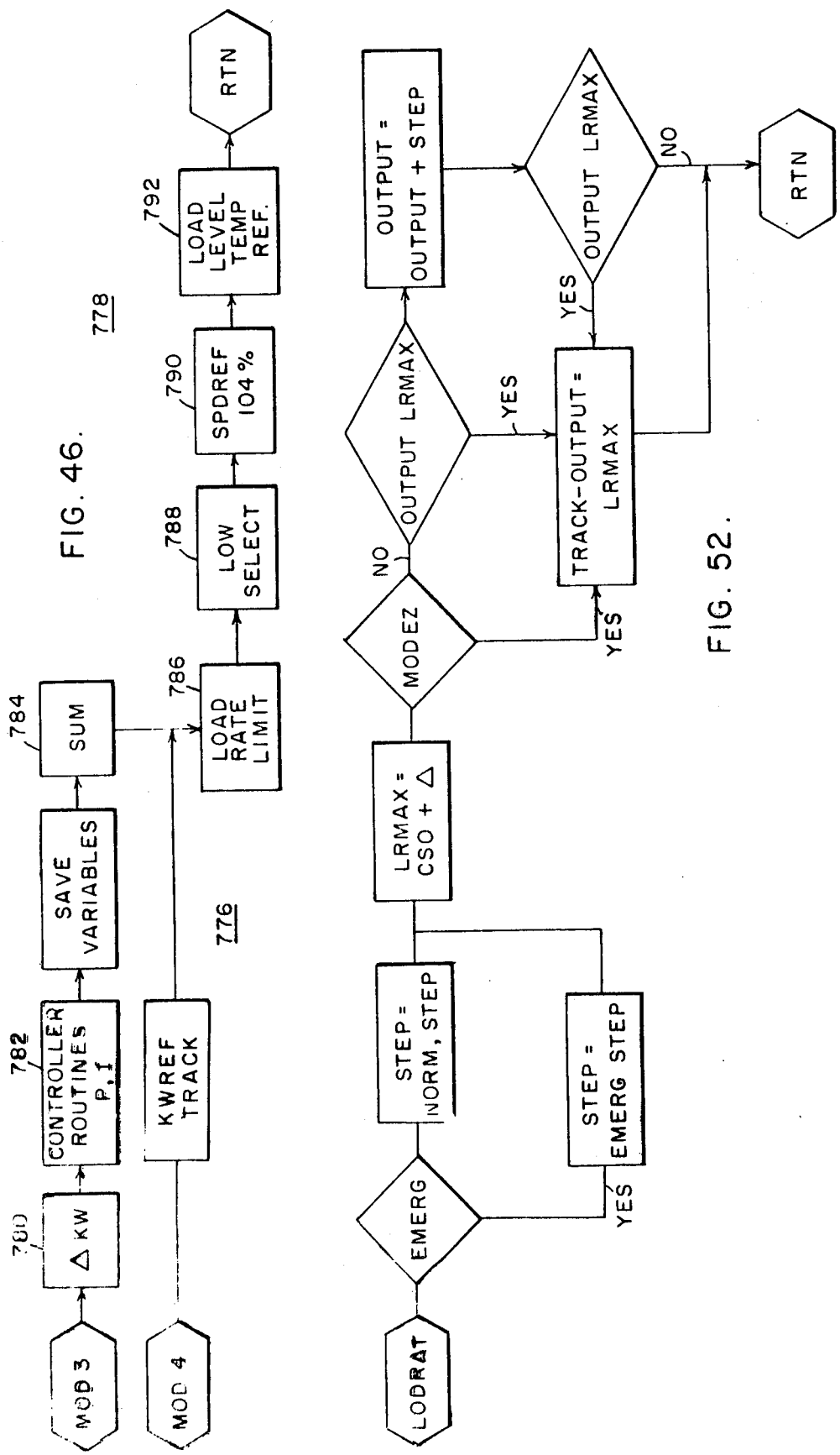
FIG. 46 shows a flow diagram for control program operations which provide load control and load limit functions for the gas turbine power plant.
FIG. 52 illustrates a flowchart for a load rate limit function employed in the load control and limit operations illustrated in FIG. 46.

In FIG. 52, a relatively detailed flowchart is shown for the loading limit subroutine. If the control program is in Mode 1 or 2, the limiter output is made equal to LRMAX, i.e. tracking. If the control program is in Mode 3 or 4 and the limiter output is greater than or equal to LRMAX, the limiter is caused to track LRMAX. Otherwise the limiter output has a step term added to it and if the sum is less than LRMAX it is generated. However, if the sum is greater than or eqaul to LRMAX the limiter output again is caused to track the fuel demand signal. As shown, the size of the step term is different (higher) for emergency startups as compared to normal startups.

When Mode 3 is first entered, the kilowatt reference is set at a minimum value and the operator can then determine the kilowatt reference value thereafter. However, the reference cannot exceed that value corresponding to the base load exhaust temperature limit. The software control configuration associated with Mode 3 is shown in FIG. 40C, and the constant kilowatt control shown therein is illustrated in greater detail in FIG. 40D. As previously considered and as shown in FIG. 40C, the primary Mode 3 controls are the exhaust temperature control and the constant kilowatt control while the blade path and surge controls provide backup protection. The speed reference is set at a value of 106% rated speed to cause a speed error of 6% which is too high for selection by the low selection software block. If the generator 102 is disconnected from the system, the speed loop will regulate turbine speed to the 104% value with 2% droop to maintain the fuel level required for idle operation.

In Mode 4, the kilowatt reference is caused to track actual load and block 786 then makes a loading rate limit determination. Low selection block 788 functions in Mode 3 to determine the lowest fuel demand corresponding to the kilowatt control limit and the loading rate limit as previously considered but it simply passes the loading rate limit in Mode 4. Block 790 provides for setting the speed reference to the 106% value and the previously noted block 792 provides for determining the temperature reference with the use of the curves 334, 340 and 342 (FIG. 17) as considered in connection with the Mode 1 control block 726 for use in the blade path and exhaust temperature limit control block 744.

In both Mode 3 and Mode 4, the block 744 is executed in the manner considered previously in connection with Mode 1. Since no constant kilowatt function is provided for Mode 4, the block 744 provides for temperature loading operation through exhaust temperature limit action. Under temperature control, the generated power varies with the ambient air temperature such that more power is generated with lower inlet air temperature.

With respect to Mode 3, a 50° F offset if provided for the blade path control function so that in the steady state the exhaust function provides control. However, the blade temperature control does protect against high and sudden temperature transients.

The software control configuration for Mode 4 is illustrated in FIG. 40E. Load Mode 3 and load Mode 4 program executions are completed through low select block 700 which selects the lowest fuel demand representation associated with the temperature, surge and load limits to provide the control operations described. Control program execution through the blocks 766, and or 788, 744 and 700 continues for the duration of Mode 3 or Mode 4 load control.

9. Alarm and Thermocouple Check Programs

In the alarm system, alarms are generated in response to sensors considered in connection with FIG. 12. Printout of alarms is made as in the following example:

| Time | Status | Turbine Identification | Description |
|---|---|---|---|
| 12:30 | ALRM | A | Flame A |

The status conditions of the alarms are listed below:
NORM - Normal
ALRM - Alarm Alarms are determined by the sequencing program 600 and the thermocouple check program 616 as previously considered. Alarm printouts generated by the alarm program 610 result from the use of two tables of bits. In the first table, the bits are set ON and OFF by the sequencing program 600 and the thermocouple check program 616 and the second table is used to store the previous condition of the alarm bits. The alarm program 610 compares the two tables and generates alarm messages when the bit patterns of the two tables differ. The alarm program 610 is periodically executed to print out all points in alarm.

In the case of shutdown alarms, one operational and maintenance advantage associated with the operation of the control system 300 is that the alarm condition which causes a shutdown can be readily determined. Thus, logic processing provided by the sequencing program in the implementation of the sequence logic (FIG. 33) avoids the generation of multiple spurious alarms which are caused by the shutdown itself and follow the shutdown causing alarm. Multiple confusing alarm lightings as encountered with conventional annunciator panels are thus avoided.

The thermocouple check program 616 also runs on a periodic basis. When it is executed, a check is made of the values stored for all thermocouples not checked by the control program 602 to determine if the thermocouple value is more negative than a predetermined check number stored in location CHKNO. An excessive negative number is considered an open circuit and an alarm bit is set for the alarm program 610.

10. Data Logging Program

A formated log is printed in response to execution of the log program 618 on a periodic basis selected by the plant operator within the range of 15 minutes to two hours. The printed readings are instantaneous values obtained from the last analog scan cycle. The plant operator selects any 20 analog points per turbine under control, such as the more useful analog points included in the following:

1. (10) points-Bearing temperatures
2. (2) points-compressor inlet and discharge air temperature
3. (1) point-lube oil cooler discharge temperature
4. (2) points-generator air cooler in and out temperatures
5. (8) points-disc cavity temperature
6. (8) points-blade temperature
7. (8) points-exhaust manifold temperature
8. (4) points-vibration
9. (1) point-speed
10. (1) point-watt
11. (1) point-for VARS
12. (1) point-volts
13. (1) point-amperes
14. (1) point-frequency
15. (6) points-RTD for generator temperature.

Generally, the analog conversion program 620 provides for converting entered analog values into the engineering value represented by the input and vice versa. Four types of conversion are provided, i.e., flow straight-line, thermocouple, and segmented straight-line.

11. Miscellaneous Programs

The miscellaneous programs 622 include a programmer's console function program for converting engineering units to values corresponding to the analog input system. It is essentially the reverse of the analog conversion program 620 and provides for convenient operator communication with the computer through the teletypewriter on printer. For example, alarm setpoint limits can be conveniently adjusted in the sequencing program 600 with the use of the engineering units to analog conversion program.

Other programs included in the miscellaneous category are a deadswitch computer program which verifies that certain basic functions of the computer are operating as expected. A power failure and restart program interfaces with the executive program 604 to save registers and stop the computer 304 when a power failure interrupt is received, and it restarts the main computer subsystems when the power supply voltage is returned to normal. A horn and alarm lamp program causes a horn to sound and a lamp to flash on the operator's panel 120 when any new alarm has been generated by program operations. Additional programmer's console functions designated herein as being implemented by miscellaneous programs rather than the executive program include a CCI printed status program, an analog engineering units print program, a contact output operate program, a test dead computer system program and a time program.

Reference is made to (Ser. No. 082,470) for an overall program listing pertaining to the program subject matter described herein. The following listing only includes a printout of an automatic synchronization program employed in the embodiment to interact with other system programs and system structure in the manner already described. Generally, the programs detailed and in Ser. No. 082,470 were written in assembly language and stored in a P50 core memory 16K in size. With more judicious use of core areas and increased use of subroutining, it is expected that substantially the same subject matter and related additions can be programmed in less than 12K of core memory. In general, the detailed flowcharting corresponding to the automatic synchronization program printout conforms to the described automatic synchronization flowcharting.

Most developed system software may be characterized with relatively minor faults known as bugs which sometimes take long periods of time to detect and/or diagnose. Ordinarily, the correction of such faults is within the skill of control and system programmers. The program listing in Ser. No. 082,470 herein accordingly may be expected to contain some faults of this kind but all such faults which have been detected have required only programmer skill for correction in field applications.

As an aid to the reader, the folling notes are made relative to the format of the automatic synchronization program listing:

a. The first line on each page contains the title of the program and/or the page number for that program.

b. The first column of octal digits is a sequential record number listing corresponding to the punched card or other program input records.

c. The second column of five octal digits is a machine language statement of the memory address of the instruction which is described on that line.

d. Each row in the third column of six octal digits is separated into fields of two digits, one digit and three digits, and it expresses the contents of the memory address separated into the instruction format. The fields contain:

1. Operation code — left two digits
2. Addressing mode — middle, single digit
3. Operand address — right three digits.

e. The fourth column of one mark, i.e.. indicates that an address or value was generated by the assembler to satisfy the requested instructions.

f. Each row in the fifth column up to six characters, letters or numerals contains the symbolic title assigned to the corresponding memory address by the programmer in the assembly language.

g. Each row in the sixth column of three letters contains the operation code assigned to the corresponding memory address by the programmer in the assembly language. The operation code includes a large number of directives to the assembler program and the various available machine instructions.

h. Each row in the seventh column of up to six characters represents the operand address assigned to the corresponding memory location by the programmer in the assembly language.

i. The remaining columns contain comments made by the programmer to aid in understanding the program operation.

What is claimed is:

1. A system for operating an electric power plant comprising an electric generator, a prime mover for driving said generator, a circuit breaker for connecting the electric output of said generator to an external power system, a plant control system including means for controlling prime mover motive fluid flow, said control system including a digital control computer, means for detecting the generator speed and the external system frequency, means for determining a computer representation of the magnitude and rate of change of generator output and external system phase difference as a function of time, means for generating a first electric signal representative of the phase difference between the generator and system waveforms, the last named determining means finely determining said phase difference representation in accordance with a computer representation of said phase difference signal after the slip frequency is reduced below a predetermined value, the last named determining means roughly determining said phase difference representation in accordance with representations of the generator speed and external system frequency until the slip frequency is reduced below said predetermined value, said control system providing a loop for controlling prime mover speed in response to a speed reference means for operating said computer within said speed control loop at least to generate said speed reference representation at least during startup operations, means for operating said computer to modify said speed reference representation as a function of said phase difference representation, means for operating said computer to generate a breaker closure command when said phase difference representation reaches a predetermined condition, and means for operating said breaker in response to said closure command.

2. The operating system as set forth in claim 1 which further comprises means for exciting said generator, means for detecting and comparing said generator and the external system voltages, means for operating said computer to determine a representation of said compared voltage values, and means for operating said generator excitation means as a function of said voltage comparison representation and for generating said breaker closure command when said phase difference and voltage comparison representations both reach predetermined conditions.

3. The operating system as set forth in claim 2 which further comprises means for generating a second electric phase difference signal in a similar manner to but phase displaced from said first defined electric signal, and means for operating said computer to determine the direction of change of the phase difference between said first and said second phase difference signals.

4. The operating system as set forth in claim 2 which further comprises an analog input system having a plurality of input points cooperatively associated with said computer, means for operating said computer to scan said plurality of analog input points in said analog input system at a predetermined frequency, and means for operating said computer to preempt a plurality of predetermined analog input system points for input of said phase difference signal at time points within the analog scan cycle when said phase difference representation determination changes from rough to fine speed matching.

5. The operating system as set forth in claim 4 wherein at least three of said analog input points are preempted for said phase difference signal input and which further comprises means for operating said computer to determine the slip between two of the phases difference signal inputs and to check the validity of the slip determination between one of the two phase difference signal inputs previously utilized and another phase difference signal input.

6. The operating system as set forth in claim 3 which further comprises an analog input system having a plurality of input points cooperatively associated with said computer, means for operating said computer to scan said plurality of analog input points in said analog input system at a predetermined frequency, and means for operating said computer to preempt at least four analog input points for said two phase difference signal inputs with at least three of said points assigned to said first signal and at least one point assigned to said second signal.

7. The operating system as set forth in claim 6 wherein the analog points are successive points in the analog scan.

8. The operating system as set forth in claim 6 wherein four analog points are preempted, said first signal is assigned to the first two analog points, said second signal is assigned to the third analog point, and said first signal is assigned to the fourth analog point.

9. The operating system as set forth in claim 1 wherein the electric power plant is a gas turbine plant, said prime mover comprises a gas turbine, said motive fluid flow controlling means includes means for controlling and operating a fuel system which supplies fuel for combustion in a combustion element of said gas turbine, and said speed reference means is employed in said fuel system control and operation.

10. The operating system as set forth in claim 2 wherein the electric power plant is a gas turbine plant, said prime mover comprises a gas turbine, said motive fluid flow controllng means includes means for controlling and operating a fuel system which supplies fuel for combustion in a combustion element of said gas turbine, and said speed reference means is employed in said fuel system control and operation.

11. The operating system as set forth in claim 4 wherein the electric power plant is a gas turbine plant, said prime mover comprises a gas turbine, said motive fluid flow controlling means includes means for controling and operating a fuel system which supplies fuel for combustion in a combustion element of said gas turbine, and said speed reference means is employed in said fuel system control and operation.

12. A method for automatically operating an electric power plant within a power system, the steps of said method comprising operating a prime mover to drive an electric generator, determining for a digital control computer a representation of generators and system frequencies and a time function representation of a generator and system phase difference signal, using the computer in a speed control loop to determine the flow of motive fluid to the prime mover, operating the computer to effect automatic syncronization by determining the speed control loop operation as a function of the frequency representation until the slip frequency becomes less than a predetermined value and as a function of the phase difference signal representation after the slip frequency becomes less than the predetermined value, operating the computer to command closure of a circuit breaker to couple the generator to the sytem when the phase difference signal representation reaches a predetermined condition, and operating the breaker in response to the closure command.

13. The method as set forth in claim 12 wherein the method steps further include operating the computer to determine a representation of detected generator and system voltage values, operating the computer to control the operation of an excitation system of the generator as a function of the voltage representation, and generating the breaker closure command when the phase difference signal and voltage representations reach respective predetermined conditions.

14. An automatic electric power plant synchronization system for an electric power plant generator driven by a prime mover comprising a circuit breaker for connecting the electric output of the generator to an external power system, a control system including a digital control computer for determining the speed of the prime mover, means for detecting the generator speed and the system frequency, means for generating an electric signal representative of the phase difference between the generator and system waveforms, means for determining a computer representation of the magnitude and rate of change of generator and system phase difference as a function of a computer representation of the generator speed and system frequency when the slip frequency exceeds a predetermined value and as a function of a computer representation of the phase difference signal when the slip frequency is less than the predetermined value, means for operating said computer to determine the operation of said speed control system as a function of said phase difference representation, means for operating said computer to generate a breaker closure command when said phase difference representation reaches a predetermined condition, and means for operating said breaker in response to said closure command.

15. The synchronizing system as set forth in claim 14 which further includes an excitation system for the generator, means for detecting the generator and system voltages and for operating said computer to determine a representation of a comparison between the voltage values, and means for operating said generator excitation system as a function of said voltage comparison representation and for generating said breaker closure command when said phase difference and voltage comparison representations both reach predetermined conditions.

16. The synchronizing system as set forth in claim 15 which further includes means for generating a second electric signal in a similar manner to but phase displaced from said first defined electric signal, and means for operating said computer to determine the direction of change of the phase difference between said first and said second phase difference signals.

17. The synchronizing system as set forth in claim 15 which further includes an analog input system having a plurality of input points cooperatively associated with said computer, means for operating said computer to scan said plurality of analog input points in said analog input system at a predetermined frequency, and means for operating said computer to preempt a plurality of predetermined analog input system points for input of said phase difference signal at time points within the analog scan cycle when said phase difference representation determination changes from rough to fine speed matching.

18. The synchronizing system as set forth in claim 14 which further includes means for operating said computer to permit the generation of the breaker closure command only when the slip frequency is valued between predetermined maximum and minimum values.

19. The synchronizing system as set forth in claim 14 which further includes means for operating said computer to determine a desired prime mover speed matching change in the speed reference as a function of the difference between determined slip frequency and a desired synchronization slip frequency.

20. The synchronizing system as set forth in claim 16 which further includes means for operating said computer to determine whether a raise or lower matching speed action is needed as a function of said first and second phase difference signals.

21. The synchronization system as set forth in claim 18 which further includes means for operating said computer to raise said prime mover speed reference by a predetermined amount if the slip frequency persists below said minimum slip frequency for an excessive time period.

22. The synchronization system as set forth in claim 14 which further includes means for operating said computer to raise said prime mover speed reference by a predetermined amount if the slip frequency persists below said predetermined value for an excessive time period.

23. The synchronization system as set forth in claim 14 which further includes means for operating said computer to calculate the breaker closure command time from predetermined characteristics including the slope of said phase difference signal input, and means for cyclically running said operating means to obtain updated valuation of said phase difference signal input and progressively more accurate breaker closure command time calculations until the breaker closure command time arrives.

24. A system as set forth in claim 23 wherein the closure command time calculations are allowed to be updated until a predetermined time point is reached prior to the last projected breaker closure command time.

25. The synchronization system as set forth in claim 24 which further includes means for operating said computer to set a breaker close time count when a final updated time to breaker closure command has been calculated and to downcount the close time count to zero at which time said breaker closure command is immediately issued.

26. An automatic electric power plant synchronization system for an electric power plant generator driven by a prime mover comprising a circuit breaker for connecting the electric output of the generator to an external power system, a control system including a digital control computer for determining the speed of the prime mover, means for determining a computer representation of the magnitude and rate of change of the generator and system phase differences as a function of time, means for operating said computer to determine the operation of said speed control system as a function of said phase difference representation, means for operating said computer to permit the generation of a breaker closure command only when the slip frequency is valued between predetermined maximum and minimum values, means for operating said computer to generate said breaker closure command when said phase difference representation reaches a predetermined condition, and means for operating said breaker in response to said closure command.

27. An electric power plant synchronization system for an electric power plant generator driven by a prime mover comprising a circuit breaker for connecting the electric output of the generator to an external power system, a control system including a digital control computer for determining the speed of the prime mover, means for determining a computer representation of the magnitude and rate of change of generator and external system phase differences as a function of time, means for operating said computer to determine the operation of said speed control system as a function of said phase difference representation, means for operating said computer to raise the prime mover speed reference by a predetermined amount if the slip frequency persists below a predetermined value for an excessive time period.

28. An automatic electric power plant synchronization system for an electric power plant generator driven by a prime mover comprising a circuit breaker for connecting the electric output of the generator to a power system, a control system including a digital control computer for determining the speed of the prime mover, means for determining a computer representation of the magnitude and rate of change of generator and external system phase differences as a function of time, means for operating said computer to determine the operation of said speed control system as a function of said phase difference representation, means for operating said computer to calculate the breaker closure command time from predetermined characteristics including the slope of said phase difference signal input thereto, and means for cyclically running said operating means to obtain updated valuation of said phase difference signal input and progressively more accurate breaker closure command time calculations until the breaker closure command time arrives.

29. A method for operating a digital computer to automatically synchronize a generator driven by a prime mover with a power system, the steps of said method comprising determining a representation of generator and system frequencies and a time function representation of a generator and system phase difference signal, determining prime mover speed control action as a function of the frequency representation until the slip frequency becomes less than a predetermined value and as a function of the phase difference signal representation after the slip frequency becomes less than the predetermined value, and determining a breaker close command when the phase difference signal representation reaches a predetermined condition.

30. The method as set forth in claim 29 further comprising the steps of detecting generator and system voltage values, determining a representation of detected generator and system voltage values, determining generator excitation control action as a function of the voltage representation, and permitting the breaker closure command only if the voltage representation satisfies predetermined conditions.

31. The method as set forth in claim 30 further comprising the step of enabling the generation of the breaker closure command only if the slip frequency is between predetermined maximum and minimum values.

32. The method as set forth in claim 30 further comprising the step of generating a prime mover speed raise control command if the slip frequency persists below a predetermined value for an excessive time period.

* * * * *